(12) United States Patent
Cao et al.

(10) Patent No.: US 11,510,237 B2
(45) Date of Patent: *Nov. 22, 2022

(54) SYSTEMS AND METHODS FOR MIXED GRANT-FREE AND GRANT-BASED UPLINK TRANSMISSIONS

(71) Applicants: Yu Cao, Kanata (CA); Liqing Zhang, Ottawa (CA); Jianglei Ma, Ottawa (CA)

(72) Inventors: Yu Cao, Kanata (CA); Liqing Zhang, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 9 days.

This patent is subject to a terminal disclaimer.

(21) Appl. No.: 17/119,235

(22) Filed: Dec. 11, 2020

(65) Prior Publication Data

US 2021/0136811 A1 May 6, 2021

Related U.S. Application Data

(63) Continuation of application No. 15/674,426, filed on Aug. 10, 2017, now Pat. No. 10,869,333.

(Continued)

(51) Int. Cl.
*H04W 72/14* (2009.01)
*H04L 1/16* (2006.01)
(Continued)

(52) U.S. Cl.
CPC .............. *H04W 72/14* (2013.01); *H04L 1/16* (2013.01); *H04L 1/1822* (2013.01);
(Continued)

(58) Field of Classification Search
CPC ............ H04W 72/14; H04W 72/1268; H04W 72/1289; H04W 74/02; H04W 88/02;
(Continued)

(56) References Cited

U.S. PATENT DOCUMENTS 9,281,922 B2 * 3/2016 Malkamaki ........... H04L 1/1812
10,813,124 B2 10/2020 Cao et al.
(Continued)

FOREIGN PATENT DOCUMENTS

CN 101359937 A 2/2009
EP 2184863 A1 5/2010
(Continued)

OTHER PUBLICATIONS

Intel Corporation, "UL URLLC transmission schemes", 3GPP TSG RAN WG1 Meeting #87, Reno, USA, Nov. 14-18, 2016, R1-1612004, 7 pages.
(Continued)

*Primary Examiner* — Wayne H Cai

(57) ABSTRACT

There may be situations in which it is beneficial for a user equipment to switch between grant-free uplink wireless transmissions and grant-based uplink wireless transmissions. Systems and methods are disclosed that help facilitate grant-based and grant-free uplink wireless communications, and the switching between the two. For example, systems and methods for mitigating collision between a granted uplink wireless transmission and a grant-free uplink wireless transmission are disclosed herein.

27 Claims, 27 Drawing Sheets

Related U.S. Application Data

(60) Provisional application No. 62/435,519, filed on Dec. 16, 2016.

(51) Int. Cl.
*H04W 74/02* (2009.01)
*H04L 1/18* (2006.01)
*H04W 72/12* (2009.01)
*H04W 88/02* (2009.01)
*H04W 88/08* (2009.01)

(52) U.S. Cl.
CPC .......... *H04L 1/1864* (2013.01); *H04L 1/1877* (2013.01); *H04L 1/1887* (2013.01); *H04L 1/1893* (2013.01); *H04W 72/1268* (2013.01); *H04W 74/02* (2013.01); *H04W 72/1289* (2013.01); *H04W 88/02* (2013.01); *H04W 88/08* (2013.01)

(58) Field of Classification Search
CPC .... H04W 88/08; H04L 1/1822; H04L 1/1864; H04L 1/1887; H04L 1/16; H04L 1/1893
See application file for complete search history.

(56) References Cited

U.S. PATENT DOCUMENTS

| | | |
|---|---|---|
| 2006/0268798 A1 | 11/2006 | Kim et al. |
| 2011/0292895 A1 | 12/2011 | Wager et al. |
| 2014/0254544 A1 | 9/2014 | Kar Kin Au et al. |
| 2015/0245326 A1 | 8/2015 | Rune et al. |
| 2015/0312935 A1 | 10/2015 | Lohr et al. |
| 2016/0295624 A1 | 10/2016 | Novlan et al. |
| 2016/0352454 A1 | 12/2016 | Zhang et al. |
| 2016/0359593 A1 | 12/2016 | Dai et al. |
| 2017/0034845 A1 | 2/2017 | Liu et al. |
| 2017/0181155 A1 | 6/2017 | Chen et al. |
| 2017/0311182 A1 | 10/2017 | Tenny et al. |
| 2018/0042043 A1 | 2/2018 | Babaei et al. |
| 2018/0176937 A1 | 6/2018 | Chen et al. |
| 2018/0176945 A1 | 6/2018 | Cao et al. |
| 2019/0029006 A1* | 1/2019 | Wang ................ H04W 72/1289 |
| 2019/0069253 A9 | 2/2019 | Nory et al. |
| 2019/0090269 A1 | 3/2019 | Cao et al. |
| 2019/0159240 A1 | 5/2019 | Lohr et al. |
| 2020/0305138 A1* | 9/2020 | Li ....................... H04W 72/042 |

FOREIGN PATENT DOCUMENTS

| | | |
|---|---|---|
| JP | 2011259440 A | 12/2011 |
| WO | 2015109805 A1 | 7/2015 |
| WO | 2016165653 A1 | 10/2016 |
| WO | 2016185923 A1 | 11/2016 |

OTHER PUBLICATIONS

Huawei et al., "Grant-free transmission scheme for UL URLLC", 3GPP TSG RAN WG1 Meeting #87 R1-1611689, Reno, Nevada, US, Nov. 14-18, 2016, 9 pages.

Nokia et al.,"Contention-based non-orthogonal multiple access with frequency hopping for mMTC uplink", 3GPP TSG-RAN WG1 #85 R1-165020, Nanjing, P. R. China, May 23-27, 2016, 4 pages.

Intel Corporation, "Grant-free UL transmissions in NR",3GPP TSG-RAN WG1 #86bis R1-1609499, Lisbon, Portugal, Oct. 10-14, 2016, 8 pages.

* cited by examiner

SYSTEMS AND METHODS FOR MIXED GRANT-FREE AND GRANT-BASED UPLINK TRANSMISSIONS

PRIORITY

This application is a continuation of U.S. patent application Ser. No. 15/674,426, entitled "Systems and Methods for Mixed Grant-Free and Grant-Based Uplink Transmissions", which was filed on Aug. 10, 2017, and which claims priority to U.S. Provisional Patent Application Ser. No. 62/435,519, entitled "Systems and Methods for Mixed Grant-Free and Grant-Based Uplink Transmissions", which was filed on Dec. 16, 2016.

The contents of both U.S. applications referenced in the paragraph above are incorporated herein by reference.

FIELD

The present application relates to uplink transmissions in a wireless communication system.

BACKGROUND

In some wireless communication systems, a user equipment (UE) wirelessly communicates with a base station to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a UE may wirelessly transmit data to a base station in an uplink transmission at a particular frequency and/or during a particular slot in time. The frequency and time slot used are examples of resources.

Some wireless communication systems may support grant-based uplink transmissions. That is, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time-frequency locations in an uplink orthogonal frequency-division multiple access (OFDMA) frame.

Some wireless communication systems may support grant-free uplink transmissions. That is, a UE may send uplink transmissions using certain uplink resources possibly shared with other UEs, without specifically requesting use of the resources and/or without specifically being granted the resources by the base station. A grant-free uplink transmission does not need a dynamic and explicit scheduling grant from the base station.

SUMMARY

There may be situations in which it is beneficial for a UE to switch between grant-free uplink transmissions and grant-based uplink transmissions. Systems and methods are disclosed herein that help facilitate grant-based and grant-free uplink wireless communications, and the switching between the two. For example, systems and methods for mitigating collision between a granted uplink transmission and a grant-free uplink transmission are disclosed herein.

In one embodiment, there is provided a method performed by a base station that may include receiving a grant-free uplink transmission from a user equipment. In response to receiving the grant-free uplink transmission, the method may further include generating a scheduling grant for the user equipment. The method may further include transmitting the scheduling grant to at least the user equipment.

In another embodiment, there is provided a method performed by a user equipment that may include sending a grant-free uplink transmission to a base station. The method may further include receiving a scheduling grant from the base station in response to sending the grant-free uplink transmission. The method may further include sending a granted uplink transmission to the base station according to the scheduling grant.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Figure 1:
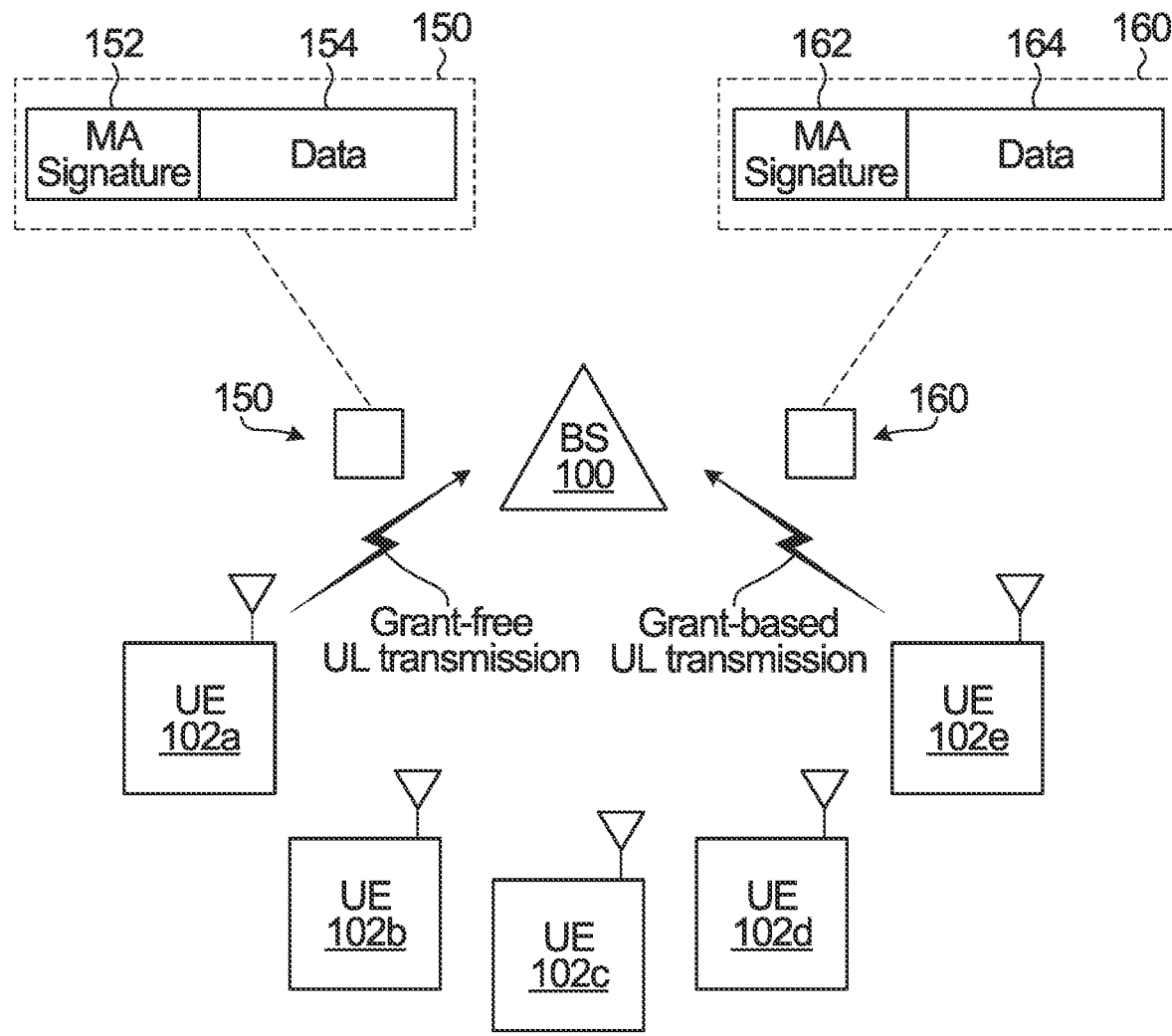
FIG. 1 is a block diagram of a base station and a plurality of UEs, according to one embodiment.

FIG. 1 is a block diagram of a base station 100 and a plurality of UEs 102a-e in a Radio Access Network (RAN), according to one embodiment.

The word "base station" encompasses any device that wirelessly receives data (in the uplink) from wireless devices such as UEs 102a-e. The base station 100 is an example of a network access device that provides network access to UEs 102a-e and as such, is generally meant to be representative of other types of access devices including a transmit and receive point, a base transceiver station, a radio base station, a radio access node, a network node, a transmit/receive node, a Node B, an eNode B (eNB), a gNB, a relay station, a remote radio head, or an Access Point (AP). Also, in some embodiments, the parts of the base station 100 may be distributed. For example, some of the modules of the base station 100 may be located remote from the equipment housing the antennas of the base station 100, and may be coupled to the equipment housing the antennas over a communication link (not shown). Therefore, in some embodiments, the term base station 100 may also refer to modules on the network side that perform processing operations (e.g. scheduling and message generation) that are not necessarily part of the equipment housing the antennas of the base station 100. The modules may also be coupled to other base stations. In some embodiments, the base station 100 may actually be a plurality of base stations that are operating together to serve the UEs 102a-e, e.g. through coordinated multipoint transmissions. Similarly, UEs 102a-e are also meant to be illustrative of other end user devices which may be configured as disclosed herein for uplink communications with the base station 100. Examples of other user devices include wireless transmit/receive units (WTRUs), mobile stations, wireless devices, fixed or mobile subscriber units, cellular telephones, personal digital assistants (PDAs), smart phones, laptops, computers, touchpads, wireless sensors, and consumer electronics devices. Other possibilities exist for the UEs 102a-e.

FIG. 1 illustrates an example message 150 sent by UE 102a in a grant-free uplink transmission. A grant-free uplink transmission does not need a dynamic and explicit scheduling grant from the base station 100. Herein, the term "grant-free uplink transmission", or equivalently, "transmission without a grant", is used to denote a transmission of data to the base station, e.g. data traffic from the UE 102a. Therefore, the term "grant-free uplink transmission", as used herein, distinguishes from random access signaling e.g. a signaling employed by a UE entering a new service area to request a transmission grant over a physical random access channel (PRACH).

The message 150 sent in the grant-free uplink transmission is transmitted using a multiple access (MA) resource. A MA resource is comprised of a MA physical resource (e.g. a time-frequency resource or block) and at least one MA signature. The MA signature may include (but is not limited to) at least one of the following: a codebook/codeword, a sequence, an interleaver and/or mapping pattern, a pilot, a demodulation reference signal (e.g. a reference signal for channel estimation), a preamble, a spatial-dimension, and a power-dimension. The term "pilot" refers to a signal that at least includes a reference signal, for example, a demodulation reference signal. The reference signal may be the MA signature.

The message 150 includes MA signature 152, as well as data 154, which is to be decoded by the base station 100. The message 150 may include other information, such as information for identifying the UE 102a and/or cyclic redundancy check (CRC) information, but this has been omitted for the sake of clarity. The MA signature 152 is illustrated as being separate from the data 154. This may be the case if, for example, the MA signature 152 consists of a reference signal and/or a preamble. However, the MA signature 152 may instead be part of the transmission scheme itself, e.g. the codebook used or the mapping or interleaving pattern used, in which case the MA signature 152 would not necessarily occupy separate time-frequency resources from the data 154. Also, in embodiments in which the MA signature 152 does occupy separate time-frequency resources from the data 154, the MA signature 152 does not necessarily have to be at the start of the message 150.

When UE 102a sends message 150 to the base station 100 in the grant-free uplink transmission, the base station 100 first attempts to detect the MA signature 152. MA signature detection may involve a blind detection process in which the MA signature 152 is detected among all of the possible choices of MA signatures. Detecting the MA signature is referred to as activity detection. After activity detection is successful, the base station 100 then attempts to perform channel estimation based on the MA signature 152, and optionally also based on additional reference signals in the message 150. The base station 100 then attempts to decode the data 154. As an example, the MA signature 152 may be a reference signal. The base station 100 may first successfully perform activity detection by successfully decoding the reference signal sequence. The reference signal sequence may then be used by the base station 100 for channel estimation of the uplink channel. Once the reference signal is successfully decoded and channel estimation is performed, the base station 100 then decodes the data 154.

FIG. 1 also illustrates an example message 160 sent by UE 102e in a grant-based uplink transmission. The message 160 also includes an MA signature 162 (e.g. a reference signal) and data 164. However, the resources used to send the message 160 and the MA signature 162 are assigned to the UE 102e by the base station 100. The base station 100 does not have to perform activity detection.

Some or all of the UEs 102a-e may be configured to send grant-free and/or grant-based uplink transmissions. For example, after UE 102a sends message 150 via the grant-free uplink transmission, the base station 100 may then grant resources to the UE 102a to be used for sending a subsequent uplink transmission. The subsequent uplink transmission by UE 102a would be a grant-based uplink transmission because resources were granted to the UE 102a for sending the subsequent uplink transmission.

Figure 2:
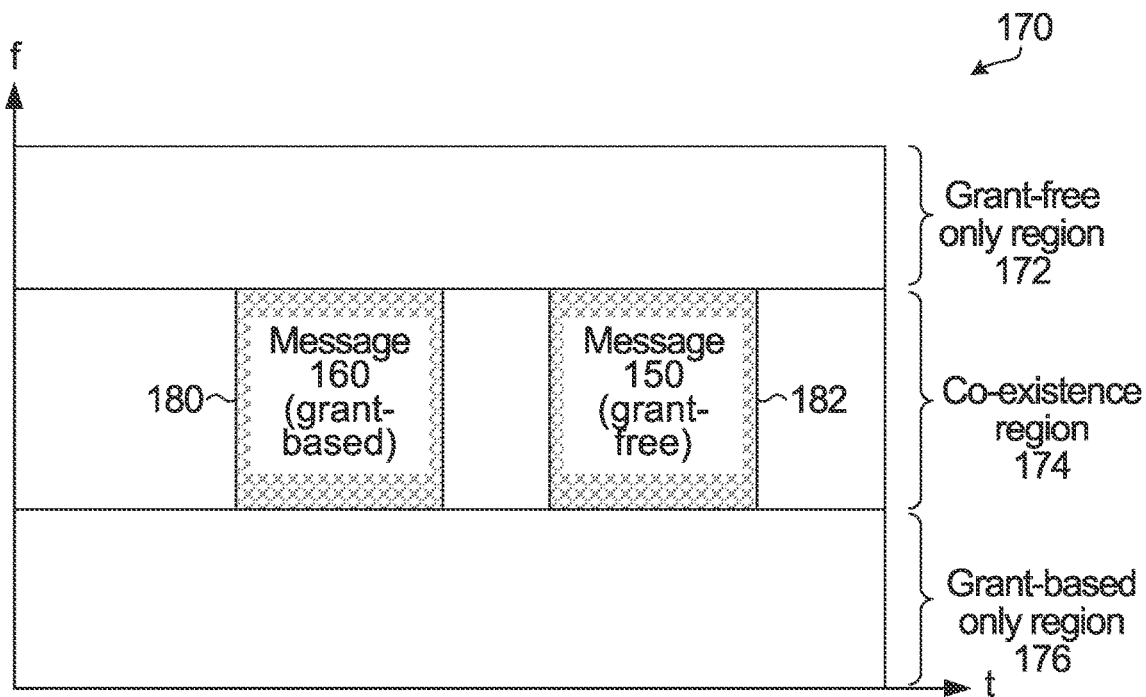
FIG. 2 illustrates a set of time-frequency resources, according to one embodiment.

Uplink transmissions from the UEs 102a-e may be performed on a set of time-frequency resources. FIG. 2 illustrates a set of time-frequency resources 170, according to one embodiment. The time-frequency resources 170 may be partitioned into a combination of grant-free and grant-based regions. In the embodiment of FIG. 2, the time-frequency resources 170 are partitioned into a grant-free only region 172, a grant-based only region 176, and a co-existence region 174, where only grant-based uplink transmissions may be scheduled in the grant-based only region 176, and only grant-free uplink transmissions are sent in the grant-free only region 172. In co-existence region 174, grant-free uplink transmissions may be sent, but grant-based uplink transmissions may also be scheduled by the base station 100. As an example, resources 180 in the co-existence region 174 are granted by the base station 100 for UE 102e to transmit message 160, and resources 182 in the co-existence region 174 are used by UE 102a to transmit message 150. In some embodiments, there may not be a separate grant-free only region 172. The co-existence region 174 may by default be a grant-free only region until the base station 100 decides to schedule a grant-based uplink transmission in the co-existence region 174. In such embodiments, the co-existence region 174 and the grant-based only region 176 may be preconfigured (e.g. the regions may be known in advance and/or may be communicated from the base station 100 to the UEs 102a-e).

In some embodiments, the UEs 102a-e may each be configured by the base station 100 to operate in grant-based transmission mode and/or grant-free transmission mode. In addition and/or as an alternative, the base station 100 may inform the UEs which resources have been dedicated as grant-free and/or grant-based resources. As a further addition and/or alternative the grant-free only region 172 and/or the co-existence region 174 may be preconfigured by the network. The information configuring the UEs 102a-e to operate in grant-based and/or grant-free transmission mode, and/or the information specifying which resources have been dedicated as grant-free and/or grant-based resources, may be transmitted to the UEs 102a-e in a downlink broadcast channel. For example, the information may be included as part of the system information, e.g. in a system information block (SIB).

In some embodiments, dynamic downlink control information may be sent by the base station 100 to switch UEs between a grant-free uplink transmission mode and a grant-based transmission mode. For example, UE 102e may initially be configured by the base station 100 to send only grant-based uplink transmissions. At a later time, the base station 100 may configure UE 102e to only send grant-free uplink transmissions. At a later time, the base station 100 may continue to allow UE 102e to send grant-free uplink transmissions, but also schedule a grant-based uplink transmission. UE 102e may later be configured by the base station 100 to send grant-free uplink transmissions, but to also be able to request grant-based uplink transmissions. As another example, UE 102a may initially be granted the ability to send both grant-based and grant-free uplink transmissions, but then at a later time the base station 100 may inform UE 102a that it can no longer send grant-free uplink transmissions. Other switching scenarios between grant-free and grant-based transmissions are possible.

In some embodiments, the grant-free only region 172, the grant-based only region 176, and the co-existence region 174 may be preconfigured and known to the UEs 102a-e (e.g. the base station 100 may inform the UE 102a-e of the regions). The base station 100 may perform resource configuration by scheduling transmissions in the grant-based only region 176 and the co-existence region 174.

In some embodiments, a retransmission scheme such as hybrid automatic repeat request (HARQ) may be used to perform retransmissions for the uplink transmissions from the UEs. For example, if the data 154 in the grant-free uplink transmission is not successfully decoded by the base station 100, then a retransmission may be performed by the UE 102a. The retransmission may be another grant-free uplink transmission, or the retransmission may be scheduled by the base station 100 (e.g. as a grant-based uplink transmission). The retransmission may include a retransmission of the initial data 154 and/or further information for decoding the initial data 154. For example, the retransmission data may include some or all of the initial data 154 and/or more parity information. The base station 100 may perform HARQ combining as follows: instead of discarding unsuccessfully decoded initial data 154, the unsuccessfully decoded initial data 154 may be stored at the base station 100 in memory and combined with received retransmission data to try to successfully decode the initial data. One type of HARQ combining that may be used is soft combining, such as chase combining or incremental redundancy. An acknowledgement (ACK) or negative acknowledgement (NACK) may be transmitted from the base station 100 to the UE 102a to indicate whether the data 154 has been successfully decoded. The ACK indicates to the UE 102a that the data 154 has been successfully decoded. The NACK indicates that a retransmission is required. A NACK may only be sent if activity detection is successful. The NACK may include identification information associated with UE 102a, e.g. an index that is indicative of the MA signature 152 used by UE 102a so that UE 102a knows that the NACK is for UE 102a. In some embodiments, a NACK is not sent by the base station 100, in which case the absence of an ACK indicates to UE 102a that retransmission is required. Rateless HARQ refers to the situation in which the UE 102a sends one or more retransmissions associated with data 154 without waiting for an ACK or NACK. Rateless HARQ may be useful in applications in which the UE 102a has to transmit data with low latency and high reliability. In rateless HARQ, UE 102a may stop sending retransmissions when it receives an ACK, or once the maximum allowed number of retransmissions has occurred, whichever happens first.

Some of the UEs 102a-e may need to transmit data to the base station 100 with lower latency than other UEs. For example, UE 102a may need to send data with lower latency compared to UE 102e. UE 102a may be an ultra-reliable low latency communication (URLLC) UE, whereas UE 102e may be an enhanced mobile broadband (eMBB) UE. UEs that are served by a base station and that require lower latency uplink communication (e.g. URLLC UEs) may be referred to as "low latency UEs". The other UEs (e.g. eMBB UEs) may be referred to as a "latency tolerant UEs". A latency tolerant UE may send grant-based uplink transmissions, whereas a low latency UE may send grant-free uplink transmissions. In some applications, a latency tolerant UE may be scheduled in either the grant-based only region 176 or co-existence region 174, and a low latency UE may use the grant-free only region 172 or the co-existence region 174. A massive machine type communication (mMTC) UE may be assigned different regions of the time-frequency resources 170 depending upon the application.

Figure 3:
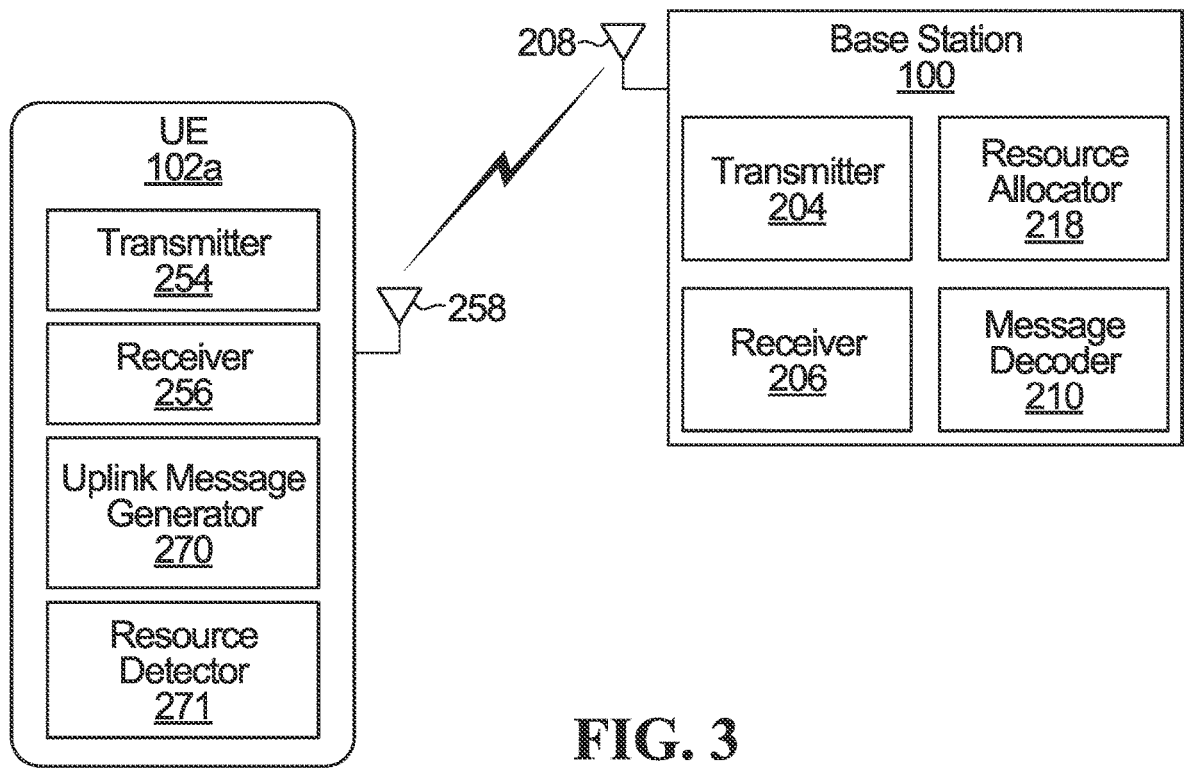
FIG. 3 is a block diagram showing the base station and a UE from FIG. 1 in more detail.

FIG. 3 is a block diagram showing the base station 100 and UE 102a of FIG. 1 in more detail. The base station 100 includes a transmitter 204 and a receiver 206 coupled to one or more antennas 208. Only one antenna 208 is illustrated. The transmitter 204 and the receiver 206 may be integrated as a transceiver. The base station 100 further includes an uplink message decoder 210 for decoding uplink transmissions from the UEs, e.g. for performing activity detection and data decoding. The message decoder 210 may be part of the receiver 206. The base station 100 further includes a resource allocator 218, which may perform operations such as: determining whether to grant resources to a particular UE (e.g. based on a scheduling request or a buffer status report from the UE), generating scheduling grants, determining which resources will be allocated as grant-free and/or grant-based resources, configuring grant-free uplink transmission time-frequency resource sets (e.g. generating control information indicating the configuration), and/or generating a semi-persistent scheduling grant. In some embodiments, the message decoder 210 may be part of the receiver 206, and/or the resource allocator 218 may be part of the transmitter 204.

The message decoder 210, the resource allocator 218, and/or any signal processing components of the transmitter 204 and receiver 206, may be implemented in the form of circuitry configured to perform the functions of the message decoder 210, the resource allocator 218, and/or the transmitter 204/receiver 206. In some implementations the circuitry includes a memory and one or more processors that execute instructions stored in the memory that cause the one or more processors to perform the operations of the message decoder 210, the resource allocator 218, and/or the transmitter 204/receiver 206. Alternatively, the message decoder 210, the resource allocator 218, and/or any signal processing components of the transmitter 204 and receiver 206, may be implemented using dedicated integrated circuitry, such as an application specific integrated circuit (ASIC), a graphics processing unit (GPU), or a programmed field programmable gate array (FPGA) for performing the operations of the message decoder 210, the resource allocator 218, and/or the transmitter 204/receiver 206. In yet other implementations, the functionality of the base station 100 described herein may be fully or partially implemented in software or modules stored in the memory and executed by the processor(s).

The UE 102a also includes a transmitter 254 and a receiver 256 coupled to one or more antennas 258. Only one antenna 258 is illustrated. The transmitter 254 and the receiver 256 may be integrated as a transceiver. The UE 102a further includes an uplink message generator 270 for generating messages to be transmitted in grant-based and/or grant-free uplink transmissions. Generating the uplink messages may include encoding and modulating the data to be transmitted in the message. The generated messages may include an indicator, such as a buffer status report, as described later. The uplink messages may be generated and transmitted according to a grant or semi-persistent grant received from the base station 100. In some embodiments, the UE 102a further includes a resource detector 271 to decode a received message that provides information relating to another UE's grant. The uplink message generator 270 may then use this information to generate an uplink message that uses resources and/or an MA signature that avoids a collision with the other UE's granted uplink transmission. In some embodiments, the uplink message generator 270 may be part of the transmitter 254 and/or the resource detector 271 may be part of the receiver 256.

The uplink message generator 270, resource detector 271, and/or any signal processing components of the transmitter 254 and receiver 256, may be implemented in the form of circuitry configured to perform the functions of the message generator 270, the resource detector 271, the transmitter 254 and/or receiver 256. In some implementations the circuitry includes a memory and one or more processors that execute instructions stored in the memory that cause the one or more processors to perform the operations of the message generator 270, the resource detector 271, and/or the transmitter 254/receiver 256. Alternatively, message generator 270, the resource detector 271, and/or any signal processing components of the transmitter 254 and receiver 256, may be implemented using dedicated integrated circuitry, such as an application specific integrated circuit (ASIC), a graphics processing unit (GPU), or a programmed field programmable gate array (FPGA) for performing the operations of the message generator 270, the resource detector 271, and/or the transmitter 254/receiver 256. In yet other implementations, the functionality of the UE 102a described herein may be fully or partially implemented in software or modules stored in the memory and executed by the processor(s).

The UEs 102b-e are not shown in detail in the figures, but UEs 102b-e have the same components as UE 102a illustrated in FIG. 3. Also, depending upon the embodiment, the UE 102a may be a target UE that is receiving a grant from the base station 100, and/or the UE 102a may be a UE wanting to send an uplink transmission and trying to avoid collision with another target UE.

Embodiments below describe mechanisms and signaling for switching between grant-based and grant-free uplink transmissions, including collision avoidance mechanisms.

In some embodiments, each of the UEs 102a-e may initially be configured or assigned by the base station 100 to operate in a grant-based and/or grant-free transmission mode (e.g. for grant-based and/or grant-free transmissions). The initial assignment may be sent via control information that may be broadcast in a broadcast channel, or sent to the UEs 102a-e using unicast signaling (e.g. via radio resource control (RRC) signaling), or sent using multicast signaling. The base station 100 may then use downlink control information to perform dynamic switching of the UEs 102a-e between grant-based and grant-free uplink transmission modes.

Grant-Free Uplink Transmission with Indicator

In some embodiments, a grant-free uplink transmission sent by a UE may include an indicator that is used by the base station 100 to make scheduling and/or other decisions, e.g. to determine whether to schedule a grant-based transmission for the UE. For example, the indicator may be a buffer status report (BSR). The BSR indicates whether the UE has data in its buffer to transmit to the base station 100, and optionally the BSR may provide an indication of how much data the UE has to transmit to the base station 100, regardless of the presence of data in the actual buffer. In some embodiments, the BSR may be part of the payload of the uplink message, alongside the packet transmission. In some embodiments, the BSR may be relatively short, e.g. possibly as simple as one bit indicating whether there are more packets to be transmitted by the same UE.

In some embodiments, the grant-free uplink transmission that includes the BSR may be a contention based scheduling request. The scheduling request requests that the base station 100 schedule uplink resources for the UE so that the UE can send a grant-based uplink transmission, and the BSR provides an indication of how much data the UE has to send. The BSR may be used by the base station 100 to determine how many resources to grant the UE.

The action taken by the base station 100 depends upon the scenario encountered. For example, if decoding of the grant-free uplink message is successful, and the BSR indicates that there is no data (or no further data) to be transmitted to the base station 100, then the base station 100 may transmit downlink control information (DCI) comprising an ACK. On the other hand, if decoding is successful and the BSR indicates that there is data (or is further data) to be transmitted to the base station 100, then the DCI may include an ACK together with a scheduling grant for the UE to transmit the additional data. If decoding is successful and the grant-free uplink message includes a scheduling request, then the DCI may include a scheduling grant for the UE to transmit the data.

If decoding of the grant-free uplink message fails, but the base station 100 is able to identify the UE that sent the grant-free uplink transmission (e.g. activity detection of the UE's reference signal is successful and is indicative of the UE), then the base station 100 may send a NACK to the UE that sent the grant-free uplink transmission. As discussed in more detail later, the NACK may be broadcast so that other UEs can also decode the NACK. Alternatively, the NACK may be sent to the UE in a unicast transmission or sent to a group of UEs in a multicast transmission. In some embodiments, the NACK may also include information scheduling or rescheduling the UE's retransmission resource and MA signature assignment.

The DCI, such as the ACK and/or NACK, may be sent in a downlink control channel, or in another downlink channel that is dedicated to sending ACK/NACK messages, e.g. a physical hybrid-ARQ indicator channel (PHICH).

If decoding of the grant-free uplink message fails, and the base station 100 is not able to identify the UE that sent the grant-free uplink transmission, then the base station 100 may not send any transmission in response to the grant-free uplink message. The UE may then retransmit the grant-free uplink message on subsequent grant-free resources.

In some embodiments, a UE may have data (or additional data) to send to the base station 100, and so the UE may send an initial uplink message having a BSR. The base station 100 may successfully decode the initial uplink message and send DCI including an ACK, but not including a scheduling grant. In this scenario, the UE interprets the absence of a scheduling grant as an indication that the subsequent data transmission is to be sent using grant-free resources.

Figure 4:
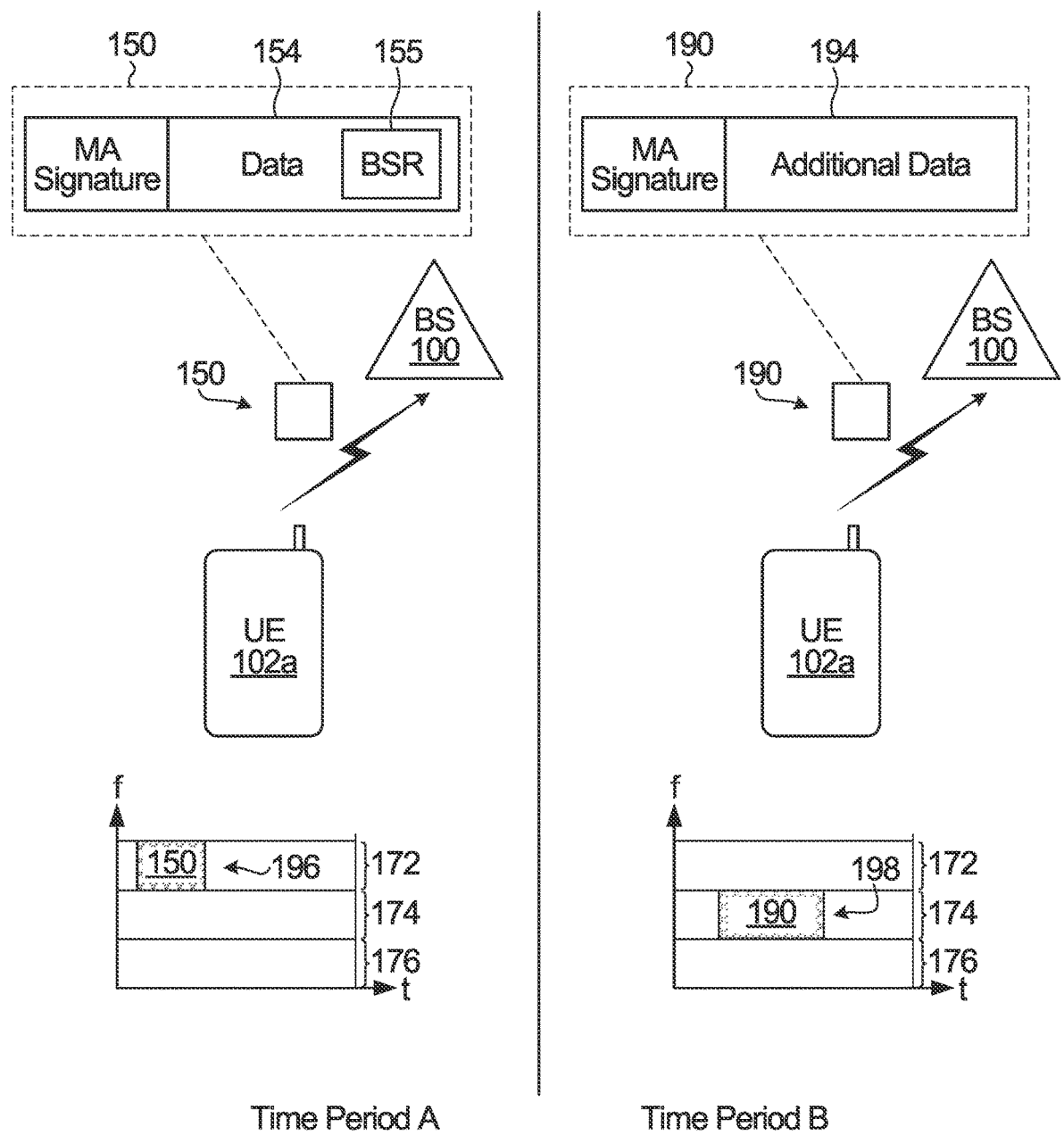
FIG. 4 illustrates an example scenario in which a UE sends a buffer status report (BSR)

FIG. 4 illustrates one example scenario in which UE 102a sends a BSR. During time period A, message 150 is sent by UE 102a via a grant-free uplink transmission. The data 154 in message 150 includes a BSR 155. The BSR 155 indicates to the base station 100 that UE 102a has additional data 194 to send to the base station 100. The additional data 194 may be additional packets that could not fit in message 150, or the additional data 194 may be the remaining portion of a packet that was only partially sent in message 150. The message 150 is transmitted using resources 196 in grant-free region 172. Because the BSR 155 indicates that UE 102*a* has additional data 194 to send to the base station 100, the base station 100 therefore schedules a grant-based uplink transmission on resources 198 in subsequent time period B. The grant-based uplink transmission is scheduled in the co-existence region 174, e.g. because the grant-only region 176 was already fully scheduled. Message 190, which includes the additional data 194, is transmitted on resources 198 during time period B.

In a variation of FIG. 4, the message 150 is instead a contention-based scheduling request, and so instead of data 154, the message 150 includes a scheduling request and the BSR 155. The subsequent grant-based uplink message 190 includes data 154 and additional data 194, or data 154 and/or 194 are transmitted in several subsequent grant-based uplink messages.

Figure 5:
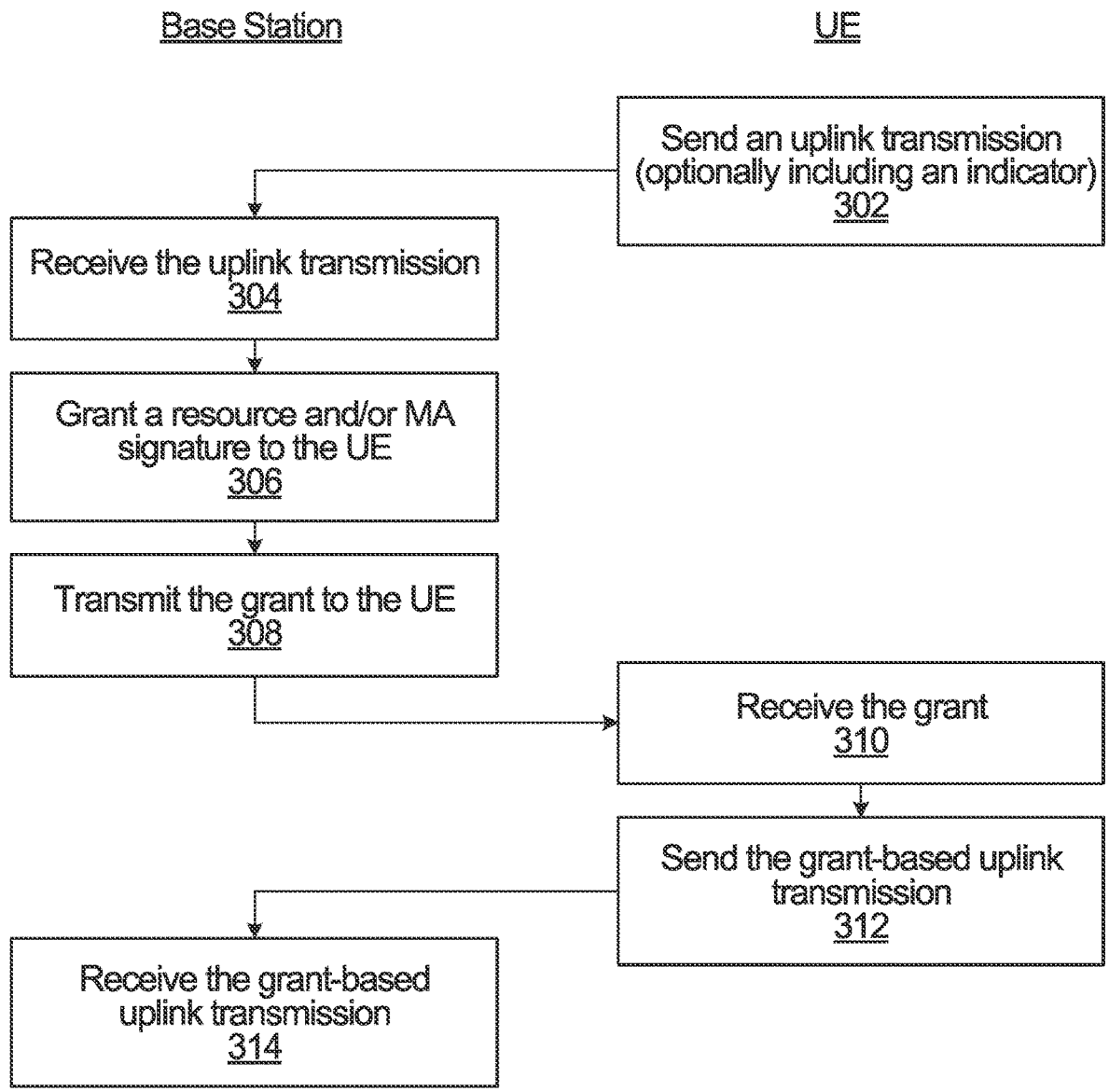
FIG. 5 is a flow chart of a method performed by a base station and a UE, according to one embodiment.

The indicator sent in the grant-free uplink transmission does not have to be a BSR, or it may include other information in addition to the BSR. For example, the indicator may include an indication of whether or not the additional data in in the buffer of the UE is low latency data. The low latency data can be part of a low latency UE application (e.g. a URLLC application). In some embodiments, the indicator may indicate different applications, e.g., whether the additional data is part of a URLLC application or an eMBB application. The base station 100 may use the information from the indicator to determine how soon the base station 100 has to schedule the grant-based uplink transmission, or whether to schedule the grant-based uplink transmission at all because for some low latency data it may be beneficial if the UE continues to send the data in grant-free uplink transmissions. The indicator may provide an indication as to whether or not the UE prefers that the additional transmission be sent in a grant-based uplink transmission. The indicator may provide an indication of whether it is desired by the UE to switch from grant-free transmission mode to grant-based transmission mode. Finally, in the examples above, the indicator (e.g. the BSR 155) is sent as part of a grant-free uplink transmission. It is understood that the indicator could also be sent in a different or separate uplink transmission. For example, the indicator could also be transmitted as part of a grant-based uplink transmission and/or as part of a contention free scheduling request. In some embodiments, the indicator may be sent in a grant-based transmission, e.g., as part of the scheduling request (SR). The SR can be sent in an uplink control channel as part of uplink control information. FIG. 5 is a flow chart of a method performed by a base station and a UE, according to one embodiment. In step 302, the UE sends an uplink transmission. The uplink transmission may be a grant-free uplink transmission. The uplink transmission may include an indicator. The indicator may be or include a BSR. In step 304, the base station receives the uplink transmission. In response to the uplink transmission, in step 306 the base station grants resources and/or an MA signature to the UE for use in sending a grant-based uplink transmission. If the uplink transmission sent in step 302 includes an indicator, such as a BSR, then step 306 may be performed in response to the indicator in the uplink transmission. In step 308, the base station transmits the grant to the UE. In step 310, the UE receives the grant. In step 312, the UE sends the grant-based uplink transmission according to the grant. In step 314, the base station receives the grant-based uplink transmission.

Collision Avoidance

When a UE sends a grant-free uplink transmission, the base station 100 may schedule a subsequent transmission as a grant-based uplink transmission. The subsequent grant-based uplink transmission may be a transmission of new data or a retransmission of previous data. For example, as discussed earlier in relation to FIG. 4, UE 102*a* may send message 150 on a grant-free uplink transmission, and the base station 100 may then schedule a grant-based uplink transmission for subsequent message 190. Subsequent message 190 could be a retransmission of initial data 154 in some embodiments.

If the grant-based uplink transmission is scheduled in a grant-based only region, e.g. region 176 in FIG. 2, then typically the scheduled uplink transmission should not collide with another uplink transmission being sent by another UE. This is because the base station 100 schedules UE transmissions in the grant-based only region, and the base station 100 typically would not schedule different UEs on the same resources.

However, if the grant-based uplink transmission is instead scheduled in a co-existence region, e.g. region 174 in FIG. 2, then there is a possibility of a collision with a grant-free uplink transmission sent by another UE in the co-existence region.

In some embodiments, when a grant-based uplink transmission is scheduled for a target UE in a co-existence region, then information relating to that grant is sent to at least one other UE that is permitted to send grant-free uplink transmissions in the co-existence region. For example, the grant may be broadcasted to both the target UE and all UEs permitted to send grant-free uplink transmissions in the co-existence region. By 'broadcasted to', it is meant that the the grant may be targeting one or more UEs, but the grant may be listened to by one other, a group of, or all other UEs (such as all the UEs permitted to send grant-free uplink transmissions). The UEs permitted to send grant-free uplink transmissions in the co-existence region decode the information relating to the target UE's grant and then avoid the resources and/or MA signature (e.g. reference signal) granted to the target UE, in order to try to mitigate collision with the granted uplink transmission of the target UE. In some embodiments, the target UE may be a UE that has requested a grant and is being opportunistically scheduled in the co-existence region 172, and in other embodiments the target UE may be a UE that sent a grant-free uplink initial transmission and is having an additional transmission (a new transmission or a retransmission) scheduled in the co-existence region 172.

In some embodiments, a target UE may send an initial grant-free uplink transmission, e.g. in co-existence region 174 or in grant-free only region 172 in FIG. 2. The base station 100 may send a NACK indicating that a retransmission relating to the target UE's initial grant-free uplink transmission is required. The NACK may be broadcasted to, and decodable by, both the target UE and other UEs permitted to send grant-free uplink transmissions. In response to the NACK, a retransmission may be sent by the target UE via a grant-free uplink transmission in the co-existence region 174 or in the grant-free only region 172. The other UEs permitted to send grant-free uplink transmissions, and who also decoded the NACK, may use information learned from the NACK to try to avoid a collision with the retransmission of the target UE. As one example, if the NACK includes an MA signature index indicating the MA signature used by the target UE, then the other UEs may be able to determine which MA signature will be used for the retransmission of the target UE. For example, there may be a known mapping between MA signatures used for initial and retransmissions. The other UEs may then avoid choosing an MA signature that is the same as the MA signature that will be used for the retransmission of the target UE. As another example, the UEs may be able to determine from the NACK which uplink resources will be used by the target UE to send a retransmission, e.g. based on a known mapping relationship between initial and retransmission resources. The other UEs may then avoid transmitting on the same resources that will be used for the retransmission of the target UE. As another example, if the NACK includes a pilot index, and it is known by the UEs that the same pilot is to be used for both initial and retransmissions, then the other UEs may avoid using the pilot indicated by the pilot index in the NACK.

In some embodiments, an initial grant-free uplink message sent by a target UE may include a BSR or other indicator mentioned above (e.g. the indicator in step 302 of FIG. 5). In some embodiments, the initial grant-free uplink message may include a scheduling request.

Once the initial grant-free uplink message is received, the base station 100 may be able to schedule an additional transmission (e.g. a retransmission or a new transmission) for the target UE in the co-existence region with almost no possibility of collision for the following reason. Prior to arrival of the initial grant-free message by the target UE, the base station 100 has detected other UEs who have sent uplink transmissions in the co-existence region. The base station 100 can therefore reassign/reshuffle the resources and MA signatures used by these previously detected other UEs to try to avoid a collision with the additional transmission to be sent by the target UE. The base station 100 can also or instead schedule the additional transmission by the target UE on resources the base station 100 knows are different from those being used by the previously detected other UEs. The base station 100 can also or instead control which resources are granted to UEs for other grant-based uplink transmissions and choose resources in such a way so as to avoid a collision with the additional transmission of the target UE. The base station 100 can further broadcast information relating to the additional transmission (e.g. a NACK or ACK for the initial grant-free uplink message and/or a grant for the additional transmission), and the other UEs sending grant-free uplink transmissions in the co-existence region can receive or decode this information and avoid using a resource and/or a MA signature used by the target UE for the additional transmission. However, a collision may still sometimes occur. Example situations in which a collision may still occur include: another UE does not successfully receive or decode the information relating to the additional transmission, or another UE has to access a grant-free resource immediately and there is not another grant-free resource available and it is not possible to delay to avoid the additional transmission of the target UE.

In some embodiments, the base station 100 may decide to opportunistically schedule a grant-based uplink transmission for a target UE in the co-existence region 174. The target UE need not necessarily have sent an initial grant-free uplink transmission. On the contrary, the target UE may be operating in grant-based transmission mode, and the base station 100 may have scheduled the target UE in the co-existence region 174 because the grant-based only region 176 is already assigned to other UEs. As above, information relating to the target UE's grant may be sent to at least one other UE that is permitted to send grant-free uplink transmissions in the co-existence region 174. For example, the grant for the target UE may be broadcasted to, and/or decodable by, both the target UE and all UEs permitted to send grant-free uplink transmissions in the co-existence region 174. The UEs permitted to send grant-free uplink transmissions in the co-existence region 174 then avoid the resources and/or MA signature (e.g. reference signal) granted to the target UE in the grant, in order to try to mitigate collision with the granted uplink transmission of the target UE.

In some embodiments, a target UE may send a grant-free uplink transmission to the base station 100, and in response the base station 100 may send a grant to the target UE that schedules a grant-based uplink transmission for the target UE in the co-existence region. As discussed above, the grant (or information relating to the grant) may be broadcasted so that other UEs permitted to send grant-free uplink transmissions may decode the information and try to avoid a collision with the target UE's granted uplink transmission. In addition to the base station 100 scheduling a grant-based uplink transmission for the target UE, the base station 100 may opportunistically schedule a grant-based uplink transmission for a second UE in the co-existence region. The second UE may be a UE operating in grant-based transmission mode. The information relating to the second UE's scheduling grant may also be broadcasted so that the other UEs permitted to send grant-free uplink transmissions may also decode the second UE's grant information and also try to avoid a collision with the second UE's granted uplink transmission.

A communication system may have UEs operating in grant-based transmission mode (e.g. delay tolerant UEs, such as eMBB UEs or mMTC UEs), and UEs operating in grant-free transmission mode (e.g. low latency UEs, such as URLLC UEs). A UE operating in grant-based transmission mode will be referred to as a "GB UE". A UE operating in grant-free transmission mode will be referred to as a "GF UE". In one embodiment, a scheduling grant (or information relating to a scheduling grant) for a GB UE may be broadcasted by the base station, and information relating to a future transmission of a first GF UE may also be broadcasted by the base station in downlink control information. Then, before an initial grant-free uplink transmission, other GF UEs decode the broadcasted information for the GB UE and the first GF UE, and then use resources and/or MA signatures that avoid a collision with a future uplink transmission of the GB UE and/or the first GF UE.

Depending upon the implementation, mMTC UEs may be grant-based UEs or grant-free UEs. For example, in some applications, the grant-based UEs may be eMBB UEs and the grant-free UEs may be mMTC UEs.

Semi-Persistent Scheduling Grant

In some embodiments, a UE may only operate in grant-based transmission mode and may have dedicated resources for making a contention-free scheduling request. When the scheduling request is received by the base station 100, the base station 100 transmits a grant to the UE that grants uplink resources for the UE to transmit data via a grant-based uplink transmission. Alternatively, in some embodiments, a UE may send a contention based scheduling request, e.g. as a grant-free uplink transmission, as described earlier. When the contention-based scheduling request is received by the base station 100, the base station 100 transmits a grant to the UE that grants uplink resources for the UE to transmit data via a grant-based uplink transmission. Alternatively, in some embodiments, and as also described earlier, a UE may send a grant-free uplink message to the base station. In response, the base station 100 may grant to uplink resources for the UE to transmit additional data via a grant-based uplink transmission. The additional data may be a retransmission of the data in the grant-free uplink message. Alternatively, the additional data may be or include new data that the UE has to transmit to the base station 100, in which case the grant-free uplink transmission may include a BSR indicating that the UE has the additional data to send.

Figure 6:
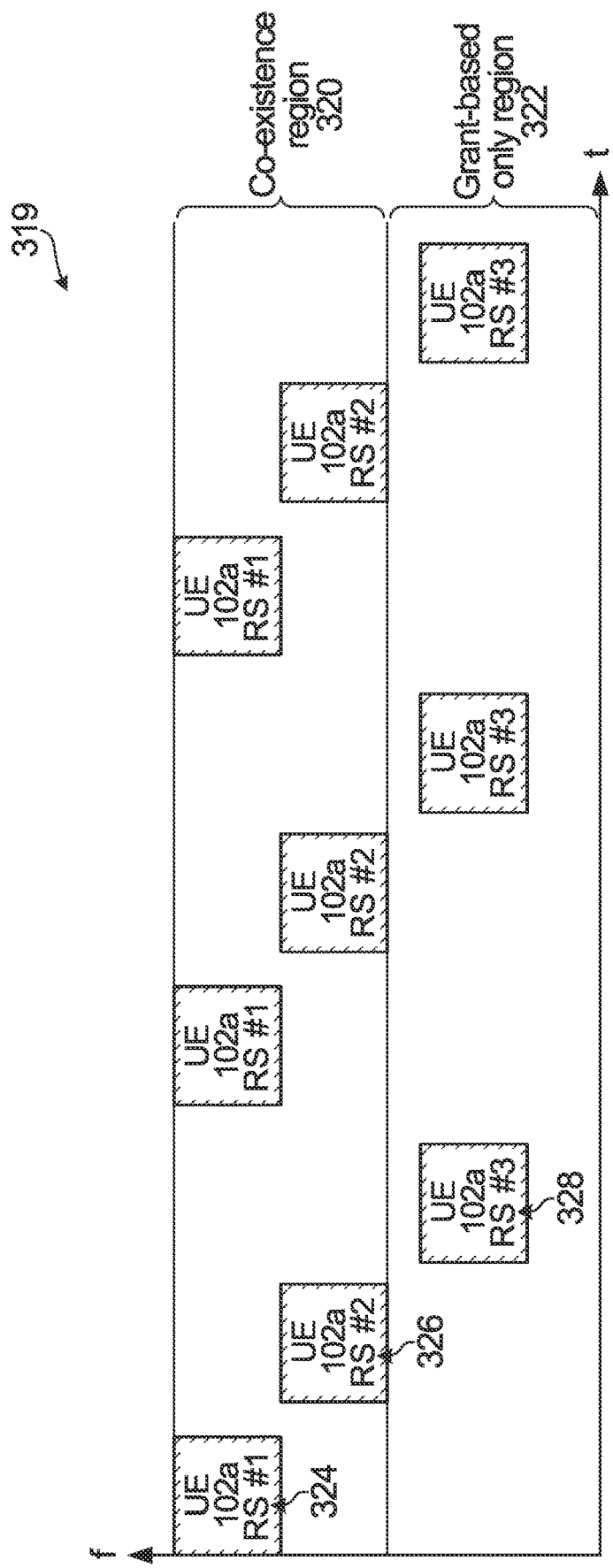
FIG. 6 illustrates a set of time-frequency resources, showing a semi-persistent scheduling grant, according to one embodiment.

In all of the different scenarios discussed in the paragraph above, the base station 100 sends a grant to the UE. In some embodiments, the grant may be a semi-persistent grant. A semi-persistent grant is a grant that schedules more than one transmission, e.g. a pattern of transmissions. As an example, a semi-persistent grant may grant a particular resource hopping pattern and/or particular reference signal hopping pattern for a set time or interval, or until the UE receives further signaling. As an example, FIG. 6 illustrates a set of time-frequency resources 319 partitioned into a co-existence region 320 and a grant-based only region 322. UE 102a has been issued a semi-persistent scheduling grant in which UE 102a is to send a first uplink transmission on resources 324 using reference signal #1, and then a second uplink transmission on resources 326 using reference signal #2, and then a third uplink transmission on resources 328 using reference signal #3. This uplink transmission pattern is then repeated, as illustrated, until the UE 102a receives further signaling from the base station 100 indicating that the UE 102a is to stop the uplink transmission pattern.

In some embodiments, a semi-persistent scheduling grant for a target UE may be broadcasted to other UEs that are permitted to send grant-free uplink transmissions in order to assist with collision avoidance in the manner discussed above. For example, the semi-persistent scheduling grant assigned to UE 102a in FIG. 6 may be received and/or decoded by all other UEs that may send grant-free uplink transmissions in the co-existence region 320. The other UEs could then avoid using resources 324 and 326, and/or the other UEs could avoid using reference signals #1 and #2 (and/or another reference signal non-orthogonal to reference signals #1 and #2) at the same time/frequency as reference signals #1 and #2 are used by UE 102a.

In some embodiments, the semi-persistent scheduling grant may comprise an index that informs the target UE which resource and/or reference signal hopping pattern to use. For example, it may be predetermined and known by the base station 100 and the UEs that "index 1" corresponds to the hopping pattern shown in FIG. 6, that "index 2" corresponds to another hopping pattern, and so on. The base station 100 then only needs to transmit "index 1" to UE 102a to assign the semi-persistent scheduling grant shown in FIG. 6. This may reduce the number of bits required to transmit a semi-persistent scheduling grant. However, the grant may not need to be a semi-persistent grant and/or need not have such a format. For example, the grant may explicitly include the typical information found in a grant, e.g. the modulation and coding scheme (MCS) to use, the resources to use, etc. In any case, the grant (or information relating to the grant) may still be received by other UEs for collision avoidance in the manner described above.

In some embodiments, the semi-persistent scheduling grant may include ACK/NACK information. For example, UE 102a may initially send a grant-free uplink transmission with data that is incorrectly decoded by the base station 100. In response, the base station 100 then transmits to UE 102a "index 1" along with a NACK. The UE 102a then sends retransmissions of the data using the hopping pattern corresponding to "index 1" (i.e. the one shown in FIG. 6) until the UE 102a receives an ACK from the base station 100. In some embodiments, if the UE 102a receives a NACK when sending the retransmissions using a preconfigured hopping pattern (e.g. "index 1"), then the UE 102a switches to another hopping pattern (e.g. "index 2") to continue the retransmissions. In this way, in some embodiments, a base station 100 may use ACK/NACK to exercise some control over the retransmissions: an ACK may be used to stop the retransmissions, a NACK may be used to change the retransmission pattern used, and the absence of an ACK or NACK causes the UE to continue the assigned hopping pattern.

In some embodiments, the resources in a hopping pattern of a semi-persistent scheduling grant do not necessarily need to be dedicated to just the UE receiving the semi-persistent scheduling grant. For example, the grant of resources 324 and 326 in FIG. 6 need not necessarily be dedicated to just UE 102a. Resources 324 and 326 may be shared by a group of UEs, including the target UE, which are all making retransmissions using grant-free uplink transmissions.

In some embodiments, a semi-persistent scheduling grant does not have to be explicitly sent to the UE. For example, the UE may send an initial grant-free uplink transmission and then automatically perform grant-free retransmissions until the UE receives an ACK to stop. The retransmission may be transmitted based on a preconfigured resource hopping pattern.

From the perspective of the UE, the following may be achieved. In some embodiments, after receiving a semi-persistent scheduling grant, a UE may perform retransmissions until further signaling to stop (e.g. an ACK) is received by the UE. In some embodiments, other UEs permitted to send grant-free uplink transmissions decode the broadcasted DCI that is targeting a UE in a grant-free or co-existence region. If the DCI contains an explicit grant for transmission or retransmission for a target UE, then the other UEs try to avoid the physical time-frequency resource and/or MA signature assigned for the target UE. Some DCI may not contain an explicit grant, but the other UEs may still be able to derive the target UE's behavior from a predefined assignment inferred from the DCI. For example, the DCI may be an indication that the target UE is to switch to a different hopping pattern, and the other UEs may be able to infer which hopping pattern the target UE is to switch to based on a known relationship between hopping patterns (e.g. if in hopping pattern 1, then the UE can only switch to hopping pattern 2). The other UEs may then avoid the time-frequency resources and/or MA signatures used by the target UE in the new hopping pattern.

In some embodiments, if the other UEs decode an ACK that is sent to the target UE without further scheduling, then the other UEs know that the target UE's resources are released—i.e. no further retransmissions are required by the target UE. The other UEs may then use the released resources that were being occupied by the target UE for making the retransmissions. For example, target UE 102a may be sent a semi-persistent grant assigning the hopping pattern shown in FIG. 6. The other UEs sending grant-free uplink transmissions in the co-existence region 320 may avoid the resources/references signals used by UE 102a in the hopping pattern to try to avoid a collision with UE 102a's uplink transmissions. Once UE 102a's data has been successfully received and/or decoded, the base station 100 then transmits an ACK to UE 102a, which ends UE 102a's semi-persistent scheduling grant. The other UEs sending grant-free uplink transmissions in the co-existence region 320, and who successfully receive and/or decode the ACK, can determine from the ACK that the semi-persistent scheduling grant for UE 102*a* has ended. The other UEs therefore know that the resources used by UE 102*a*'s semi-persistent scheduling grant are now free to use.

In some embodiments, a UE may not automatically send retransmissions while waiting to receive an ACK. Instead, after sending an uplink transmission of data, the UE may wait for an ACK/NACK or DCI grant from the base station 100 before sending a retransmission. The retransmission may be grant-free or grant based depending upon the signalling from base station 100.

In some embodiments, the base station 100 may assign grant-free resources and/or send other downlink control information to a group of UEs via a group message multicast to that group of UEs. For example, the base station 100 may want to assign UEs 102*a-e* in FIG. 1 to a particular partition of time-frequency resources, so that UEs 102*a-e* can share that partition of time-frequency resources to send their grant-free uplink transmissions. The base station 100 can therefore send a multicast or group control message that is received by each of UEs 102*a-e*, and that instructs each of UEs 102*a-e* to use the partition of time-frequency resources for their grant-free uplink transmissions. As another example, the group control message may indicate to UEs 102*a-e* that they are no longer permitted to send grant-free uplink transmissions. As another example, the group control message may assign particular MA signatures (e.g. reference signals) to the UEs 102*a-e*. As another example, the group control message may assign a particular resource hopping pattern and/or reference signal hopping pattern to the UEs 102*a-e*. In any case, the group control message may be multicasted to just UEs 102*a-e*, or the control message may be broadcasted to other UEs also and decodable by the other UEs so that the other UEs may try to avoid collisions, e.g. by not using the resources and/or reference signals assigned to UEs 102*a-e*.

In some embodiments, the base station 100 may send a group or multicast downlink control message granting a transmission and/or retransmission to a group of UEs. For example, UEs 102*a-e* may each send a grant-free uplink transmission. The grant-free uplink transmissions for UEs 102*a* and 102*b* are not correctly decoded by the base station 100. The base station 100 therefore transmits a group control message scheduling a retransmission for both UE 102*a* and UE 102*b*. As another example, UEs 102*a-e* may each send a grant-free uplink transmission with a BSR. The BSRs indicate that UEs 102*d* and 102*e* have more data to send. The base station 100 therefore transmits a group control message scheduling a new transmission for both UE 102*d* and UE 102*e*. In any case, in some embodiments the group control message may grant particular grant-free time-frequency resources and/or MA signature (e.g. reference signal) resources. In some embodiments, the group control message may grant a resource hopping pattern and/or a reference signal hopping pattern to be used by the target UEs. Also, as described earlier, other UEs which successfully receive and/or decode the group control message can try to mitigate collisions by avoiding the resources and/or reference signals granted to the target UEs.

In some embodiments, the information indicating resources and/or MA signatures granted to UEs may be present in a common control channel. For example, if a particular time-frequency resource and reference signal is granted to UE 102*a* in the co-existence region, then the grant may be broadcast by being sent in a common control channel. The UEs know in advance where to find the grant in the common control channel. Target UE 102*a* decodes the grant in the common control channel. Other UEs permitted to send grant-free uplink transmissions in the co-existence region also decode the grant in the common control channel so that the other UEs can avoid using the time-frequency resource and/or reference signal granted to UE 102*a*.

In some embodiments, the base station 100 may preconfigure or schedule a resource hopping pattern and/or a reference signal hopping pattern for UE 102*a* to use for any grant-free uplink transmissions. UE 102*a* reads the common control channel to determine if there is signaling indicating a resource or reference signal to avoid. For example, if UE 102*c* has been granted resource A and reference signal #1, then UE 102*a* would ideally want to avoid using resource A and reference signal #1. As another example, if UE 102*d* has been granted a particular resource hopping pattern and/or reference signal hopping pattern, then UE 102*a* would ideally want to avoid the hopping pattern granted to UE 102*d*. Therefore, in some embodiments, UE 102*a* changes its resource hopping pattern and/or reference signal hopping pattern after reading the common control channel. For example, UE 102*a* may switch to a new hopping pattern and inform the base station 100 that it has changed its hopping pattern. As another example, UE 102*a* may request that the base station 100 assign a new hopping pattern, and then wait for the base station 100 to assign a new hopping pattern.

In some embodiments, a UE may perform an initial grant-free uplink transmission, followed by subsequent transmissions or retransmissions of the initial data before receiving or necessarily even waiting for a NACK or ACK. The subsequent transmissions sent by the UE may use predefined resources or a scheduled resource hopping pattern. For example, the UE may be assigned a hopping pattern of shared resources to be used for grant-free uplink transmissions. The UE may use the hopping pattern of resources to send grant-free uplink retransmissions until an ACK is received. However, in some embodiments, if an ACK is not received after a particular number of retransmissions (e.g. a few retransmissions), then the UE may listen to a common broadcast channel, which may reschedule the UE to a new resource hopping pattern and/or new reference signal hopping pattern, or may tell the UE to avoid using certain resources and/or reference signals. The UE may then change the resource hopping pattern and/or reference signal hopping pattern used for one or more subsequent uplink transmissions. In some embodiments, the common broadcast channel may tell the UE to increase the UE's transmission power and/or reduce the modulation and coding scheme (MCS) used for subsequent retransmissions. In this way, the base station 100 may use downlink control information (e.g. in a common broadcast channel) to modify a UE's retransmissions, such as change a resource or MA signature hopping pattern used by the UE and/or modify the transmit power and/or MCS of the UE.

Switching from Grant-Free to Grant-Based Uplink Transmission

In some embodiments, when a UE sends a grant-free uplink transmission, in response the base station 100 may schedule a grant-based uplink transmission for the UE. As one example, and as described earlier in relation to FIG. 4, a UE may send a grant-free uplink transmission with a BSR indicating that the UE has more data to send to the base station 100. In response, the base station may then schedule a grant-based uplink transmission for the UE. The grant-based uplink transmission may be a scheduled transmission of a new transport block (TB) (e.g. a new packet). As another example, a UE may send an initial grant-free uplink transmission, and the data in the initial grant-free uplink may be unsuccessfully decoded by the base station 100. In response the base station 100 may send a grant (or semi-persistent grant) for the UE to send one or more retransmissions. Scheduling an uplink transmission for a UE in response to receiving a grant-free uplink transmission may be referred to as a "grant-free to grant-based switch", i.e. a grant-free uplink transmission is received from a UE, and in response a grant-based uplink transmission is scheduled for that UE. A grant-free to grant-based switch may be performed by sending a scheduling grant (or semi-persistent scheduling grant) to the UE that sent the grant-free uplink transmission. In response to the scheduling grant, the UE switches from performing grant-free transmission/retransmission to grant-based transmission/retransmission using resources defined in the scheduling grant.

The grant to switch grant-free to grant-based transmission or grant-based retransmission can be sent in DCI, where the CRC of the DCI is masked or scrambled with a UE ID, e.g. a cell radio network temporary ID (C RNTI) or grant-free (GF) RNTI. The C RNTI and GF RNTI may be assigned in RRC signaling. The C RNTI is the same RNTI assigned for grant-based transmission, which is used to mask the CRC of DCI used for a regular uplink scheduling grant. The GF RNTI may be assigned for control signalling with respect to grant-free transmission (e.g. masking a CRC of a DCI with respect to grant-free transmission). In some embodiments, the GF RNTI is different than the C RNTI. In some embodiments, there is no separate GF RNTI defined, and instead the C RNTI is used for the GF RNTI. The DCI grant to switch grant-free to grant based transmission or grant-based retransmission may indicate a HARQ process ID to identify which TB is to be retransmitted or which HARQ process ID is used for the new TB transmission.

In some embodiments, the base station 100 may perform a grant-free to grant-based switch based under certain conditions. Any one condition, or any combination of conditions discussed herein may be used by the base station 100 to determine whether to perform a grant-free to grant-based switch. Example conditions include:

(1) The grant-free message includes a BSR indicating the UE has data (or more data) to send. In response, the base station 100 may perform a grant-free to grant-based switch.
and/or
(2) The data in the grant-free message is unsuccessfully decoded. In response, the base station 100 may perform a grant-free to grant-based switch.
and/or
(3) Latency requirement. If a UE is close to its latency bound, then the base station 100 may perform a grant-free to grant-based switch. Otherwise, the base station 100 may not perform the switch, in which case the base station 100 may just send an ACK or NACK without a scheduling grant, or the base station 100 may not send anything. Any subsequent transmissions (or retransmissions) by the UE may then be sent via grant-free uplink transmissions. More generally, regardless of latency requirement, if the base station 100 determines that a grant-free to grant-based switch for a UE is not to be performed, then that UE may continue grant-free transmissions/retransmissions.
and/or
(4) Number of transmissions. For example, if a UE has sent several (e.g. three) retransmissions of data via grant-free uplink transmission, and decoding of the data by the base station still fails, then the base station may perform a grant-free to grant-based switch by sending a scheduling grant for the next retransmission. In some embodiments, the number of retransmissions may be determined by a reference signal identification (e.g. the reference signal used in the retransmission) or by a separate indicator sent by the UE in the grant-free uplink transmission.
and/or
(5) The UE may send an indicator that indicates whether the UE desires to switch to grant-based uplink transmission, based on the UE's known circumstances or requirements (e.g., the UE's latency requirement, traffic load, channel conditions, etc.). The base station 100 may perform a grant-free to grant-based switch if the UE indicates a desire to switch to grant-based uplink transmission.
and/or
(6) The traffic load of grant-free UEs, e.g. the number of grant-free UEs that arrive in a current or recent subframe(s). If the number of grant-free uplink transmissions and/or the number of UEs permitted to send grant-free uplink transmissions exceeds a certain threshold, then in response a grant-free to grant-based switch may be performed for one or more UEs.
and/or
(7) If there is a potential future collision from a currently detected UE operating in grant-free transmission mode, then a grant-free to grant-based switch may be performed to try to avoid the potential future collision.
and/or
(8) Quality of Service (QoS) requirements. Depending upon the QoS requirements of a UE sending a grant-free uplink transmission, a grant-free to grant-based switch may be performed for that UE.

As is clear from embodiments described earlier, it will not always be the case that a grant-free to grant-based switch is performed for a target UE. Sometimes a target UE may send a grant-free uplink transmission, and in response a grant-based uplink transmission may not be scheduled by the base station. Rather, subsequent uplink transmissions of the target UE may still be grant-free. Some examples of such situations are described earlier. A few more examples are as follows.

In some embodiments, a target UE sends a grant-free uplink transmission with a BSR indicating that the target UE has data (or additional data) to send to the base station 100. In some embodiments, the grant-free uplink transmission may be a contention-based scheduling request, or the grant-free uplink transmission may include initial data (e.g. as in message 150 of FIG. 1). The base station 100 correctly decodes the grant-free uplink transmission but decides not to perform a grant-free to grant-based switch. Therefore, the base station 100 sends an ACK to the target UE without a scheduling grant. The subsequent data from the target UE is therefore transmitted in subsequent grant-free uplink transmissions. As described earlier, the ACK may be broadcast to other UEs permitted to send grant-free uplink transmissions for the purpose of collision avoidance. For example, the other UEs permitted to send grant-free uplink transmissions may be able to derive from the ACK a future MA signature and/or future resource the target UE may use for the subsequent grant-free uplink transmissions.

In some embodiments, a target UE sends a grant-free uplink transmission (that may or may not include a BSR) to the base station 100. The base station 100 is unable to successfully decode the data of the grant-free uplink transmission, but is able to identify the UE that sent the grant-free uplink transmission (e.g. activity detection of the UE's reference signal is successful and is indicative of the UE). The base station 100 decides not to perform a grant-free to grant-based switch. The base station 100 therefore sends a NACK to the target UE without a scheduling grant. Retransmissions from the target UE are performed using grant-free uplink transmissions. As described earlier, the NACK may be broadcast to other UEs permitted to send grant-free uplink transmissions for the purpose of collision avoidance. In some embodiments, the base station 100 may not even send a NACK, in which case the absence of an ACK means to the target UE that a retransmission should be performed via a grant-free uplink transmission.

In some embodiments, a target UE sends an initial grant-free uplink transmission (that may or may not include a BSR) to the base station 100. The base station 100 is unable to successfully decode the data of the initial grant-free uplink transmission and is unable to identify the UE that sent the initial grant-free uplink transmission. The base station 100 does not send any response to the initial grant-free uplink message. No grant-free to grant-based switch is performed. The target UE sends a subsequent grant-free uplink transmission. The subsequent grant-free uplink transmission may carry the same data as the initial grant-free uplink transmission, or the subsequent grant-free uplink transmission may be a retransmission of the data in the initial grant-free uplink transmission.

Grant-Free Repetitions and Grant-Free to Grant-Based Switch

As mentioned above, in some embodiments a UE may perform an initial grant-free uplink transmission of data, followed by subsequent transmissions or retransmissions of the initial data before receiving or necessarily even waiting for a NACK or an ACK. For example, in some embodiments, UE 102a may be configured to send an initial transmission of a transport block (TB) (e.g. of a packet, such as message 150), and then automatically perform subsequent transmissions of the TB via subsequent grant-free uplink transmissions. The automatic grant-free subsequent transmissions will be referred to as performing repetitions of the TB. That is, an initial uplink transmission of the TB may be performed, followed by repetitions of the TB using subsequent grant-free uplink transmissions.

In some embodiments, the repetitions of the TB may use different redundancy versions compared to the initial transmission, e.g. RV 0 for the initial transmission of the TB, RV 1 for the first repetition of the TB, RV 2 for the second repetition of the TB, etc. However, the redundancy versions do not have to be different. In some embodiments, repetitions of the TB may use different MCS, e.g. the initial transmission may have a high MCS, the first repetition may have a lower MCS, the second repetition may have an even lower MCS, etc. However, the MCS of different repetitions do not have to be different.

In some embodiments, the repetitions may be performed on preconfigured resources or preconfigured hopping patterns. For example, based on the grant-free resources used by UE 102a to send the initial grant-free uplink transmission, there may be fixed future resources predetermined in advance for sending any repetitions related to the initial grant-free uplink transmission. For example, if the initial grant-free uplink transmission uses time-frequency location A in a first transmission time interval (TTI), then the first repetition is sent at time-frequency location B in the next TTI, and the second repetition is sent at time-frequency location C in the following TTI, etc. In this disclosure, a TTI or a time interval can mean a subframe, a frame, a slot, a time slot, a mini-slot, an OFDM symbol, a particular number of OFDM symbols or any other time unit. In some embodiments, a repetition is sent on preconfigured grant-free resources in the subsequent order of time or a combination of time and frequency. For example, if grant-free resources are configured with a periodicity equal to P TTIs, and a UE that is configured with a repetition number K performs an initial grant-free uplink transmission at TTI M, then the UE may perform continuous repetitions at TTIs M+P, M+2P, M+(K−1)*P. The grant-free repetitions can be done at resources that are non-contiguous in time, as with this example when P>1. In some embodiments, the grant-free repetitions may be done in subsequent order of time following the grant-free initial transmission. For example, if a UE that is configured with a repetition number K performs an initial grant-free uplink transmission at TTI M, the UE may perform continuous repetitions at TTIs M+1, M+2, . . . , M+K−1. In some embodiments, the repetitions may be performed by UE 102a until one of the following conditions is met:

(1) The number of repetitions (including the initial transmission) for the TB reaches K. That is, the UE 102a has performed K transmissions of the TB. In some embodiments, K is semi-statically configured by the base station 100, such that the base station 100/network can adjust K over time.

or (2) A grant is received from the base station performing a grant-free to grant-based switch, i.e. the base station 100 sends a grant to UE 102a to perform one or more of the retransmissions. If an uplink grant is successfully received by the UE for a TB, then the uplink grant allocation overrides the grant-free allocation, and the UE's transmission/retransmission of the TB follows the uplink grant.

In some embodiments, multiple HARQ processes may be supported for grant-free uplink transmissions from the same UE. The different HARQ processes may be identified using different HARQ process IDs. For example, when a UE sends an initial transmission of a first TB and any repetitions of that first TB, then the UE may associate such initial transmission/repetitions with a HARQ process ID #0. When the UE sends an initial transmission of another TB and any repetitions of that other TB, then the UE may associate such initial transmission/repetitions with a HARQ process ID #1, etc. Multiple HARQ processes may be ongoing in parallel for the same UE.

When multiple HARQ processes are supported for the same UE, the DCI grant to switch a UE from grant-free to grant-based may need to identify the TB to which the grant-free to grant-based switch is directed. That is, in some embodiments, the UE receiving the grant needs to know the HARQ process ID (that is, the TB) to which the grant is directed so that the UE knows which TB to switch from grant-free to grant-based uplink transmissions. In one embodiment, the HARQ process ID may be explicitly or implicitly indicated in the grant, and there is provided a mechanism to associate uplink TB transmissions with HARQ process IDs in a way that is known by both the base station and the UEs. One method to associate a HARQ process ID with an uplink transmission of a TB is to use a known mapping between uplink time-frequency resources and HARQ process IDs.

Different ways to map grant-free uplink transmission opportunities to uplink time-frequency resources and to assign HARQ process IDs are described below. In general, the mapping of the HARQ process ID to the time/frequency resources may depends on one or a combination of some or all of the following parameters: periodicity, the maximum configured HARQ process L for the UE or for each resource set, the current time index (e.g. CURRENT_TTI described later), repetition number K, frequency location index or resource set index, total number of resource sets, a HARQ process ID offset for each resource set. Detailed combinations are possible, as described in the different examples of this disclosure.

In one embodiment, a set of grant-free uplink transmission resources follows a periodicity, which is configured by the base station and which refers to the access interval (in time) between opportunities to send an initial grant-free uplink transmission of a TB. For example, a periodicity of eight means that there are eight time intervals between each opportunity to send an initial grant-free uplink transmission. The time location of the initial grant-free uplink transmission resources may also depend on a resource offset value, which may be signalled or indicated in RRC signalling or DCI signaling. The offset value may indicate the time location of one or more grant free uplink transmission resources, or the time location of one resource with respect to system frame number (SFN=0), or the relative time location of the grant-free uplink transmission resources within one periodicity, e.g., the offset may indicate the time location index (e.g. TTI index, slot index or subframe index) of one grant-free uplink transmission resource with respect to frame 0 (e.g. with respect to system frame number (SFN)=0).

Figure 7:
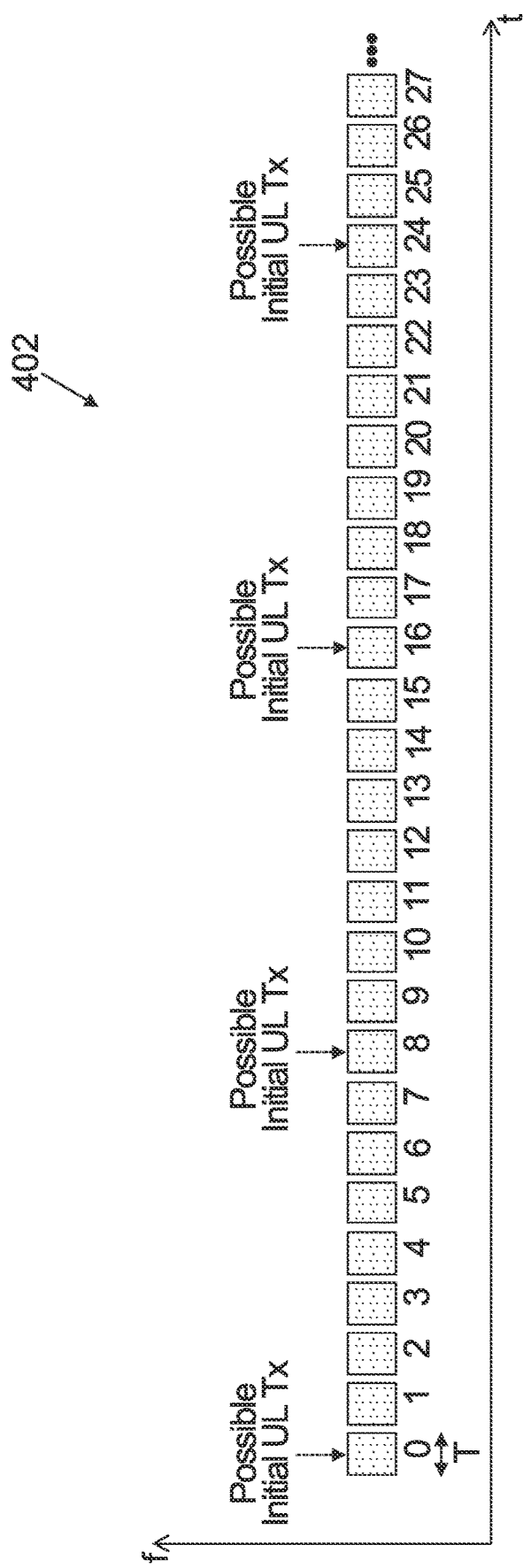
FIGS. 7 to 27 illustrate example grant-free uplink transmission time-frequency resource sets.

In one example, FIG. 7 illustrates a grant-free uplink transmission resource set 402 comprising a plurality of blocks of time-frequency resources that may be used by a UE for grant-free uplink transmissions. Twenty-eight time-frequency blocks are illustrated as an example, each one spanning one time interval and associated with a respective time index between 0 and 27. For example, the first block spans a time interval of duration T and is designated using index 0.

The time-frequency resource blocks in FIG. 7 are illustrated as being contiguous in time and the same size (i.e. spanning the same time duration and encompassing the same frequency range), but this is only an example for simplicity. In actual implementation the blocks may be distributed in time and/or frequency. Also, the time duration of each block is implementation specific, e.g. a time interval T may represent a transmission time interval (TTI) or a slot or a mini-slot or a subframe or a particular number of OFDM symbols, depending upon the implementation. Each index refers to a time interval, which corresponds to a respective time-frequency resource region in FIG. 7. Similarly, with respect to FIGS. 8 to 27 described below, the illustrated time-frequency resource blocks are shown as being the same size and contiguous in some cases, but this is only an example for simplicity. In actual implementation the blocks may be distributed in time and/or frequency. Also, the time duration of each time index is implementation specific. In FIG. 7, the periodicity between grant-free uplink initial transmission opportunities is eight time indices. A periodicity may instead be called an access interval.

Figure 8:
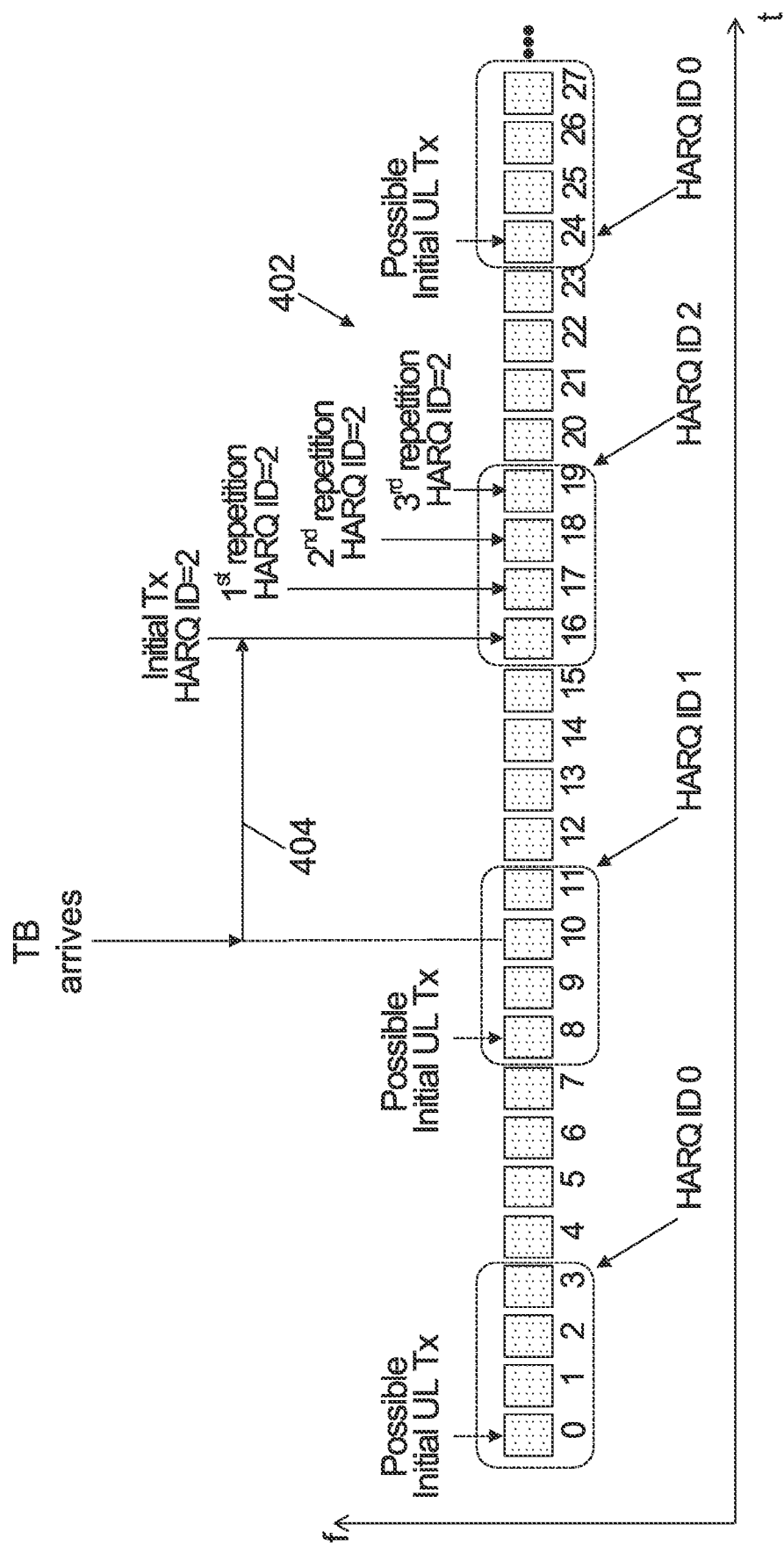

In some embodiments, the grant-free uplink transmission resources shown in FIG. 7 are contiguous in time, e.g. as illustrated. For example, each resource may span a T=1 time interval, where the time interval may be a TTI, which may be a slot, mini-slot, subframe, or a particular number of OFDM symbols. The periodicity may be defined with a unit equal to the TTI. Therefore, the grant-free initial transmission resources in FIG. 7 may be 8 TTIs apart. Resources 1, 2, 3, 4, 5, 6, 7 may be resources in the following TTIs after resource 0. Resources 1-7 may have the same frequency location or same relative frequency location, or have a predefined mapping of frequency location with respect to resource 0, e.g. they may share the same physical resource block (PRB) or VRB index. In some embodiments, some of the resources between the grant-free initial transmission resources are not configured as grant-free uplink transmission resources (e.g. if repetition is not configured or the repetition number configured for the UE is K=1, e.g. resources 1-7, 9-15, 17-23, and 25-27 in FIG. 7 may not be configured as grant-free uplink transmission resources). FIG. 8 illustrates a variation of FIG. 7 for an example in which: the number of automatic transmissions of a TB is K=4; each bundle of K=4 adjacent indices is mapped to a respective HARQ process ID; and the maximum number of configured uplink HARQ processes a UE may have is L=3 (HARQ process ID 0, HARQ process ID 1, and HARQ process ID 2). HARQ process ID 0 is assigned to the bundle of four adjacent indices beginning at index 0, HARQ process ID 1 is assigned to the bundle of four adjacent indices beginning index 8, etc. In some embodiments, only the initial uplink grant-free transmission resources (e.g. resources 0, 8, 16, and 24 in FIG. 8) have an explicit mapping to the HARQ process ID. The repetitions of the same TB after the initial transmission automatically use the same HARQ process ID as the initial transmission and therefore do not need to have an explicit mapping to the HARQ process ID. In some embodiments, some of the resources between the grant-free initial transmission resources are not configured as grant-free uplink transmission resources (e.g. if the repetition number configured for the UE is K=4, resources 4-7, 12-15, and 20-23 in FIG. 7 may not be configured as grant-free uplink transmission resources).

The relationship between HARQ process ID and resource may also be expressed according to the following formula for specifying the HARQ process ID for a bundle based on the index number of the initial transmission opportunity of that bundle:

$$HARQ \text{ process ID} = \left\lfloor \frac{index}{perodicity} \right\rfloor \bmod L,$$

where "mod" is the modulo operation and "$\lfloor \ \rfloor$" is the floor function (i.e. $\lfloor x \rfloor$ gives the largest integer less than or equal to x). The index refers to the time indices of current time where the grant-free transmission resource is located or the grant-free transmission happens, and it may instead be referred to as CURRENT_TTI. The time unit of CURRENT_TTI can be a subframe, slot, mini-slot or a particular number of OFDM symbols, or any time unit. CURRENT_TTI may also be defined considering the frame number. For example, if CURRENT_TTI is defined based on subframe, CURRNT_TTI=[(SFN*10)+subframe number], where SFN is the system frame number. In another example, CURRENT_TTI may be defined as a slot number, e.g. CURRNT_TTI=[(SFN*20)+slot number] as there may be 20 slots per system frame.

In the example illustrated in FIG. 8, a TB arrives at the transmit buffer of the UE during time index 10. The grant-free initial uplink transmission of the TB to the base station therefore occurs at the next grant-free uplink initial transmission opportunity, i.e. at index 16, followed by three repetitions at indices 17, 18, and 19. The HARQ process ID for the TB is 2 because that is the HARQ process ID mapped to the bundle of resources at indices 16 to 19.

In FIG. 8, the repetitions occur on the K−1 time indices (e.g. TTIs) immediately following the time index at which the initial transmission occurs. This is only an example. In other embodiments, the repetitions may follow another preconfigured time and/or frequency hopping pattern. If resource hopping is enabled, the actual physical time-frequency resources may be derived using the configured resource hopping pattern. In any case, the indices designated for uplink grant-free initial transmissions (e.g. indices 0, 8, 16, and 24 in FIG. 8) are referred to initial transmission resources, and the indices used for sending repetitions are referred to as repetition resources (e.g. in the case K=4, indices 1, 2, 3, 9, 10, 11 etc. in FIG. 8). Note that in the case of repetition with repetition number K>1, initial transmission throughout this disclosure may refer to the first repetition among K repetitions.

Figure 9:
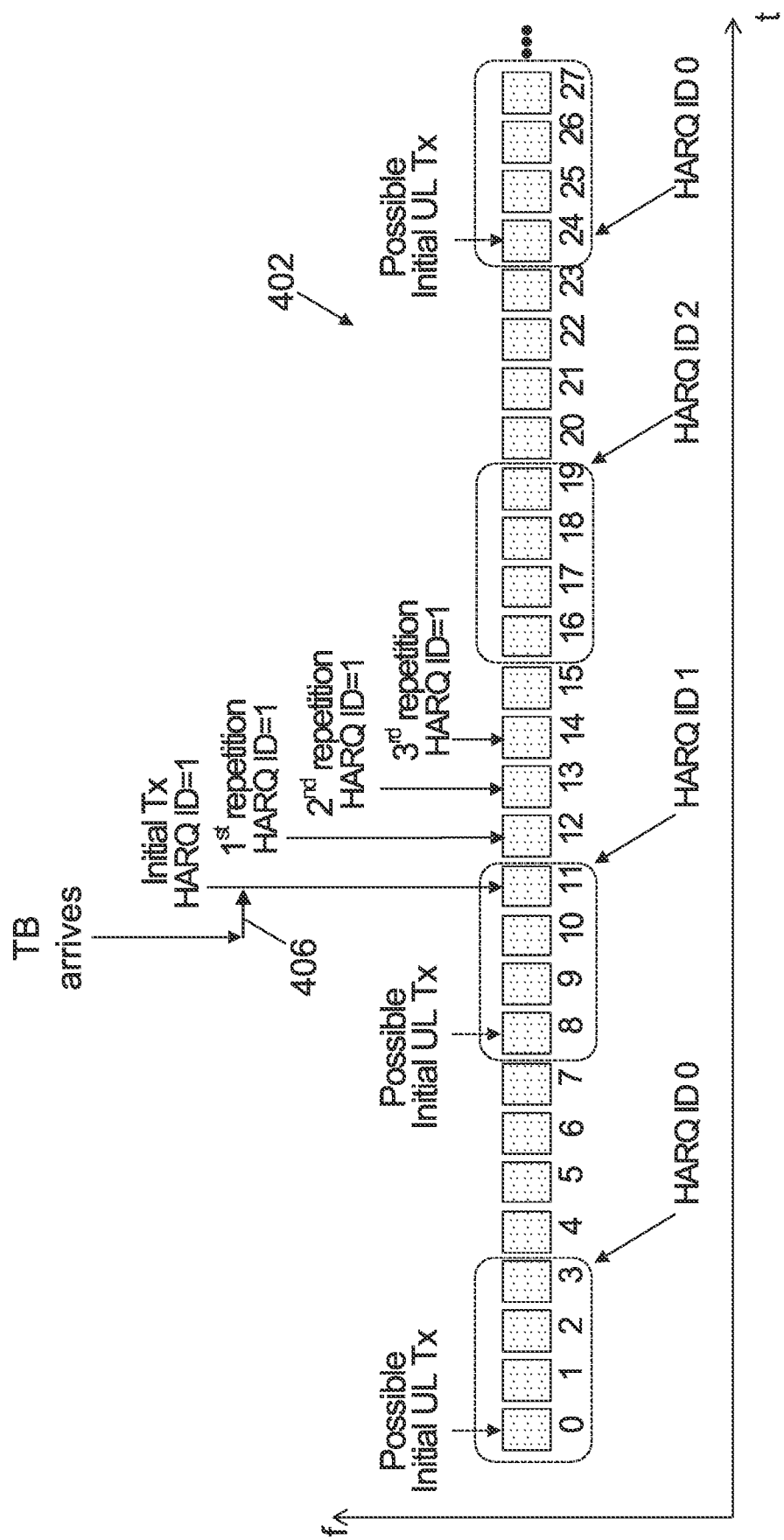

FIG. 9 illustrates an alternative to the FIG. 8 embodiment in which when a packet arrives to be transmitted, the UE does not necessarily have to wait until an initial transmission resource, i.e. the UE does not necessarily have to wait to send the initial transmission at the next initial transmission index. Instead, the initial transmission may be sent on a repetition resource.

In FIG. 9, the repetition is done on the time indices following the initial transmission, e.g., on resources 11, 12, 13, and 14 for the K=4 repetitions of the same TB (as illustrated). In another embodiment, the repetition may be sent on the time resources following the initial transmission that are designated as grant-free initial and repetition resources, e.g., resources 11, 16, 17, and 18 may be used for the K=4 repetitions of the same TB.

In FIG. 9, the HARQ process ID assigned to the TB is equal to the HARQ process ID associated with the resource block at which the grant-free uplink initial transmission is sent. Note that the HARQ process ID for the TB in FIG. 9 is different from the HARQ process ID for the TB in FIG. 8 because the HARQ process ID for the TB in FIG. 9 is equal to the HARQ process ID associated with the resource block at which the initial transmission is sent.

A possible benefit of FIG. 9 compared to FIG. 8 is that the UE may not have to wait several time indices before being able to send the TB. In the example of FIG. 9, the TB transmission may begin at the next time index, as shown at 406. Low latency applications may be better supported.

Therefore, in some embodiments, the UE may use a repetition resource for transmission of a new TB. In some embodiments, the UE may avoid doing this if the repetition resource is already being used for sending the repetition of another TB. There may be an indication (e.g. a flag) in control information sent from the base station to indicate whether the UE is allowed to use a repetition resource for the initial transmission of a new TB. The indication may be sent in radio resource control (RRC) signaling or DCI signaling. The indication may be resource set/configuration specific, i.e, defined for each resource set. In some embodiments, the indication may be associated with the application scenario, numerology or any other means to identify the application scenario. For example, if the application is URLLC, the UE may be allowed to transmit initial transmissions on repetition resource. If the application is eMBB or other non-low latency services, the UE may be only be able to transmit an initial grant-free uplink transmission on an initial grant-free uplink transmission resource.

In the example of FIG. 8, the base station knows when an initial grant-free uplink transmission of a TB is being received based on the time index of the time-frequency resources used to send the uplink transmission. This is because only initial transmission resources are used to send initial grant-free uplink transmissions. Such is not the case in FIG. 9, and so the base station would need another way to distinguish between initial transmissions and repetitions of a TB. One way to distinguish between initial transmissions and repetitions of a TB could be based on the MA signature used for the uplink transmission, e.g. an initial transmission of a TB may use a reference signal that is different from one or more reference signals used for repetitions of the TB. The base station may then identify an initial transmission of a TB based at least in part on the reference signal used in the grant-free uplink transmission. In some embodiments, the base station may identify the timing of the initial transmission by other means. For example, a UE can indicate whether the transmission is initial transmission, e.g through a new data indicator (NDI) along with the grant-free transmission. The indicator can be sent in an uplink control channel or a data channel. The base station may be able to identify the initial transmission using the decoded indicator. Once the base station has identified the initial transmission timing (by using MA signature or other means), the base station may identify the following repetitions of the same TB by using the subsequent time indices after the initial transmission. The HARQ process ID may be identified using the HARQ process ID mapped to the initial transmission.

Figure 10:
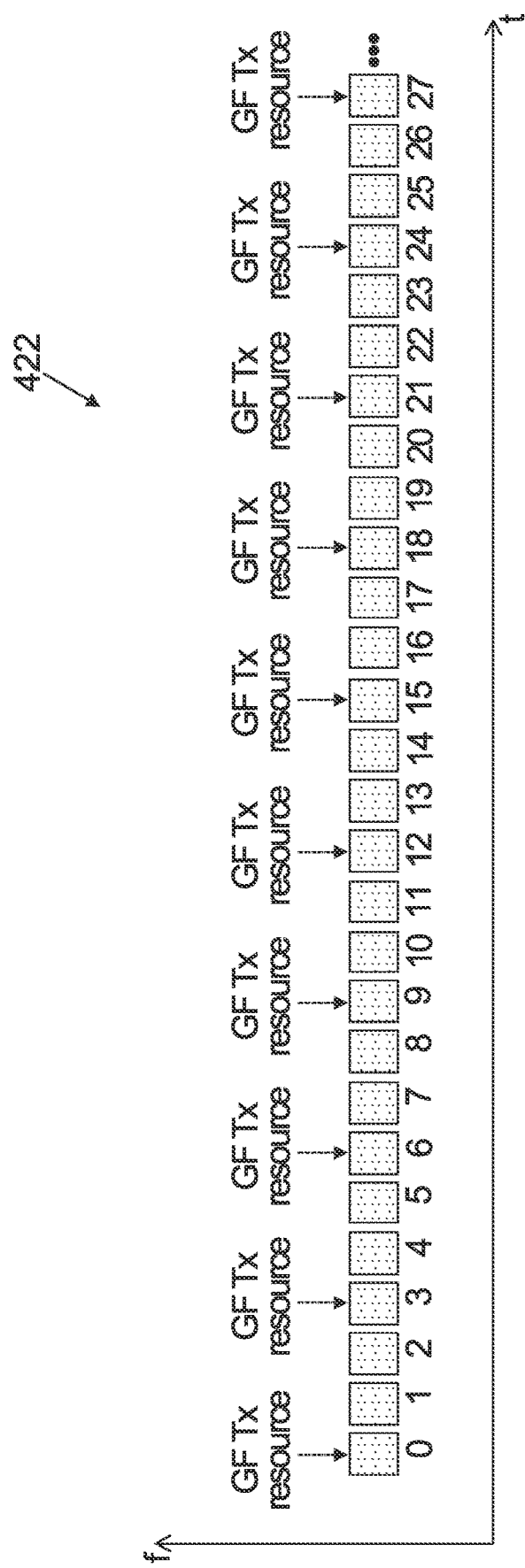
Figure 11:
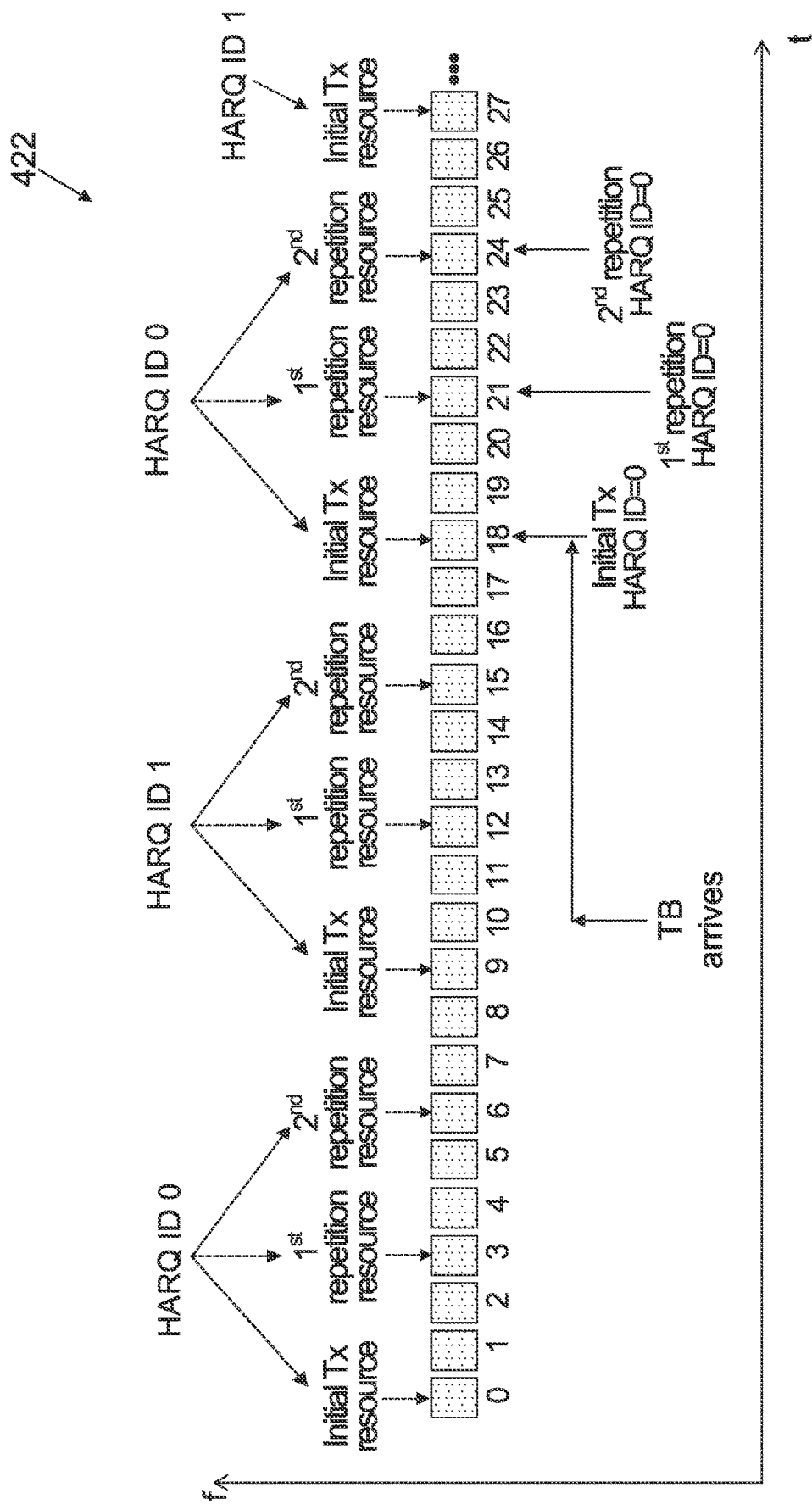

In some embodiments, the periodicity and offset value are used to define a grant-free uplink transmission time-frequency resource, regardless of whether the grant-free uplink transmission time-frequency resources are initial transmission resources or repetition resources. The periodicity of the configured grant-free uplink transmission time-frequency resources may therefore instead refer to the access interval between neighbouring grant-free uplink transmission time-frequency resources regardless of whether the grant-free uplink transmission time-frequency resources are initial transmission resources or repetition resources. FIG. 10 illustrates a grant-free uplink transmission resource set 422 in which the periodicity between grant-free uplink transmission opportunities is three. FIG. 11 illustrates a variation of FIG. 10 in which: the configured number of repetitions of a TB is K=3; each bundle of K=3 adjacent grant-free uplink transmission opportunities is mapped to a respective HARQ process ID; the maximum number of configured uplink HARQ processes a UE may have is L=2; and each grant-free uplink transmission resource is designated as either an initial transmission resource or a repetition resource. When a TB arrives at the transmit buffer of the UE for uplink transmission to the base station, the UE waits until the next available initial transmission resource to send the grant-free uplink initial transmission of the TB. In the example shown in FIG. 11, a TB arrives for uplink transmission during time index 10, and the transmission of the TB begins at time index 18, with the first repetition occurring at time index 21 and the second repetition occurring at time index 24. The TB is assigned to HARQ process ID 0 because that is the HARQ process ID mapped to indices 18, 21, and 24.

Figure 12:
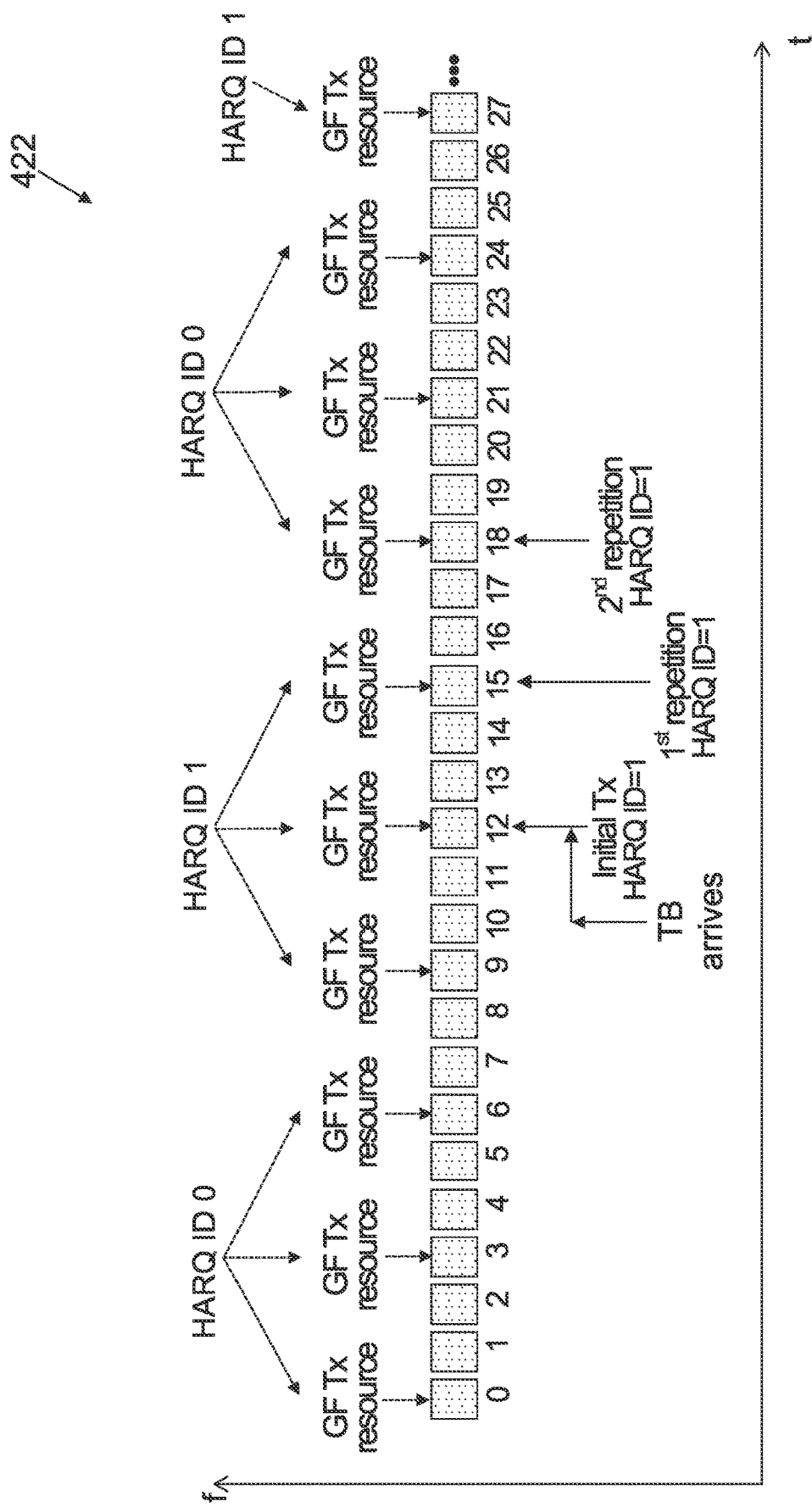

FIG. 12 illustrates another variation of FIG. 10 in which: the number of automatic transmissions of a TB is K=3; each bundle of K=3 adjacent grant-free uplink transmission opportunities is mapped to a respective HARQ process ID; the maximum number of ongoing HARQ processes a UE may have is L=2; but each grant-free uplink transmission resource is not specifically designated as an initial transmission resource or a repetition resource. An initial transmission of a TB or a repetition of that TB can occur at any grant-free transmission opportunity. When a TB arrives at the transmit buffer of the UE for uplink transmission to the base station, the UE waits until the next available grant-free uplink transmission resource to send the grant-free uplink initial transmission of the TB. The repetitions follow on the subsequent grant-free uplink transmission resources. The HARQ process ID assigned to the TB is the HARQ process ID associated with the index at which the initial transmission is sent. In the example shown in FIG. 12, a TB arrives for uplink transmission during time index 10, and the transmission of the TB begins at time index 12, with the first repetition occurring at time index 15 and the second repetition occurring at time index 18. The TB is assigned to HARQ process ID 1 because that is the HARQ process ID mapped to index 12. Although the repetitions are shown as being transmitted on the next available grant-free uplink transmission resources, this is only an example. The repetitions do not need to occur on neighbouring grant-free uplink transmission resources in the time domain. For example, the $1^{st}$ repetition may be sent on index 18 instead of index 15, and the $2^{nd}$ repetition may be sent on index 24 instead of index 18.

In FIG. 12, one way for the base station to distinguish between initial grant-free uplink transmissions and repetitions of a TB could be based on the MA signature used for the grant-free uplink transmission, e.g. an initial grant-free uplink transmission of a TB may use a reference signal that is different from one or more reference signals used for repetitions of that TB. Once the timing or time/frequency location of the initial transmission is identified, the following K−1 repetitions of the same TB may be identified by finding the subsequent K−1 grant-free uplink transmission resources following the initial grant-free uplink transmission. The HARQ process ID may be identified based on the resource corresponding to the initial transmission, and the following repetitions of the same TB can be considered as using the same HARQ process ID. The same may hold true for the other embodiments described herein, e.g. in relation to FIGS. 9, 17, and 19 to 27.

In some embodiments, the base station may use control information (e.g. one or more flags) to configure whether the UE can: (i) send a grant-free uplink initial transmission of a TB on any available grant-free uplink transmission resource; or (ii) only send a grant-free uplink initial transmission on resources specifically designated grant-free uplink initial transmission resources. For example, an indicator may be used in control information from the base station to switch a UE between the configuration shown in FIG. 11 and the configuration shown in FIG. 12. The indicator may be signalled in RRC signaling or DCI signaling.

One possible benefit of the mapping in FIG. 12 is that after K repetitions, the next grant-free resource always corresponds to a different HARQ process ID, which can be ready to be used for any new TB from the same UE.

In FIG. 12 and all other embodiments described herein, in general, if a HARQ process is terminated (e.g. a buffer of the HARQ process is flushed by a UE because of an ACK or grant implied ACK), then the UE may be able to transmit new data using the grant-free resources corresponding to the same or different HARQ process of the terminated HARQ process. However, if a HARQ process is ongoing (e.g. a UE is waiting for an ACK/NACK or other feedback or a retransmission is scheduled for the TB), then the UE may be able to use grant-free resources corresponding to a different HARQ process ID to transmit a new TB (i.e. avoid the grant-free resources of the same HARQ process ID) to avoid conflict.

In FIG. 12, and all other embodiments described herein, a UE's continuous grant-free repetitions may be optionally stopped early by a grant or optionally stopped early by an ACK before finishing the K repetitions, as described earlier. If a UE receives an ACK of a TB, the UE may flush the buffer of the HARQ process corresponding to the TB immediately. In some embodiments, after receiving the ACK, the UE may only flush the buffer of the corresponding HARQ process at a time when the UE needs to use the same HARQ process ID to transmit new a TB (e.g., if the UE has a new packet and needs to transmit immediately, but the next grant-free resource available corresponds to the same HARQ process ID because the UE has not finished the K repetitions yet, then the UE may flush the buffer and transmit the new TB at the resource corresponding to the same HARQ process ID). In some embodiments, the ACK may be implicitly indicated by a grant, e.g., if the grant is to schedule a transmission of a new TB that corresponds to the same HARQ process ID of the current TB, the grant may be considered to imply an ACK for that TB. In this case, the UE may flush the buffer of that TB and transmit a new TB following the scheduling grant if it has new data to transmit. If the UE receives an ACK of a TB and has flushed the buffer of the TB, then UE may use any of the subsequent grant-free resources to perform a grant-free transmission of a new TB regardless of whether the HARQ process ID of the grant-free resource is the same or different from the HARQ process ID of the TB the ACK is for. If the UE receives a grant before or after fishing the K repetitions of a TB, the grant may be a grant to schedule a grant-based retransmission of the TB, and so the UE may stop the grant-free repetition and switch to grant-based re-transmission. If the grant-based and grant-free transmission share the same HARQ process ID, then in the mean time before the HARQ process of the TB is acknowledged (or buffer flushed), the UE may only be able to use a grant-free resource corresponding to a different HARQ process for transmission of a new TB. In some cases, this may mean the UE may have to wait for some time as K repetitions may have not been finished, and there is a chance that the next transmission resource is using the same HARQ process ID of that TB. If the UE finishes K repetitions of a TB and the UE has new data to transmit, the UE may need to transmit the new data at a grant-free resource with a different HARQ process ID if the previous K repetitions have not be acknowledged. In FIG. 12, a UE can always transmit immediately at the next grant-free resources for a new TB, as it always corresponds to a different HARQ process ID.

In some embodiments, if the UE finishes K repetitions of a TB, and the UE has not received an ACK or grant yet, the UE may wait for HARQ feedback (ACK/NACK or grant). If the UE does not receive an ACK or grant from the base station within a predefined window, then the UE may perform grant-free retransmissions of the TB. grant-free retransmissions may be done on configured grant-free resources. Grant-free retransmissions may include another set of K repetitions. In one embodiment, the grant-free retransmissions may be done only on grant-free resources corresponding to the same HARQ process ID. In this scenario, the base station may be able to combine the grant-free retransmission and the initial K grant-free repetitions, as they can be identified using the same HARQ process ID. The grant-free retransmission may have to wait for some time to find the grant-free resource corresponding to the same HARQ ID process. In another embodiment, the grant-free retransmission may be able to use any of the following available grant-free resources, regardless of whether the corresponding HARQ process ID is the same or different from the HARQ process ID of the initial K repetitions. In the case where the HARQ process ID of the grant-free retransmission is different from the initial K repetitions, the base station may choose to decode the initial K repetitions and grant-free retransmissions independently (i.e., not combing both). The described procedure also works for the case where K=1.

In some embodiments, the grant-free repetitions can be spread in the frequency domain, the time domain, or a combination of the time and frequency domain. An indicator in control information (e.g. a flag) may be configured (e.g. in RRC signaling) to indicate whether grant-free repetition is performed in the frequency domain first or the time domain first.

Figure 13:
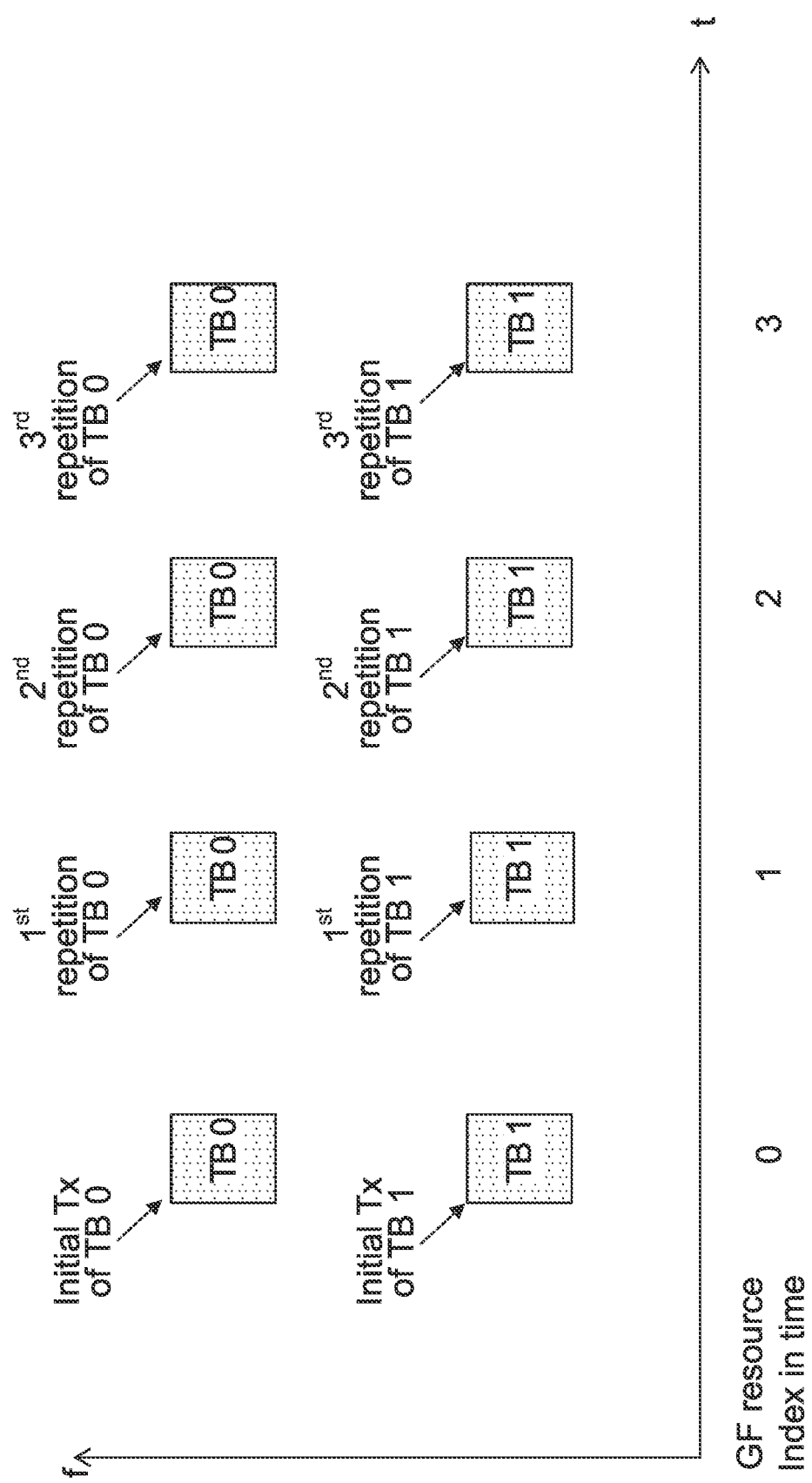
Figure 14:
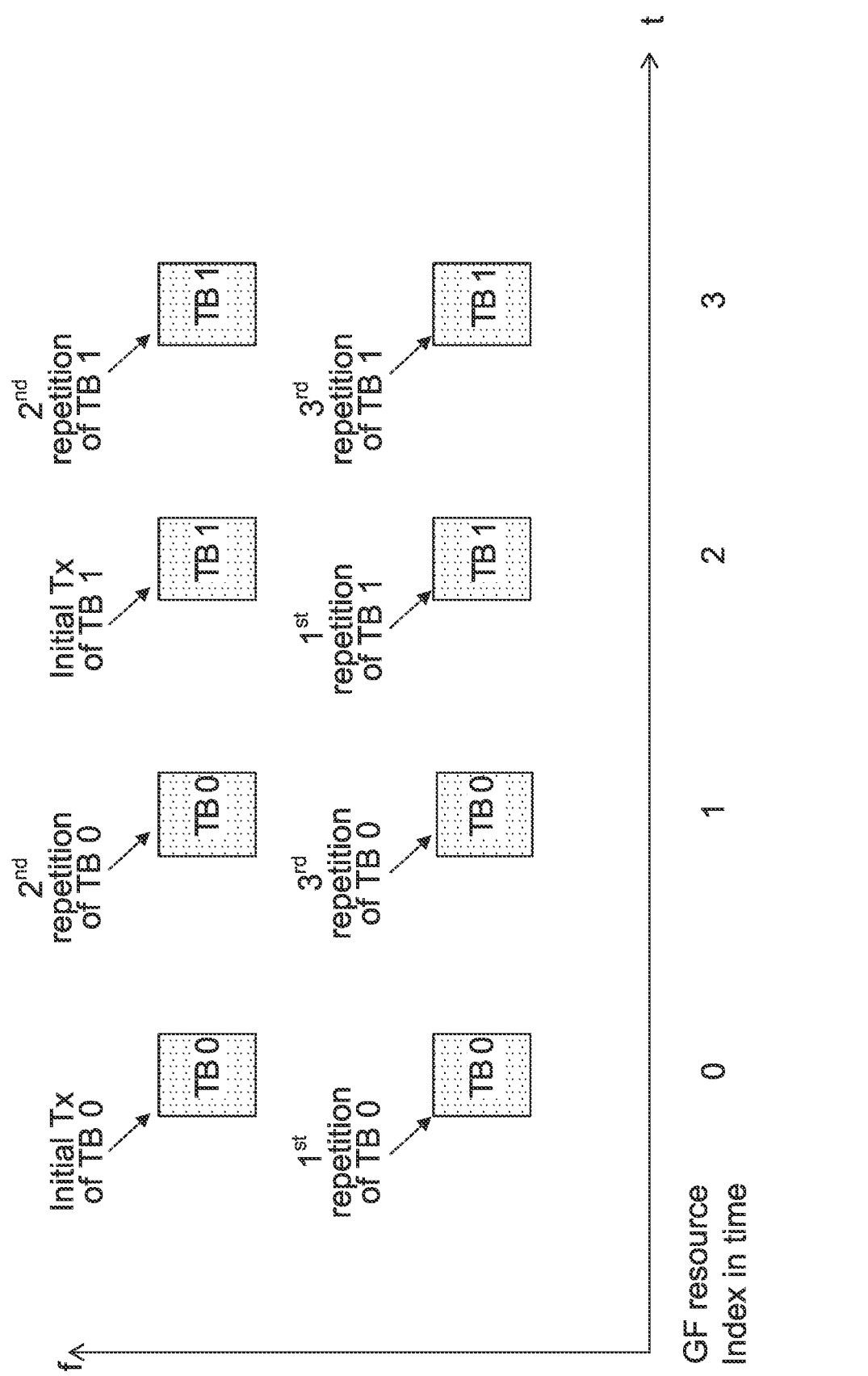

FIG. 13 illustrates an example in which each time index has two grant-free uplink transmission opportunities. The number of automatic transmissions of a TB is K=4. Two TBs (TB 0 and TB 1) are being transmitted in parallel at the same time intervals, but on non-overlapping frequency resources. FIG. 14 is a variation of FIG. 13 in which two transmissions of the same TB occur in the same time interval on non-overlapping frequency resources. In FIG. 14, multiple transmissions of the same TB are transmitted in parallel, which has the benefit that the automatic transmissions of a TB occur over a shorter time interval. A possible drawback of the FIG. 14 embodiment is that the power for transmitting a TB on a given time interval may need to be spread between the two transmissions of that TB on that time interval.

Resource Configuration for Multiple Sets of Grant-Free Uplink Resources

There are different types of uplink grant-free transmission methods, which may correspond to different ways of configuring the grant-free uplink resources. For a first type of grant-free uplink transmission, the transmission resources may be configured/reconfigured by RRC signaling without layer one (L1) (e.g. DCI) signaling. After the UE receives the resource configuration from RRC signaling, the UE can perform uplink grant-free transmission without L1 signaling. For a second type of grant-free transmission, the transmission resources may be based on both RRC signaling and L1 signaling (e.g. DCI) for activation/deactivation. There may be a third type of grant-free transmission, which is based on RRC configuration. The UE may perform grant-free transmission without L1 activation. However, it allows the use of L1 signaling (e.g. DCI) to modify some parameters configured in RRC. A UE may support one type of grant-free transmission only, or support multiple types of grant-free transmissions simultaneously. The network (via the base station) may configure a UE explicitly, or implicitly indicate whether the UE can support one or multiple types of grant-free transmissions, or indicate which types of grant-free transmission it supports. The indication may be in RRC signaling. The indication may be sent along with resource configurations in RRC. In this disclosure, we may use "grant-free type" or "GF type" to refer to the different types of grant-free transmissions described above. We may refer to "grant type" to refer to different resource signaling options, i.e, different types of grant-free transmission and grant-based transmission. For example, a grant type can be type 1 grant-free transmission (resource configured by RRC signaling only), type 2 grant-free transmission (resource configured by RRC signaling and DCI signalling), type 3 grant-free transmission (resource configured by RRC signalling only, but with DCI modifying resource parameters), grant-based transmission (resource signalled by DCI), which all can be considered different grant types. In some embodiments, whether a UE is type 1 resource configuration or type 2 resource configuration is indicated by an activation indicator, which refers to whether activation or deactivation is enabled. The indicator may be a flag (L1 activation flag). For example, if the flag is 0, activation is not enabled and the grant-free transmission is type 1, if not the resource configuration may be type 2 and vice versa. In some embodiments, whether a UE is type 1 grant-free transmission or type 3 grant-free transmission may be indicated by an indicator that indicates whether L1 signaling can be used to modify the GF resource parameters configured in RRC. The indicator can also be a flag (L1 modification flag). For example, if the L1 modification flag is 0, it may indicate that the grant-free transmission is type 1, if the L1 modification flag is 1, it may indicate that the grant-free transmission is type 3. In some embodiments, only when the L1 activation flag is 1 and L1 modification flag is 0, the grant-free transmission is type 3. When there are multiple grant-free configurations or multiple grant-free resource sets, each configuration or resource set may include the above indicators/flags, which identify the types of grant-free transmission for each configuration/resource set of the UE in the same manner as described above for the UE. In this disclosure, semi-persistent scheduling (SPS) in LTE or new radio (NR) may be considered as a type 2 grant-free transmissions.

For grant-free transmission, the parameters configured in RRC may include one or more of the following: a grant-free C-RNTI (GF C-RNTI) or group C-RNTI; periodicity; resource offset; time-domain resource allocation, frequency domain resource allocation, DMRS configuration (may be UE specific), one or more MCS and/or transport block size (TBS) value; number of repetition K; Power control related parameters, HARQ related parameters; resource hopping pattern, one or more MA signature, MA signature hopping pattern, L1 activation indicator/flag, L1 modification indicator/flag, indicator to indicate whether or not UE can use grant-free repetition/retransmission resource for initial transmission. HARQ related parameters may include a maximum number of configured UL HARQ processes (L), and optionally a HARQ process ID offset. GF C-RNTI is a type of UE ID that is used to at least mask the CRC of a DCI message that is used for control signaling related to grant-free transmission. It has similar functionality as C-RNTI, except it is mainly used for grant-free transmission or related signaling. GF C-RNTI may be different from C-RNTI. Periodicity refers to the interval between two grant-free transmission resources. As for resource offset: the offset value may indicate the time location of one or more grant free uplink transmission resources, or the time location of one resource with respect to system frame number (SFN=0), or the relative time location of the grant-free uplink transmission resources within one periodicity. For example, the offset may indicate the time location index (e.g. TTI index, slot index or subframe index) of one grant-free uplink transmission resource with respect to frame 0 (e.g. with respect to system frame number (SFN)=0). In another example, the offset value is defined as the TTI index of a grant-free resource located between TTI index 0 and TTI index periodicity-1. Time domain resource allocation may indicate the length of a grant-free resource spanning in time domain, and it may be a TTI, a subframe, a slot, minislot or a particular number of OFDM symbols. Frequency domain resource allocation may indicate the frequency domain resource allocation of a grant-free resource (e.g. the PRB or VRB index, which in some cases can be indicated by the starting frequency location and the size in RBs). Resource hopping pattern may indicate which frequency partition/bands/sub-bands the frequency resource is to hop to at different times.

Some or all of the grant-free parameters, such as GF C-RNTI, periodicity, and power control parameters, may be common for one or more different grant-free types of the same UE. For example, a single GF C-RNTI may be configured for a UE whether UE is configured with type 1 grant-free transmission, type 2 grant-free transmission, or both. Some or all of the grant-free parameters, such as GF C-RNTI, periodic, and power control parameters may be grant-free type specific, i.e., a different set of parameters are configured/predefined for different types of grant-free transmissions. For example, a UE that supports a type 1 grant-free transmission may be configured with a $1^{st}$ GF C-RNTI for type 1 GF transmission. If the same UE is configured to also support a type 2 grant-free transmission as well, it may be configured with a different $2^{nd}$ GF CRNTI to support the type 2 grant-free transmission. In some embodiments, the $2^{nd}$ GF C-RNTI for type 2 grant-free transmissions may be the SPS C-RNTI. Some or all of the grant-free parameters, such as GF C-RNTI, periodicity, and power control parameters may be common for one or more different grant types of the same UE. For example, the UE ID for grant-based transmission and grant-free transmission may be the same, e.g., only C-RNTI is configured, GF C-RNTI may not be configured and C-RNTI may be used for the function of GF C-RNTI. Some or all of the parameters, such as GF C-RNTI and power control parameters may be grant type specific, i.e., a different set of parameters are configured/predefined for different grant-types of transmissions. For example, grant-based transmission and grant-free transmission may be configured with different UE IDs, e.g. with C-RNTI and GF C-RNTI, respectively. The C-RNTI and GF C-RNTI can be different.

In some embodiments, multiple grant-free uplink transmission resource sets or multiple grant-free configurations may be configured (e.g. in RRC signaling) for each UE, with each set/configuration possibly being configured in different ways. A UE may use one or multiple sets of grant-free resources for grant-free transmission. Each resource set may also include a grant-free resource set index or a grant-free configuration index to identify the resource set/configuration. There may be a maximum number of supported grant-free resource sets/configurations parameters configured or predefined for each UE.

Multiple sets of resources may be activated by DCI signaling, e.g., for type 2 grant-free transmissions. The multiple set of resources may be activated by a UE specific DCI. Each set of resources can be activated by a separated DCI. The different resource sets may be identified in separate DCI using different resource set indices, which may be explicitly signalled. Multiple sets of resources can also be activated by a single DCI message. The DCI activation message that actives multiple sets of resources for a UE may be signalled using a bit map format similar to LTE DCI format 3/3A. For example, the CRC for the DCI activation message may be masked by C-RNTI or GF C-RNTI. The DCI may contain M bits, with each of the bits containing the information as to whether to activate or not activate a resource set. The location of a bit among the M bits has a predefined relationship with the resource set index configured in RRC. For example, the first bit corresponding to the activation information for resource set index 0, the $2^{nd}$ bit corresponding to the activation information for resource set index 1, . . . , the M th bit corresponding to the resource set with resource set index M−1. M may be preconfigured or predefined. M may be the number of actual resource sets assigned to a UE or a maximum number of resource sets that can be configured for a UE or for the UE.

Figure 15:
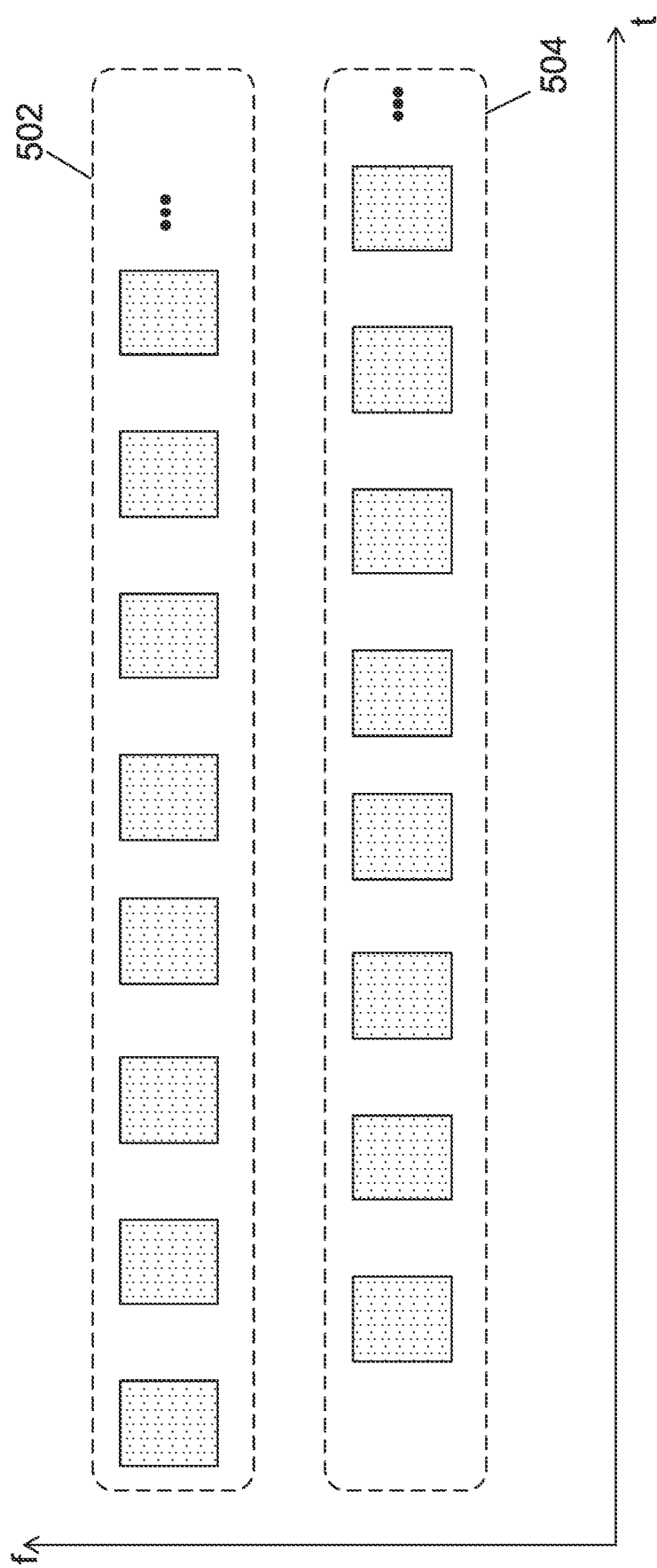

FIG. 15 illustrates two grant-free uplink transmission resource sets, 502 and 504. The two grant-free uplink transmission resource sets 502 and 504 may be configured in different ways. Some or all of the grant-free parameters configured in RRC may be common for all grant-free resource sets, which may be configured or predefined for all grant-free resource sets. Some or all of the grant-free parameters may be grant-free resource set/configuration specific. Each set of resources may corresponds to one type of grant-free transmission (e.g. type 1 or type 2 grant-free transmissions), indicated by the L1 activation flag and/or L1 modification.

In some embodiments, all of the configuration parameters mentioned earlier may be configuration specific and/or resource set specific. In some embodiments, only some of the configuration parameters mentioned earlier may be configuration specific and/or resource set specific. In some embodiments, configured multiple resource sets may result in configured multiple frequency domain resources per time interval. In some embodiments, periodicity, offset and time domain resource allocation is common for all resource sets, and frequency domain resource allocation, resource hopping pattern, MCS, MA signature and/or DMRS may be resource set specific. When periodicity, offset and time-domain resource parameters are common for multiple resource sets, the multiple resource sets correspond to different frequency resources per time interval. In some embodiments, a resource hopping pattern is resource set specific, and periodicity, offset, time domain resource allocation, all other frequency domain resource allocation parameters, MCS, MA signature and DMRS, K are common for all resource sets. In some embodiments, resource hopping pattern, MA signature and/or DMRS configuration are resource set specific, and periodicity and offset, time domain resource allocation parameters are common for all resource sets, other parameters, such as frequency domain resource parameters, MCS may be common for all resource sets or resource set specific. In some embodiments, only the frequency domain resource allocation (including resource hopping pattern) is resource set specific, and all other parameters may be common for all resource sets. In some embodiments, the periodicity may be common for all resource sets, and offset and time domain resource allocation, frequency domain resource allocation, resource hopping pattern, MCS, MA signature and/or DMRS may be resource set specific.

In some embodiments, a UE can be configured with multiple resource hopping patterns. The multiple resource hopping patterns can be considered as or correspond to multiple sets of resources, where each resource hopping pattern is a set of resources. Therefore, the resource hopping pattern parameters may be resource set specific. The resource hopping pattern may indicate which frequency partitions the resources are located with respect to different time indexes and/or number of repetitions. The frequency partitions can be a frequency band, frequency sub-band, a set of RBs or any range of frequency partitions. For example, a resource hopping pattern may be defined as a sequence indicating the frequency partition index at different times. Some or all of other grant-free resource parameters may be common for the different resource sets. In some embodiments, multiple frequency resources per TTI may be configured for each UE. In some embodiments, the multiple frequency resources per TTI may corresponding to different HARQ processes. The UE may be able to transmit multiple TBs/HARQ processes per TTI. For example, if periodicity, offset and time domain resource configuration parameters are common, and resource hopping pattern is different for different sets of resources, the different sets of resources may be located in different frequency partitions of the same TTI or same time interval. The different resource sets may be indicated by a resource set index, which may be explicitly signalled in RRC or implicitly indicated (e.g. by the order of the resource set configured or by the order of resource hopping pattern signalled). The total number of resource sets (e.g., in some cases, this is the number of frequency hopping patterns configured) and the resource set index can be used to derive the mapping of HARQ process ID to time/frequency resources as described in the examples later. In some embodiments, a different frequency location index (GFresourceIndexWithinTTI) and number of grant-free resources per time interval (NumGFResourceperTTI) can be used instead to derive the HARQ process ID.

In some embodiments, all parameters inside each configuration may be configuration/resource set specific, but inside each configuration there may be multiple resource sets configured for the UE. The multiple resource sets may include multiple frequency resources per time interval, e.g. by configuring the multiple resource sets for multiple set of resources with common periodicity and offset. More generally, each resource configuration parameter may be resource set specific or UE (service) specific.

In some embodiments, each set of resource may correspond to a HARQ process or a range of HARQ processes. In some embodiments, the HARQ process ID corresponding to each set of resource may be explicitly signalled (e.g. in RRC). In some embodiments, the HARQ process ID corresponding to a set of resources may not be explicitly signalled. In other embodiments, the HARQ process ID/number is not explicitly indicated in the configuration, and only multiple sets of resources are configured. In this case, there may be a predefined rule that maps HARQ processes to the configured resources. E.g., if two sets of resources are configured, then the first set may correspond to HARQ process number 0, and the second set may correspond to HARQ process number 1. As another example, if two parallel sets of resources are configured such that within one time unit/slot, there are two grant-free resources in different frequency locations, the one with higher frequency band index may correspond to HARQ process 0, the other then corresponds to HARQ process 1 or vice versa. In some embodiments, the HARQ process ID may be associated with the resource configuration index or resource set index.

In some embodiments, the maximum number of configured uplink HARQ processes L is shared among all the resource sets. In some embodiments, the maximum number of configured uplink HARQ processes L is signalled for each resource set/configuration. In some embodiments, there may be a HARQ process ID offset, which is used to define the starting point of the HARQ ID used for each resource set. The HARQ process ID offset may be signalled in RRC for each resource set.

Figure 16:
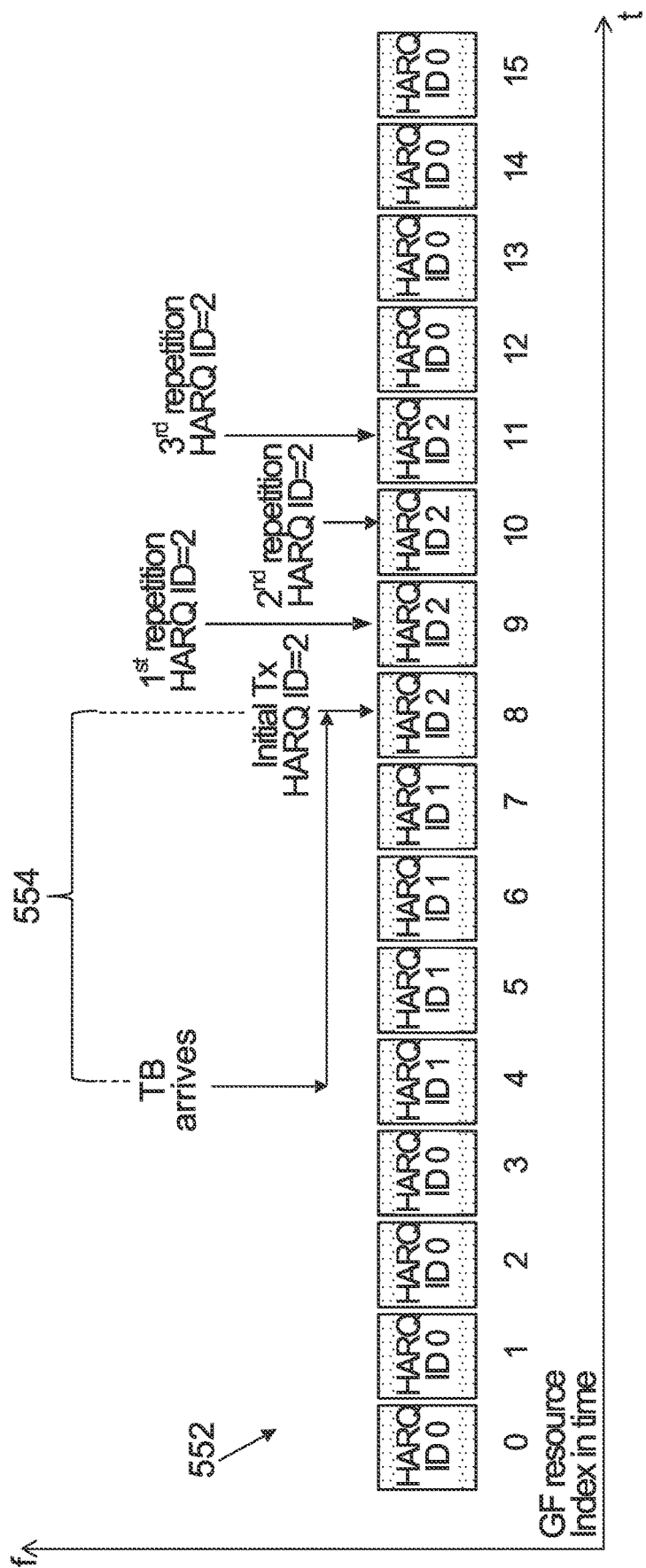

FIG. 16 illustrates another example of a grant-free uplink transmission resource set 552 comprising a plurality of blocks of time-frequency resources. Sixteen time-frequency blocks are illustrated, which may be used by a UE for grant-free uplink transmissions of TBs. Each time-frequency block is associated with a respective time index between 0 and 15. The periodicity between grant-free uplink initial transmission opportunities is one time index. There is a preconfigured or predefined mapping between HARQ process ID and time-frequency uplink transmission resources. Specifically, the number of configured repetitions of a TB is K=4; each bundle of K=4 adjacent indices is mapped to a respective HARQ process ID; and the maximum number of ongoing HARQ processes a UE may have is L=3 (HARQ process ID 0, HARQ process ID 1, and HARQ process ID 2). The grant-free uplink resources are mapped such that:

time indices 0 to 3 are bundled and correspond to HARQ process ID 0, time indices 4 to 7 are bundled and correspond to HARQ process ID 1, time indices 8 to 11 are bundled and correspond to HARQ process ID 2, and time indices 12 to 15 are bundled and correspond to HARQ process ID 0.

In FIG. 16, indices 0, 4, 8, and 12 are initial transmission resources. When a TB arrives at a UE for transmission, the UE must wait until the start of a bundle in order to send the initial transmission and repetitions. The HARQ process ID associated with the TB is the HARQ process ID of the bundle. The potential downfall is that the UE may have to wait several transmissions blocks before being able to send the TB, as shown at 554.

Figure 17:
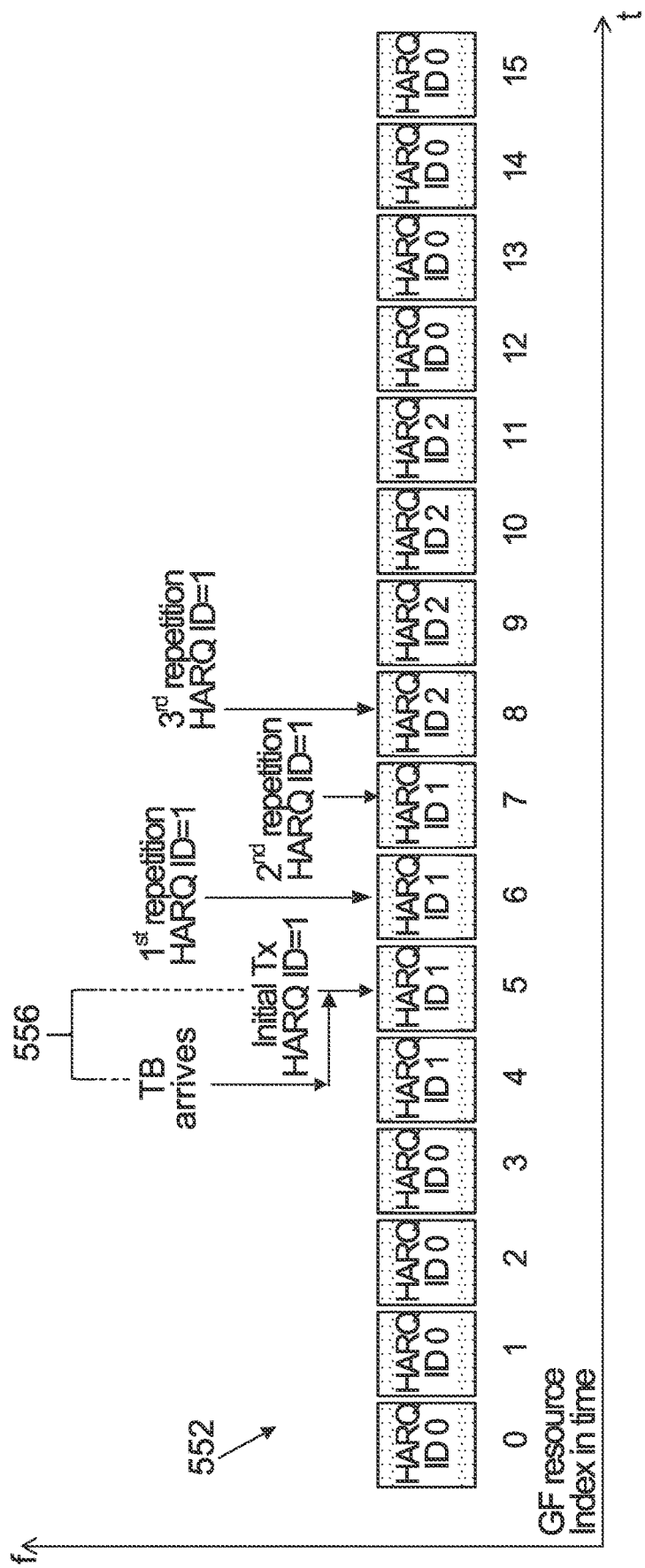

FIG. 17 illustrates an alternative embodiment in which when a packet arrives to be transmitted, the UE does not have to wait until the start of a bundle, i.e. the UE does not have to wait to send the initial transmission at either time index 0 or 4 or 8 or 12. Instead, the initial transmission may be sent at any available index (including on a repetition resource), and the HARQ process ID assigned to the TB is equal to the HARQ process ID associated with the resource block at which the initial transmission is sent. The UE may not have to wait several transmissions blocks before being able to send the TB. The TB transmission may begin at any (e.g. the next available) transmission block, as shown at 556. Note that the HARQ process ID for the TB in FIG. 17 is different from the HARQ process ID for the TB in FIG. 16 because the HARQ process ID for the TB in FIG. 17 is equal to the HARQ process ID associated with the resource block at which the initial transmission is sent.

In FIG. 17, one way for the base station to distinguish between initial transmissions and repetitions of a TB could be based on the MA signature used for the uplink transmission, e.g. an initial transmission of a TB may use a reference signal that is different from one or more reference signals used for repetitions of the TB.

In the examples illustrated in FIGS. 16 and 17, the HARQ process ID mapped to each grant-free uplink transmission resource block may be computed as follows:

$$HARQ \text{ Process ID} = \left\lfloor \frac{\left\lfloor \frac{index}{perodicity} \right\rfloor}{K} \right\rfloor \mod L$$

where "⌊ ⌋" is the floor function (i.e. ⌊x⌋ gives the largest integer less than or equal to x), "index" is the index of the grant-free resource time interval (e.g. 0, 1, 2, etc.) or CURRENT_TTI that is described earlier, "periodicity", "K", and "L" are defied earlier, and "mod" is the modulo operation. In general, the HARQ process ID mapping may depend on K. The HARQ process ID mapping of a grant-free resource may be a function of K, periodicity, current time, and L.

Figure 18:
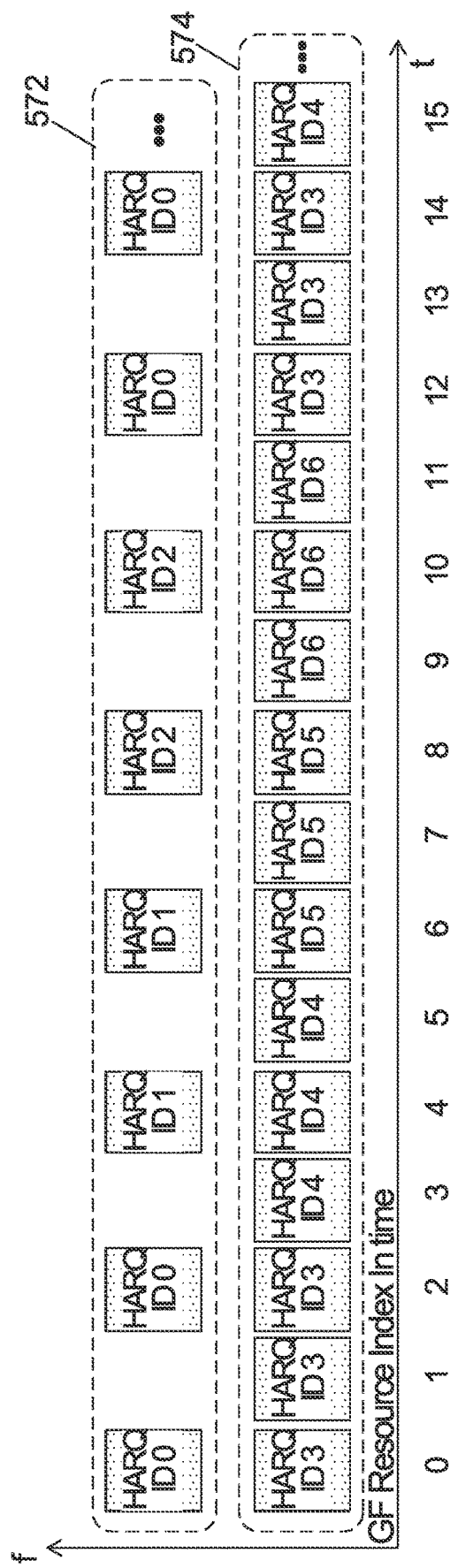

FIG. 18 illustrates an example of two grant-free uplink transmission resource sets 572 and 574. A HARQ process ID offset (described earlier for resource configuration) is configured for each resource set and used so that HARQ process IDs do not overlap between the two sets of grant-free uplink transmission resource sets 572 and 574. Grant-free uplink transmission resource set 572 is configured such that: the periodicity between grant-free uplink transmission opportunities is two time intervals (e.g. two slots or two TTIs or two subframes, etc. depending on the implementation); K=2; L=3; a HARQ ID offset is 0; and resource offset is 0 (where a time resource offset defines a time location of a grant-free uplink transmission resource, e.g. with respect to SFN=0 and/or within one period). Grant-free uplink transmission resource set 574 is configured such that: the periodicity between grant-free uplink transmission opportunities is one time interval; K=3; L=4; a HARQ ID offset is 3; and a time resource offset is 0. A UE having a TB to transmit would select either resource set 572 or resource set 574 to send to the TB. The process implemented by the UE to determine which resource set to use to send the TB is implementation specific. The HARQ process ID mapped to each grant-free uplink transmission resource block of each resource set may be computed as follows (note that the parameters can be resource set specific):

$$HARQ \text{ Process ID} = \left\lfloor \left( \left\lfloor \frac{\left\lfloor \frac{index}{perodicity} \right\rfloor}{K} \right\rfloor \right) \right\rfloor \mod L + HARQ \text{ ID offest}$$

The index may be replaced with CURRENT_TTI that is described earlier. In general, the HARQ process ID mapping of a grant-free resource may be a function of K, periodicity, current time, HARQ ID offset and L.

FIG. 18 illustrates grant-free uplink transmission resource sets 572 and 574 overlapping in time, but not overlapping in frequency. However, this is only an example. In alternative embodiments, grant-free uplink transmission resource sets 572 and 574 may partially or fully overlap in frequency, and/or grant-free uplink transmission resource sets 572 and 574 may partially overlap in time, fully overlap in time, or never overlap in time.

Figure 19:
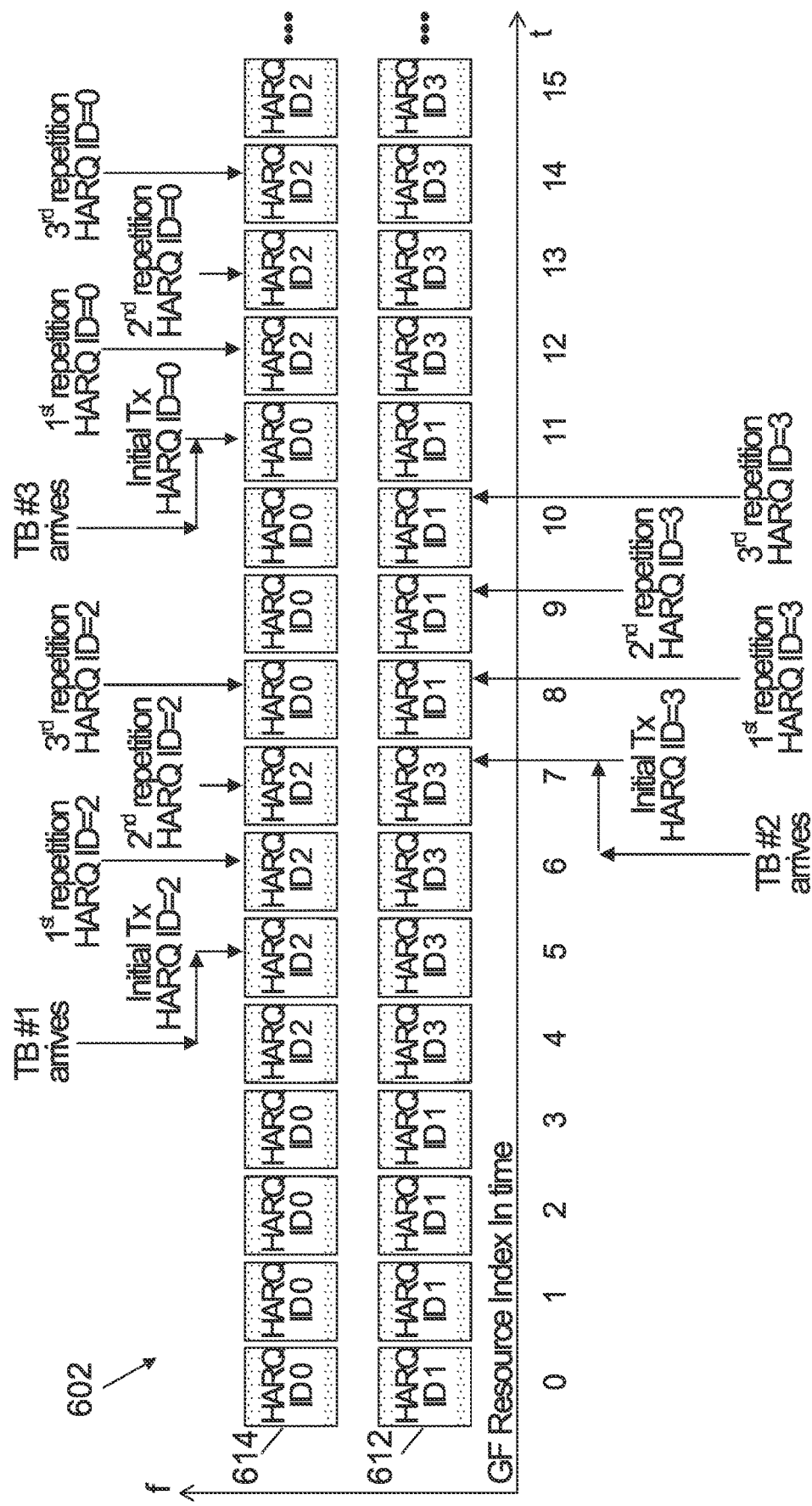

FIG. 19 illustrates an example of a grant-free uplink transmission resource set 602 configured such that: the periodicity between grant-free uplink transmission opportunities is one time interval; each time interval has two grant-free uplink transmission opportunities on non-overlapping frequencies: a "lower frequency" resource block on one set of subcarriers, e.g. at 612, and an "upper frequency" resource block on another set of subcarriers, e.g. at 614; and K=L=4. In some embodiments, 614 and 612 may actually refer to two different grant-free resource sets.

The maximum number of HARQ process IDs that may be ongoing for TBs from the same UE (i.e. L) are shared between the lower frequency resource blocks and the upper frequency resource blocks. Specifically, HARQ process IDs 0 and 2 are mapped to the upper frequency grant-free uplink transmission resource blocks, and HARQ process IDs 1 and 3 are mapped to the lower frequency grant-free uplink transmission resource blocks. In the example illustrated in FIG. 19, three TBs arrive at different times at the transmit buffer of the UE, each for uplink transmission to the base station using the grant-free uplink resources. Each TB begins transmission at the next grant-free uplink transmission opportunity, and the HARQ process ID assigned to the TB is equal to the HARQ process ID associated with the grant-free uplink resource block at which the initial transmission of the TB is sent. In some embodiments, the base station distinguishes between initial transmissions and repetitions of a TB based on the MA signature used in the grant-free uplink transmission. As shown in FIG. 19, when TB #2 arrives, it is transmitted on the lower frequency grant-free uplink transmission resource blocks because the upper frequency grant-free uplink transmission resource blocks are being used for transmission of TB #1.

Note that the grant-free uplink transmission resource set 602 illustrated in FIG. 19 is a logical mapping of grant-free uplink transmission time-frequency resource blocks to time-frequency resources. In actual implementation, a time and/or frequency hopping pattern may be used.

As an example, the HARQ ID mapping of FIG. 19 may be indicated as $$HARQ \text{ Process ID} = \left\lfloor \left( \left\lfloor \frac{\left\lfloor \frac{index}{perodicity} \right\rfloor}{K} \right\rfloor \right) * NumGFResourceset + GFResourcesetIndex \right\rfloor \mod L$$

where NumGFResourceset is the number of grant-free uplink transmission time-frequency resource sets configured (i.e. two in FIG. 19: resource set 612 and 614), and GFResourcesetIndex is the index of each set (resource set 614 is '0' and 612 is '1' in FIG. 19). In some embodiments, the NumGFresourceset may be replaced by NumGFResourceperTTI, the number of frequency resources configured per time interval or any time unit, the GFResourcesetIndex may be replaced by GFresourceIndexWithinTTI, the frequency location index among the multiple frequency resources configured per time interval or any time unit. In some embodiments, the time interval is a TTI, e.g. a subframe, slot, or mini-slot. In some embodiments, the time interval is defined same as the periodicity. For example, if there are multiple frequency hopping patterns configured for the UE, GFresourceIndexWithinTTI may be the index of the frequency hopping pattern configured for the UE, while the NumGFResourceperTTI may be the number of configured frequency resource hopping patterns for the UE. The scheme may allow for parallel HARQ process transmitted per TTI. In the equation above, the index may be replaced with CURRENT_TTI that is described earlier. In general, the HARQ process ID mapping of a grant-free resource may be a function of time and frequency location of the resources and/or repetition number K. HARQ process ID mapping may be a function of resource set index and total number of HARQ processes.

Figure 20:
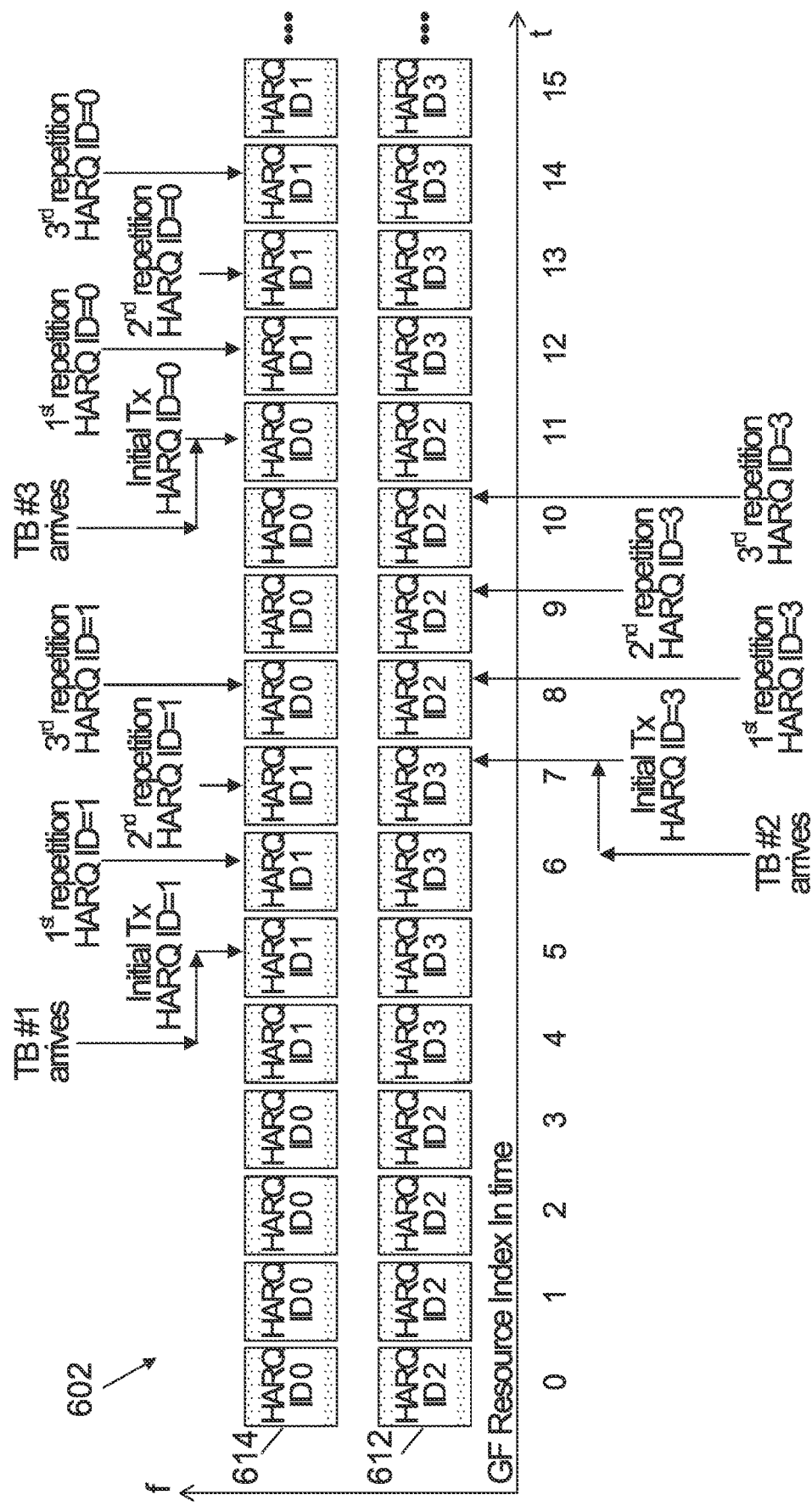

FIG. 20 illustrates a variation of FIG. 19 in which HARQ process IDs 0 and 1 are mapped to the upper frequency grant-free uplink transmission resource blocks, and HARQ process IDs 2 and 3 are mapped to the lower frequency grant-free uplink transmission resource blocks.

Figure 21:
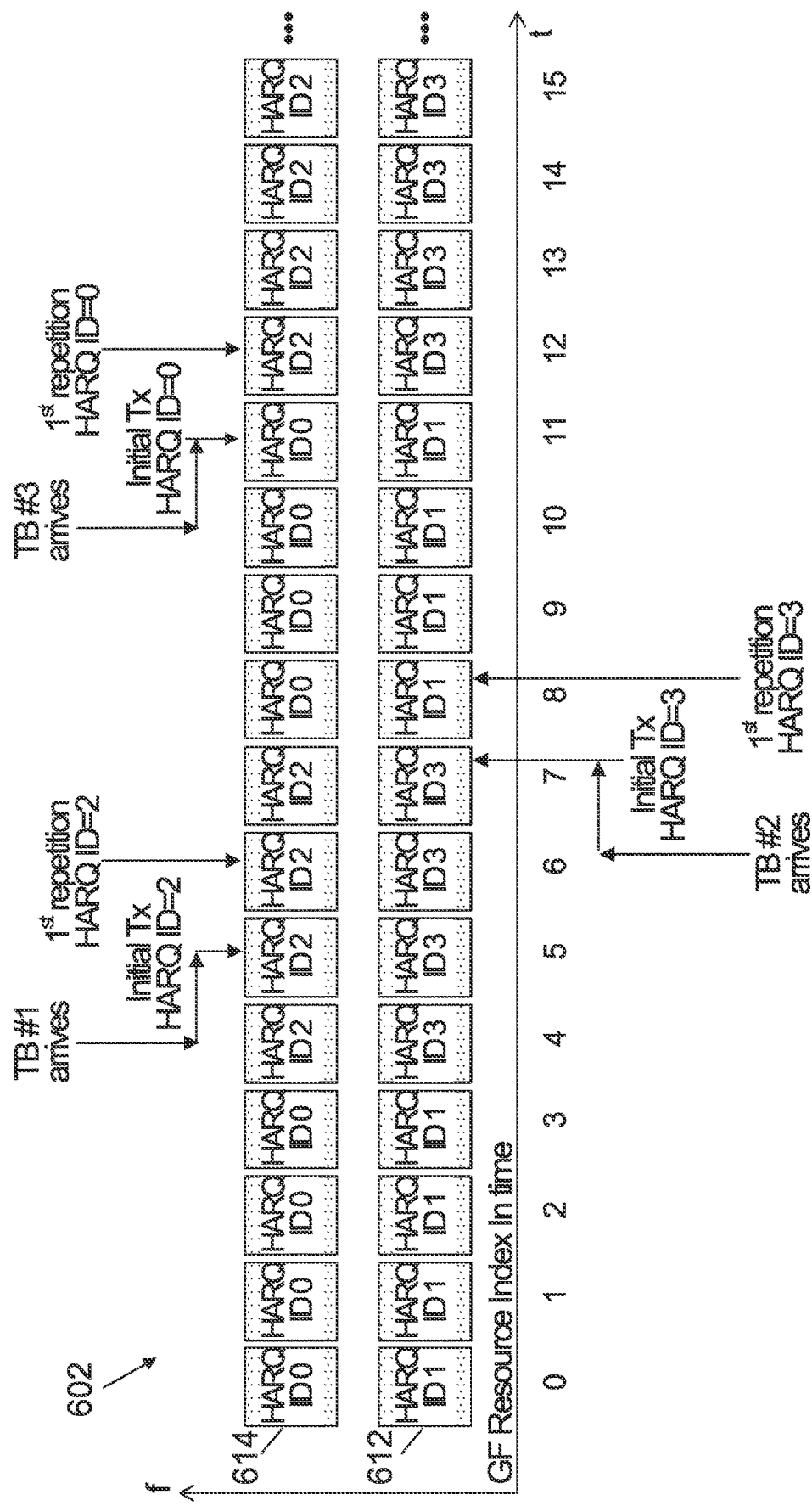
Figure 22:
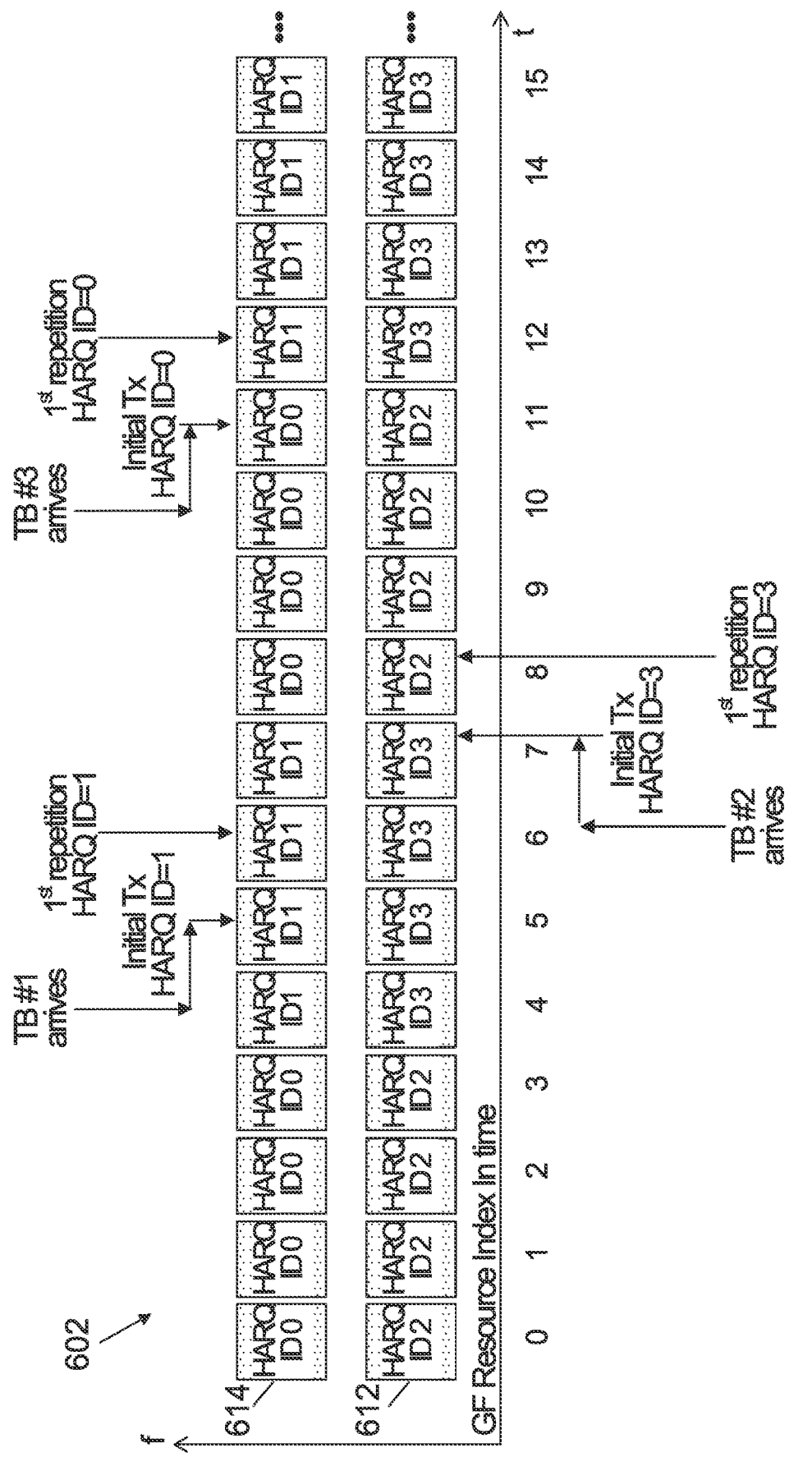

FIG. 21 illustrates a variation of FIG. 19 in which there is only one repetition, i.e. each TB is sent twice: K=2. FIG. 22 illustrates a variation of FIG. 20 in which there is only one repetition, i.e. each TB is sent twice: K=2.

Figure 23:
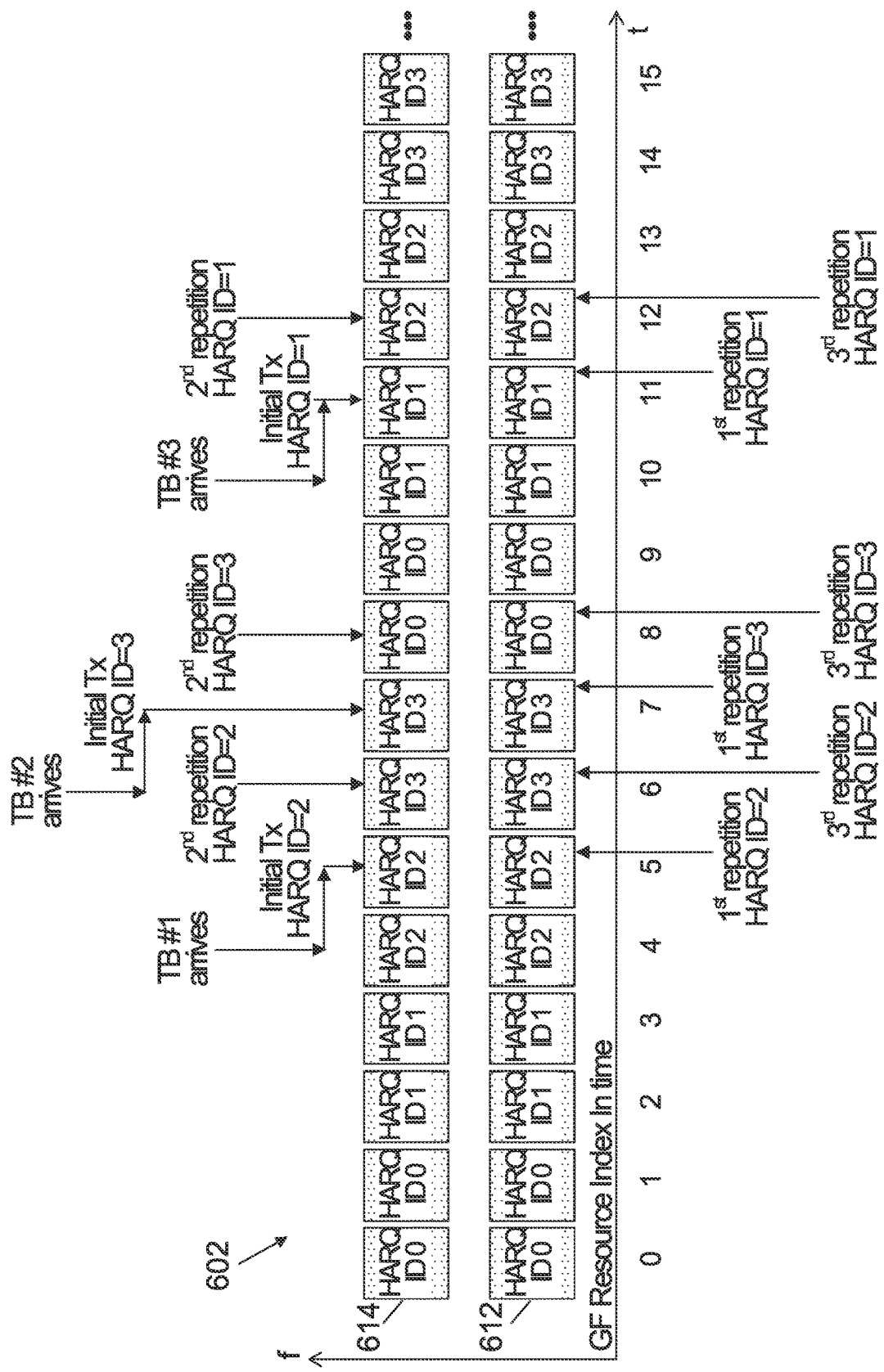

FIG. 23 illustrates a variation of FIG. 19 in which the repetitions occur in the frequency domain. Specifically, each pair of adjacent time intervals has its four grant-free uplink transmission blocks mapped to the same HARQ process ID, such that multiple transmissions of the same TB are sent in parallel. The HARQ process ID assigned to a TB is equal to the HARQ process ID associated with the grant-free uplink resource blocks at which the initial transmission and 1$^{st}$ repetition of the TB are sent. The embodiment in FIG. 23 has two possible benefits: automatic transmissions of a TB occur over a shorter time interval, and each time interval is only associated with one HARQ process ID. A possible drawback of the example in FIG. 23 is that the power for transmitting a TB on a given interval may need to be spread between the two transmissions of that TB on that interval.

Figure 24:
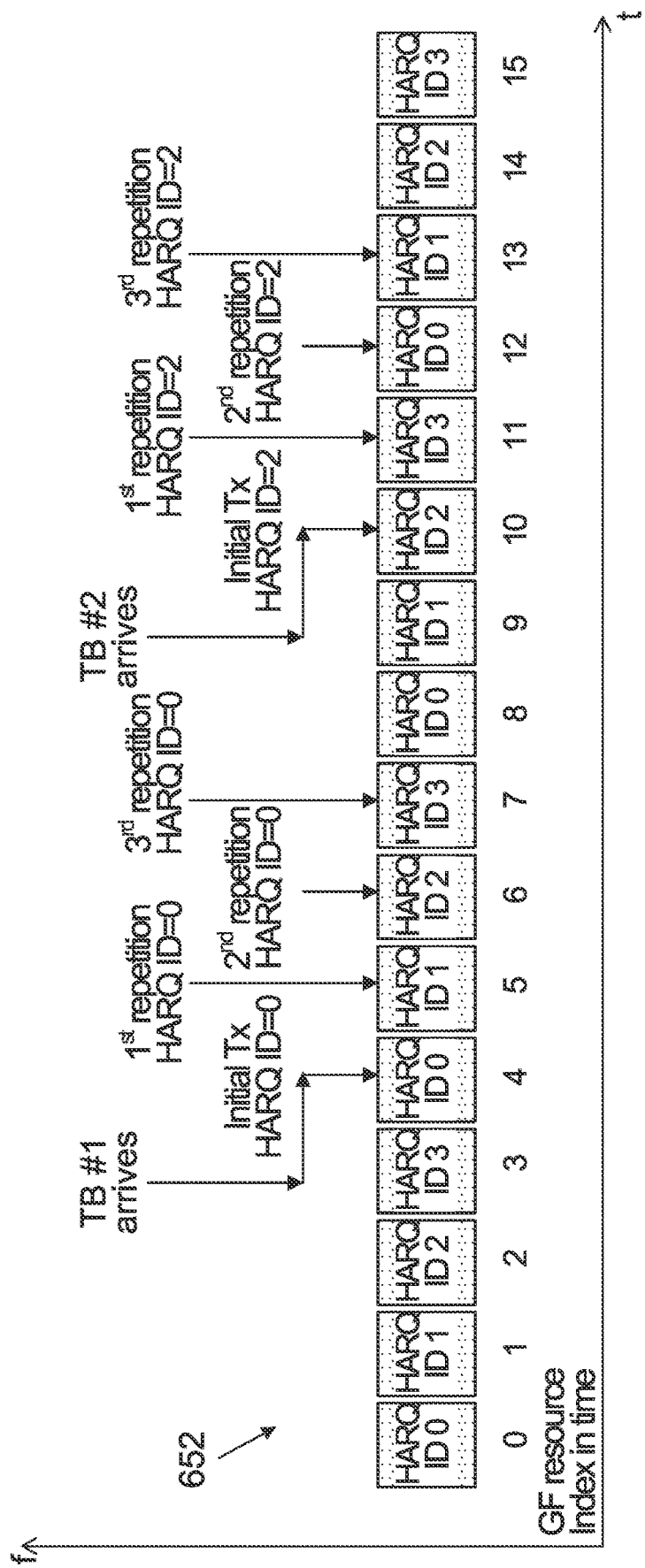

FIG. 24 illustrates another example of a grant-free uplink transmission resource set 652 configured such that: the periodicity between grant-free uplink transmission opportunities is one time interval; K=L=4; and the HARQ process ID mapping to grant-free uplink transmission resource blocks is independent of the number of repetitions. Specifically, if m is the HARQ process ID mapped to the grant-free transmission resource block at time index n, then (m+1) mod L is the HARQ process ID mapped to the grant-free transmission resource block at time index n+1. The HARQ process ID assigned to the TB is equal to the HARQ process ID mapped to the grant-free uplink resource block at which the initial grant-free uplink transmission of the TB is sent. In some embodiments, the base station distinguishes between initial transmissions and repetitions of a TB based on the MA signature used in the grant-free uplink transmission. Once the timing or time/frequency location of the initial transmission is identified, the following K−1 repetitions of the same TB may be identified by finding the subsequent K−1 grant-free uplink transmission resources following the initial grant-free uplink transmission. The HARQ process ID may be identified based on the resource corresponding to the initial transmission, and the following repetitions of the same TB can be considered as using the same process HARQ ID. In the example of FIG. 24, if a particular HARQ process is ongoing, or if a previous HARQ process buffer has not been cleared (e.g. if the UE is still waiting for an ACK/NACK or grant for that HARQ process), and a UE has a new TB in the transmit buffer to send to the base station, then the UE can delay the initial transmission of the new TB as necessary in order to transmit it in a grant-free resource corresponding to an unused HARQ process ID.

The HARQ process ID of FIG. 24 may be expressed as:

$$HARQ \text{ process ID} = \left\lfloor \frac{\text{index}}{\text{perodicity}} \right\rfloor \text{mod} L$$

If multiple resource sets are configured and each resource set is also configured with a HARQ ID offset, then the HARQ process ID of each resource set may be expressed as $$HARQ \text{ process ID} = \left\lfloor \frac{\text{index}}{\text{perodicity}} \right\rfloor \text{mod} L + HARQ \text{ ID offset}$$

Figure 25:
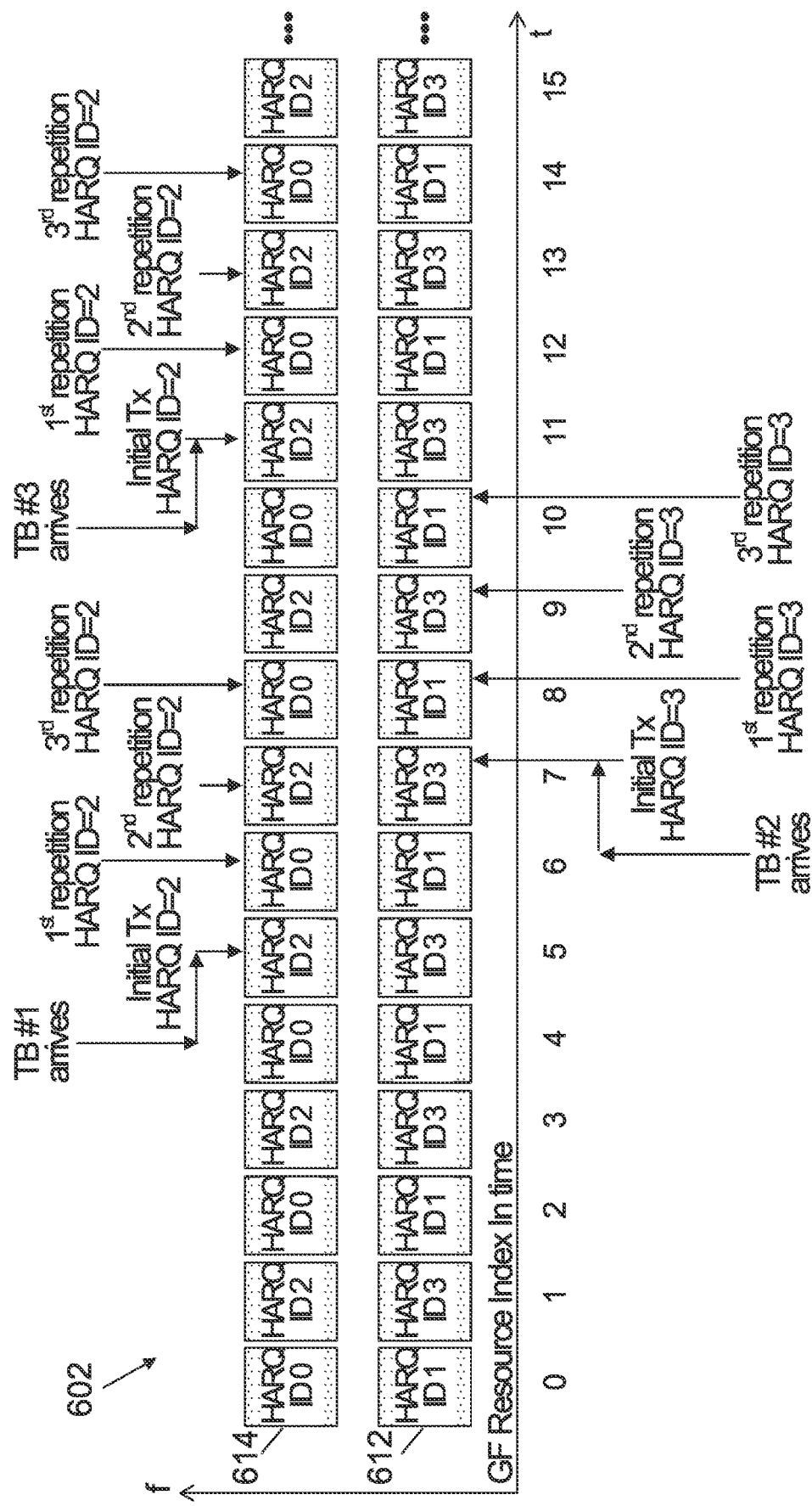

FIG. 25 illustrates a variation of FIG. 19 in which the HARQ process ID mapping to grant-free uplink transmission resource blocks is independent of the number of repetitions.

As an example, the HARQ ID mapping of FIG. 25 may be indicated as $$HARQ \text{ process ID} =$$
$$\left\lfloor \left( \left\lfloor \frac{\text{index}}{\text{perodicity}} \right\rfloor * NumGFResourceset + GFResourcesetIndex \right) \right\rfloor \text{mod} L$$

where NumGFResourceset is the number of grant-free uplink transmission time-frequency resource sets (i.e. two in FIG. 25: resource set 612 and 614), and GFReourcesetIndex is the index of each set (resource set 614 is '0' and 612 is '1' in FIG. 25). In some embodiments, the NumGFresourceset may be replaced by NumGFResourceperTTI, the number of frequency resources configured per time interval or any time unit, the GFResourcesetIndex may be replaced by GFresourceIndexWithinTTI, the frequency location index among the multiple frequency resources configured per time interval or any time unit. In some embodiments, the time interval is a TTI, e.g. a subframe, slot, or mini-slot. In some embodiments, the time interval is defined same as the periodicity. For example, if there are multiple frequency hopping patterns configured for the UE, GFresourceIndexWithinTTI may be the index of the frequency hopping pattern configured for the UE, while the NumGFResourceperTTI may be the number of configured frequency resource hopping patterns for the UE. The scheme may allow for parallel HARQ process transmitted per TTI.

Figure 26:
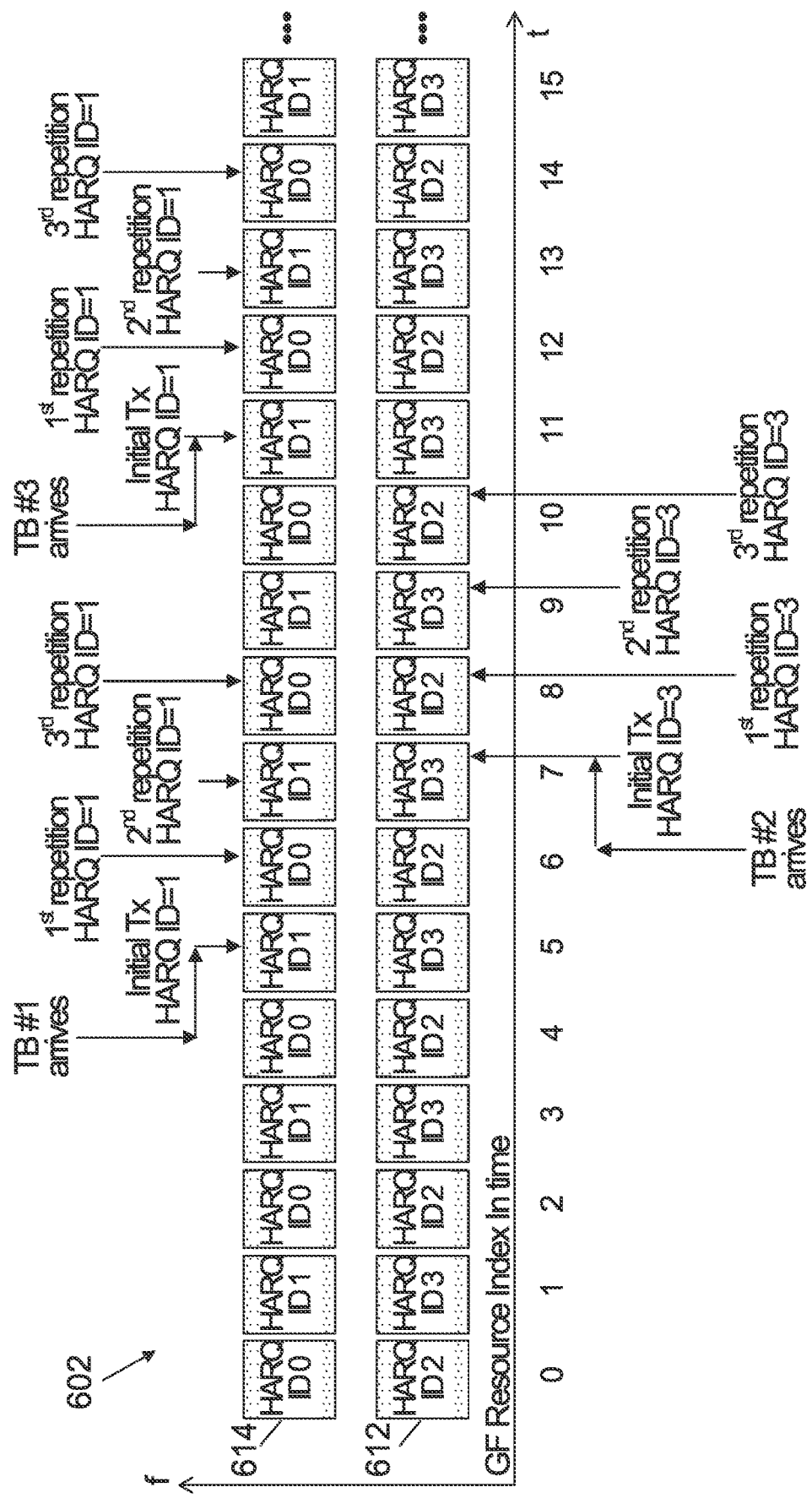

FIG. 26 illustrates a variation of FIG. 20 in which the HARQ process ID mapping to grant-free uplink transmission resource blocks is independent of the number of repetitions.

The HARQ process ID of each resource set in FIG. 26 with resource index i may be calculated as $$HARQ \text{ process ID} = \left\lfloor \frac{\text{index}}{\text{perodicity}} \right\rfloor \text{mod} L\_i + \text{offset}\_i$$

Wher L_i is the number of HARQ processes for resource set i, and L_i=floor (L/NumGFResourceset); and offset_i=L_0+L_1+ ... +L_{i−1}; where only the total number of HARQ processes L and resource set index and number of grant-free resource sets needs to be known. In some embodiments, the NumGFresourceset may be replaced by NumGFResourceperTTI and the GFResourcesetIndex may be replaced by GFresourceIndexWithinTTI as described above.

Similarly for FIG. 20, the HARQ process ID of each resource set, $$HARQ \text{ process ID} = \left\lfloor \left( \frac{\left\lfloor \frac{\text{index}}{\text{perodicity}} \right\rfloor}{K} \right) \right\rfloor \text{mod} L\_i + \text{offset}\_i$$

Wher e L_i and offset_i are defined above.

Figure 27:
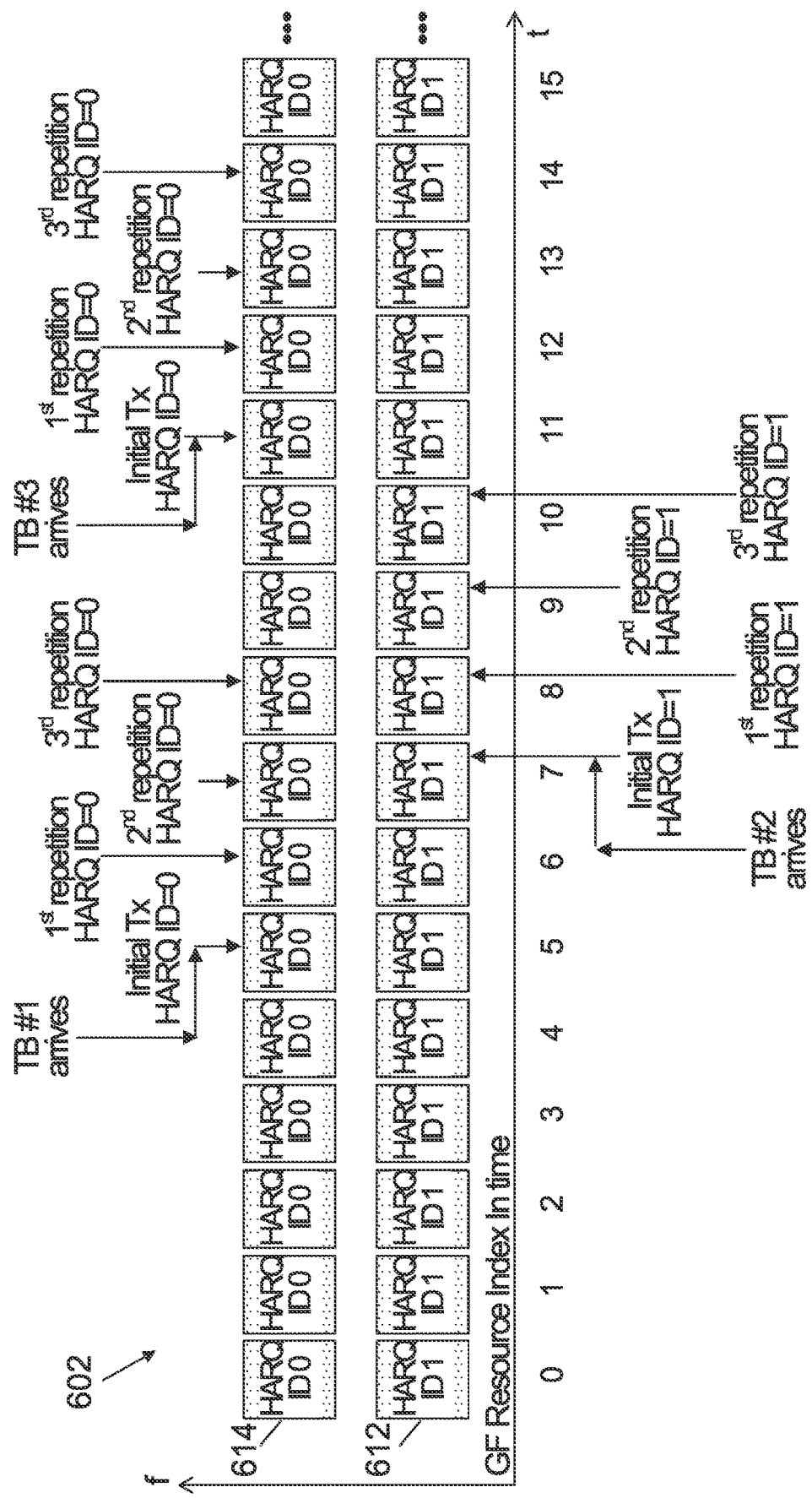

FIG. 27 illustrates a variation of FIG. 19 in which HARQ process ID 0 is mapped to the upper frequency grant-free uplink transmission resource blocks, and HARQ process ID 1 is mapped to the lower frequency grant-free uplink transmission resource blocks. FIG. 27 may be a result of pre-configured resource sets (614 and 612), with each resource set corresponding to a respective HARQ process.

Example Methods

Figure 28:
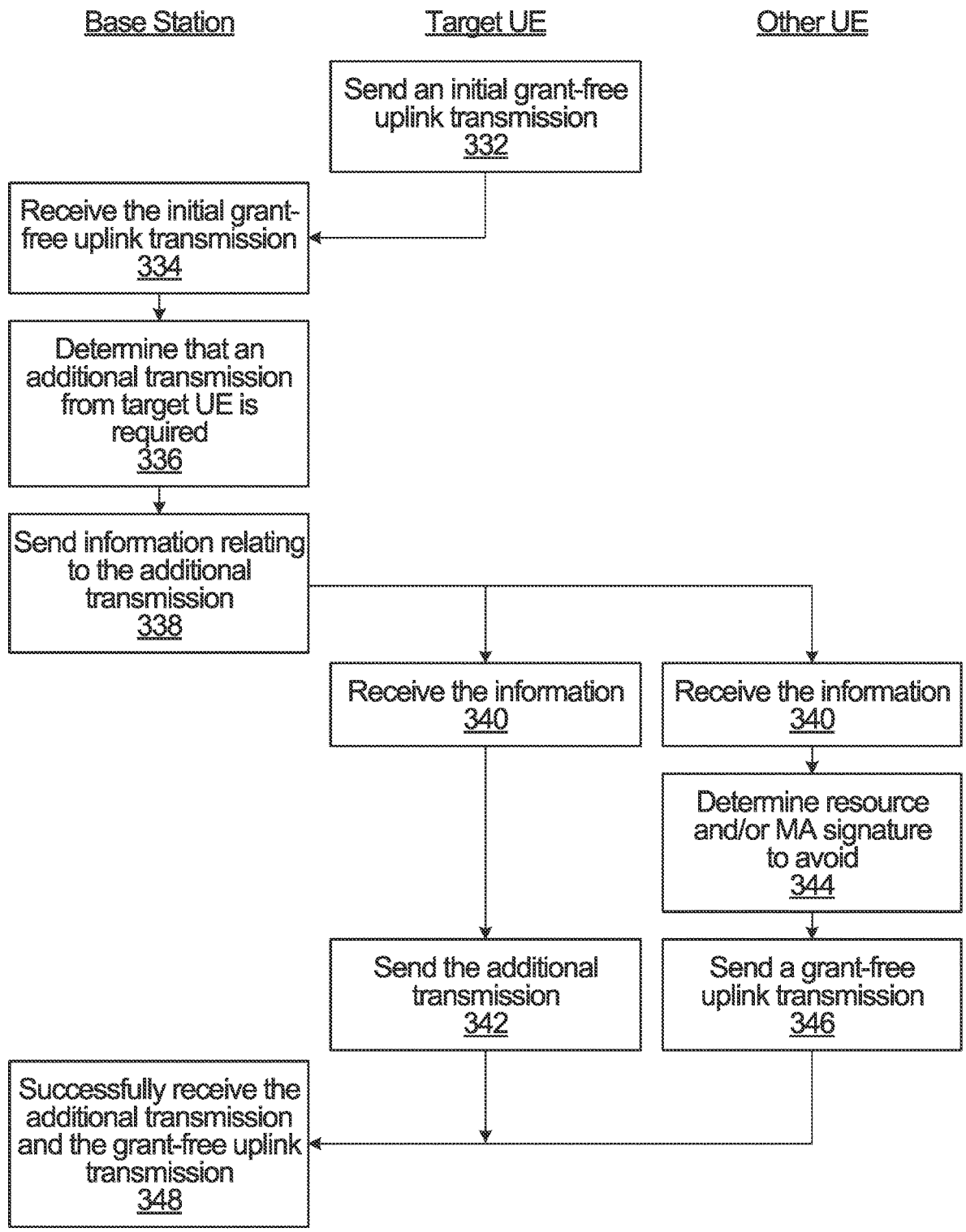
FIG. 28 is a flow chart of a method performed by a base station, a target UE, and another UE, according to one embodiment.

FIG. 28 is a flow chart of a method performed by a base station, a target UE, and one other UE, according to one embodiment. In step 332, the target UE sends an initial grant-free uplink transmission. The initial grant-free uplink transmission may or may not be a contention based scheduling request. The initial grant-free uplink transmission may include a BSR or other indicator mentioned above (e.g. the indicator mentioned in relation to step 302 of FIG. 5). In step 334, the base station receives the initial grant-free uplink transmission. In step 336, the base station determines that an additional transmission from the target UE is required. In some embodiments, the additional transmission may be needed to send additional data from the target UE. In some embodiments, the additional transmission may be a retransmission relating to the initial grant-free uplink transmission. In step 338, the base station 100 sends information relating to the additional transmission to the target UE. The information relating to the additional transmission is configured to be received and/or decoded by the other UE. The information relating to the additional transmission may be a grant to the target UE indicating resources and/or an MA signature to use to send the additional transmission in a grant-based uplink transmission. In some embodiments, the grant may be a semi-persistent scheduling grant. In some embodiments, if the additional transmission is a retransmission due to unsuccessful decoding of the initial data, then the information relating to the additional transmission may be a NACK without a grant, such that the target UE is to send the retransmission via a grant-free uplink transmission. In step 340, the target UE and the other UE both receive the information. In step 342, the target UE sends the additional transmission. Meanwhile, in step 344 the other UE decodes the information and reads the information to determine at least one MA signature and/or at least one resource to avoid. In step 346, the other UE sends a grant-free uplink transmission that does not collide with the additional transmission sent by the target UE in step 342 because the other UE has avoided using resources and/or an MA signature used by the target UE for the additional transmission. In step 348 the base station successfully receives the additional transmission sent in step 342 and the grant-free uplink transmission sent in step 346.

Optionally, in step 336 the base station may determine that a grant-free to grant-based switch for the target UE is to be performed, e.g. based on one, some, or all of example conditions (1) to (8) described earlier. If a grant-free to grant-based switch for the target UE is to be performed, then the information relating to the additional transmission that is sent in step 338 is a grant for the target UE.

ADDITIONAL EXAMPLES

In view of the above, the following examples are provided.

Example 1: A method performed by a base station including: receiving a grant-free uplink transmission from a user equipment; in response to receiving the grant-free uplink transmission, generating a scheduling grant for the user equipment; transmitting the scheduling grant to at least the user equipment.

Example 2: The method of example 1, further including also transmitting the scheduling grant to at least a second user equipment.

Example 3: The method of example 2, wherein transmitting the scheduling grant includes broadcasting the scheduling grant.

Example 4: The method of example 1, wherein the grant-free uplink transmission includes an indicator.

Example 5: The method of example 4, wherein the indicator is a buffer status report.

Example 6: The method of example 5, wherein the buffer status report indicates that the user equipment has additional data to send to the base station.

Example 7: The method of example 1, wherein generating the scheduling grant includes generating a semi-persistent scheduling grant.

Example 8: The method of example 7, wherein the semi-persistent scheduling grant includes an index indicating a particular resource hopping pattern and/or MA signature hopping pattern to be used by the user equipment.

Example 9: The method of example 8, wherein the MA signature hopping pattern is a reference signal hopping pattern.

Example 10: The method of example 1, wherein the grant-free uplink transmission comprises a scheduling request.

Example 11: The method of example 1, further including unsuccessfully decoding data in the grant-free uplink transmission, and wherein the scheduling grant is sent with a NACK.

Example 12: The method of example 1 wherein, in response to receiving the grant-free uplink transmission, generating the scheduling grant for the user equipment, includes: determining to generate the scheduling grant based on one or more criteria.

Example 13: A base station configured to perform the method of any one of examples 1 to 12.

Example 14: A base station including: a receiver to receive a grant-free uplink transmission from a user equipment; a resource allocator to, in response to receiving the grant-free uplink transmission, generate a scheduling grant for the user equipment; a transmitter to transmit the scheduling grant to at least the user equipment.

Example 15: A method performed by a first UE including: receiving a message that includes information relating to an uplink transmission of a second UE; decoding the information in the message; sending a grant-free uplink transmission based on the information in the message.

Example 16: The method of example 15, wherein the information in the message is indicative of a first resource that will be used by the second UE during a future uplink transmission sent by the second UE, and wherein sending the grant-free uplink transmission based on the information in the message includes: sending the grant-free uplink transmission on a second resource different from the first resource.

Example 17: The method of example 16, wherein the information in the message is an index value corresponding to a particular resource hopping pattern to be used by the second UE.

Example 18: The method of example 15, wherein the message is a NACK meant for the second UE.

Example 19: The method of example 15, wherein the information in the message is indicative of a first MA signature that will be used by the second UE during a future uplink transmission sent by the second UE, and wherein sending the grant-free uplink transmission based on the information in the message includes: sending the grant-free uplink transmission using a second MA signature different from the first MA signature.

Example 20: The method of example 19, wherein the first MA signature is a first reference signal, and the second MA signature is a second reference signal.

Example 21: The method of example 15, wherein the message is an ACK meant for the second UE, and wherein sending the grant-free uplink transmission based on the information in the message includes: sending the grant-free uplink transmission on resources and/or using an MA signature that was previously to be used by the second UE.

Example 22: A UE configured to perform the method of any one of examples 15 to 21.

Example 23: A UE including: a receiver to receive a first message that includes information relating to an uplink transmission of a second UE; a resource detector to decode the information in the first message; and an uplink message generator to generate a second message to be transmitted in a grant-free uplink transmission based on the information in the first message.

Example 24: A method performed by a UE including: generating a message having a buffer status report, the buffer status report indicating that the UE has additional data to send to a base station; transmitting the message, including the buffer status report, to the base station via a grant-free uplink transmission.

Example 25: A UE configured to perform the method of example 24.

Example 26: A UE including: an uplink message generator to generate a message having a buffer status report, the buffer status report indicating that the UE has additional data to send to a base station; and a transmitter to transmit the message, including the buffer status report, to the base station via a grant-free uplink transmission.

Example 27: A method performed by a base station including: receiving a grant-free uplink transmission from a first user equipment; in response to receiving the grant-free uplink transmission, sending a response to the first user equipment and to at least a second user equipment.

Example 28: The method of example 27, wherein the response includes a NACK or an ACK for the first user equipment.

Example 29: The method of example 27, wherein the response includes a semi-persistent scheduling grant for the first user equipment, the semi-persistent scheduling grant indicating at least one resource partition and/or at least one MA signature for the first user equipment to send additional grant-free uplink transmissions.

Example 30: The method of example 29, wherein the grant-free uplink transmission is an initial grant-free uplink transmission, and wherein the additional grant-free uplink transmissions are retransmissions relating to the initial grant-free uplink transmission.

Example 31: The method of example 27, wherein the second user equipment is configured to decode information in the response and select a resource and/or MA signature based on the information to avoid a collision with a subsequent grant-free uplink transmission by the first UE.

Example 32: A base station configured to perform the method of any one of examples 27 to 32.

Example 33: A method performed by a base station comprising: receiving a grant-free uplink transmission from a user equipment; in response to receiving the grant-free uplink transmission, generating a scheduling grant for the user equipment; transmitting the scheduling grant to at least the user equipment.

Example 34: The method of example 33, further comprising also transmitting the scheduling grant to at least a second user equipment.

Example 35: The method of example 34, wherein transmitting the scheduling grant comprises broadcasting the scheduling grant.

Example 36: The method of any one of examples 33 to 35, wherein the grant-free uplink transmission includes an indicator.

Example 37: The method of example 36, wherein the indicator is a buffer status report.

Example 38: The method of example 37, wherein the buffer status report indicates that the user equipment has additional data to send to the base station.

Example 39: The method of example 36, wherein the indicator indicates that the user equipment has data to send to the base station, and optionally the indicator indicates that the data is low latency data.

Example 40: The method of any one of examples 33 to 39, wherein generating the scheduling grant comprises generating a semi-persistent scheduling grant.

Example 41: The method of example 40, wherein the semi-persistent scheduling grant comprises an index indicating at least one of a particular resource hopping pattern and a multiple access (MA) signature hopping pattern to be used by the user equipment.

Example 42: The method of example 41, wherein the MA signature hopping pattern is a reference signal hopping pattern.

Example 43: The method of any one of examples 33 to 42, wherein the grant-free uplink transmission comprises a scheduling request.

Example 44: The method of any one of examples 33 to 43, further comprising unsuccessfully decoding data in the grant-free uplink transmission, and wherein the scheduling grant is sent to schedule a retransmission of the data using grant-based transmission.

Example 45: The method of example 44, further comprising receiving the retransmission and performing decoding by soft-combining the retransmission and the grant-free uplink transmission.

Example 46: The method of any one of examples 33 to 43, further comprising successfully decoding data in the grant-free uplink transmission, and wherein the scheduling grant is sent to schedule a new transmission of additional data.

Example 47: The method of any one of examples 33 to 46 wherein, in response to receiving the grant-free uplink transmission, generating the scheduling grant for the user equipment, comprises: determining to generate the scheduling grant based on one or more criteria.

Example 48: A base station comprising: a receiver to receive a grant-free uplink transmission from a user equipment; a resource allocator to, in response to receiving the grant-free uplink transmission, generate a scheduling grant for the user equipment; a transmitter to transmit the scheduling grant to at least the user equipment.

Example 49: The base station of example 48, wherein the transmitter is also to transmit the scheduling grant to at least a second user equipment.

Example 50: The base station of example 49, wherein the transmitter is to broadcast the scheduling grant.

Example 51: The base station of any one of examples 48 to 50, wherein the grant-free uplink transmission includes an indicator.

Example 52: The base station of example 51, wherein the indicator is a buffer status report.

Example 53: The base station of example 52, wherein the buffer status report indicates that the user equipment has additional data to send to the base station.

Example 54: The base station of example 51, wherein the indicator indicates that the user equipment has data to send to the base station, and optionally the indicator indicates that the data is low latency data.

Example 55: The base station of any one of examples 48 to 54, wherein the scheduling grant is a semi-persistent scheduling grant.

Example 56: The base station of example 55, wherein the semi-persistent scheduling grant comprises an index indicating at least one of a particular resource hopping pattern and a multiple access (MA) signature hopping pattern to be used by the user equipment.

Example 57: The base station of example 56, wherein the MA signature hopping pattern is a reference signal hopping pattern.

Example 58: The base station of any one of examples 48 to 57, wherein the grant-free uplink transmission comprises a scheduling request.

Example 59: The base station of any one of examples 48 to 58, wherein the resource allocator is to, upon unsuccessful decoding of data in the grant-free uplink transmission, schedule a retransmission of the data using grant-based transmission.

Example 60: The base station of example 59, further comprising a message decoder to receive the retransmission and perform decoding by soft-combining the retransmission and the grant-free uplink transmission.

Example 61: The base station of any one of examples 48 to 58, wherein the resource allocator is to, upon successful decoding of data in the grant-free uplink transmission, schedule a new transmission of additional data.

Example 62: The base station of any one of examples 48 to 61, wherein the resource allocator is to generate the scheduling grant based on one or more criteria.

Example 63: A method performed by a user equipment (UE) comprising: sending a grant-free uplink transmission to a base station; in response to sending the grant-free uplink transmission, receiving a scheduling grant from the base station; sending a granted uplink transmission to the base station according to the scheduling grant.

Example 64: The method of example 63, wherein the granted uplink transmission is a retransmission of data sent in the grant-free uplink transmission.

Example 65: The method of example 63, wherein the granted uplink transmission sends additional data to the base station that is not a retransmission of data sent in the grant-free uplink transmission.

Example 66: The method of any one of examples 63 to 65, wherein the grant-free uplink transmission includes an indicator.

Example 67: The method of example 66, wherein the indicator is a buffer status report.

Example 68: The method of example 67, wherein the buffer status report indicates that the user equipment has additional data to send to the base station.

Example 69: The method of example 66, wherein the indicator indicates that the user equipment has data to send to the base station, and optionally the indicator indicates that the data is low latency data.

Example 70 The method of any one of examples 63 to 69, wherein the scheduling grant is a semi-persistent scheduling grant.

Example 71: The method of example 70, wherein the semi-persistent scheduling grant comprises an index indicating at least one of a particular resource hopping pattern and a multiple access (MA) signature hopping pattern to be used by the user equipment.

Example 72: The method of example 71, wherein the MA signature hopping pattern is a reference signal hopping pattern.

Example 73: The method of any one of examples 63 to 72, wherein the grant-free uplink transmission comprises a scheduling request.

Example 74: The method of any one of examples 63 to 73, wherein the scheduling grant schedules a retransmission of data using grant-based transmission.

Example 75: The method of any one of examples 63 to 73, wherein the scheduling grant schedules a new transmission of additional data.

Example 76: A user equipment (UE) comprising: a transmitter to send a grant-free uplink transmission to a base station; a receiver to receive a scheduling grant that is sent from the base station in response to the grant-free uplink transmission; the transmitter further to send a granted uplink transmission to the base station according to the scheduling grant.

Example 77: The UE of example 76, wherein the granted uplink transmission is a retransmission of data sent in the grant-free uplink transmission.

Example 78: The UE of example 76, wherein the granted uplink transmission sends additional data to the base station that is not a retransmission of data sent in the grant-free uplink transmission.

Example 79: The UE of any one of examples 76 to 78, wherein the grant-free uplink transmission includes an indicator.

Example 80: The UE of example 79, wherein the indicator is a buffer status report.

Example 81: The UE of example 80, wherein the buffer status report indicates that the user equipment has additional data to send to the base station.

Example 82: The UE of example 79, wherein the indicator indicates that the user equipment has data to send to the base station, and optionally the indicator indicates that the data is low latency data.

Example 83: The UE of any one of examples 76 to 82, wherein the scheduling grant is a semi-persistent scheduling grant.

Example 84: The UE of example 83, wherein the semi-persistent scheduling grant comprises an index indicating at least one of a particular resource hopping pattern and a multiple access (MA) signature hopping pattern to be used by the UE.

Example 85: The UE of example 84, wherein the MA signature hopping pattern is a reference signal hopping pattern.

Example 86: The UE of any one of examples 76 to 85, wherein the grant-free uplink transmission comprises a scheduling request.

Example 87: The UE of any one of examples 76 to 86, wherein the scheduling grant schedules a retransmission of data using grant-based transmission.

Example 88: The UE of any one of examples 76 to 86, wherein the scheduling grant schedules a new transmission of additional data.

Example 89: A method performed by a base station comprising: receiving an uplink transmission from a user equipment (UE), the uplink transmission including an indicator, the indicator indicating that the UE has data to send to the base station; in response to receiving the uplink transmission, generating a scheduling grant for the UE; transmitting the scheduling grant to the UE.

Example 90: The method of example 89, wherein the indicator indicates that the data is low latency data.

Example 91: The method of example 89 or example 90, wherein the uplink transmission comprises a scheduling request.

Example 92: The method of example 89 or example 90, wherein the uplink transmission is a granted uplink transmission.

Example 93: The method of any one of examples 89 to 91, wherein the uplink transmission is a grant-free uplink transmission.

Example 94: A base station comprising: a receiver to receive an uplink transmission from a user equipment (UE), the uplink transmission including an indicator, the indicator indicating that the UE has data to send to the base station; a resource allocator to: in response to receiving the uplink transmission, generate a scheduling grant for the UE; a transmitter to transmit the scheduling grant to the UE.

Example 95: The base station of example 94, wherein the indicator indicates that the data is low latency data.

Example 96: The base station of example 94 or example 95, wherein the uplink transmission comprises a scheduling request.

Example 97: The base station of example 94 or example 95, wherein the uplink transmission is a granted uplink transmission.

Example 98: The base station of any one of examples 94 to 96, wherein the uplink transmission is a grant-free uplink transmission.

Example 99: A method performed by a UE comprising: transmitting an uplink transmission to a base station, the uplink transmission including an indicator, the indicator indicating that the UE has data to send to the base station; receiving a scheduling grant from the base station in response to the uplink transmission.

Example 100: The method of example 99, wherein the indicator indicates that the data is low latency data.

Example 101: The method of example 99 or example 100, wherein the uplink transmission comprises a scheduling request.

Example 102: The method of example 99 or example 100, wherein the uplink transmission is a granted uplink transmission.

Example 103: The method of any one of examples 99 to 101, wherein the uplink transmission is a grant-free uplink transmission.

Example 104: A UE comprising: a transmitter to transmit an uplink transmission to a base station, the uplink transmission including an indicator, the indicator indicating that the UE has data to send to the base station; a receiver to receive a scheduling grant from the base station in response to the uplink transmission.

Example 105: The UE of example 104, wherein the indicator indicates that the data is low latency data.

Example 106: The UE of example 104 or example 105, wherein the uplink transmission comprises a scheduling request.

Example 107: The UE of example 104 or example 105, wherein the uplink transmission is a granted uplink transmission.

Example 108: The UE of any one of examples 104 to 106, wherein the uplink transmission is a grant-free uplink transmission.

Example 109: A method performed by a user equipment (UE), the method comprising: sending an initial grant-free uplink transmissions of data; without receiving a negative acknowledgement (NACK) for the data, addressed to the UE, transmitting at least one grant-free uplink retransmission of the data.

Example 110: The method of example 109, further comprising: without receiving the NACK addressed to the UE, transmitting k grant-free uplink retransmissions of the data.

Example 111: The method of example 109, further comprising: without receiving the NACK addressed to the UE, transmitting the at least one grant-free uplink retransmission of the data until an ACK is received, or until a number of grant-free uplink retransmissions reaches a predetermined value.

Example 112: The method of example 109, further comprising: without receiving the NACK addressed to the UE, transmitting the at least one grant-free uplink retransmission of the data until a grant is received, or until a number of grant-free uplink retransmissions reaches a predetermined value.

Example 113: The method of any one of examples 109 to 112, wherein the initial grant-free uplink transmission is sent on an initial grant-free uplink time-frequency resource during a first time interval, and each grant-free uplink retransmission of the data is sent on a respective subsequent uplink time-frequency resource configured for grant-free uplink transmission.

Example 114: The method of example 113, wherein the initial grant-free uplink time-frequency resource and subsequent uplink time-frequency resources on which retransmissions of the data are sent are contiguous in time.

Example 115: The method of example 113, wherein the initial grant-free uplink time-frequency resource and subsequent uplink time-frequency resources on which retransmissions of the data are sent are not contiguous in time.

Example 116: The method of any one of examples 109 to 112, wherein the initial grant-free uplink transmission is sent on a grant-free uplink time-frequency resource that may also be used for sending, by the UE, a retransmission of another transport block.

Example 117: The method of example 116, wherein each grant-free uplink retransmission of the data is sent on a respective subsequent uplink time-frequency resource.

Example 118: The method of any one of examples 109 to 112, wherein subsequent uplink time-frequency resources on which retransmissions of the data are sent are contiguous in time.

Example 119: The method of example 116, further comprising receiving an indicator from the base station, the indicator indicating that the UE is permitted to send the initial grant-free uplink transmission on the grant-free uplink time-frequency resource that may also be used for sending the retransmission of the another transport block.

Example 120: The method of any one of examples 109 to 119, wherein the initial grant-free uplink transmission is sent on an initial grant-free uplink time-frequency resource during a first time interval, and a grant-free uplink retransmission of the data is also sent during the first time interval on different frequency resources.

Example 121: A UE comprising a transmitter to: send an initial grant-free uplink transmissions of data; without receiving a negative acknowledgement (NACK) for the data, addressed to the UE, transmit at least one grant-free uplink retransmission of the data.

Example 122: The UE of example 121, wherein the transmitter is to: without receiving the NACK addressed to the UE, transmit k grant-free uplink retransmissions of the data.

Example 123: The UE of example 121, wherein the transmitter is to: without receiving the NACK addressed to the UE, transmit the at least one grant-free uplink retransmission of the data until an ACK is received, or until a number of grant-free uplink retransmissions reaches a predetermined value.

Example 124: The UE of example 121, wherein the transmitter is to: without receiving the NACK addressed to the UE, transmit the at least one grant-free uplink retransmission of the data until a grant is received, or until a number of grant-free uplink retransmissions reaches a predetermined value.

Example 125: The UE of any one of examples 121 to 124, wherein the initial grant-free uplink transmission is sent on an initial grant-free uplink time-frequency resource during a first time interval, and each grant-free uplink retransmission of the data is sent on a respective subsequent uplink time-frequency resource configured for grant-free uplink transmission.

Example 126: The UE of example 125, wherein the initial grant-free uplink time-frequency resource and subsequent uplink time-frequency resources on which retransmissions of the data are sent are contiguous in time.

Example 127: The UE of example 125, wherein the initial grant-free uplink time-frequency resource and subsequent uplink time-frequency resources on which retransmissions of the data are sent are not contiguous in time.

Example 128: The UE of any one of examples 121 to 124, wherein the initial grant-free uplink transmission is sent on a grant-free uplink time-frequency resource that may also be used for sending, by the UE, a retransmission of another transport block.

Example 129: The UE of example 128, wherein each grant-free uplink retransmission of the data is sent on a respective subsequent uplink time-frequency resource.

Example 130: The UE of any one of examples 121 to 124, wherein subsequent uplink time-frequency resources on which retransmissions of the data are sent are contiguous in time.

Example 131: The UE of example 128, further comprising a receiver to receive an indicator from the base station, the indicator indicating that the UE is permitted to send the initial grant-free uplink transmission on the grant-free uplink time-frequency resource that may also be used for sending the retransmission of the another transport block.

Example 132: The UE of any one of examples 121 to 131, wherein the initial grant-free uplink transmission is sent on an initial grant-free uplink time-frequency resource during a first time interval, and a grant-free uplink retransmission of the data is also sent during the first time interval on different frequency resources.

Example 133: A method performed by a base station, the method comprising: receiving from a UE an initial grant-free uplink transmission of data; without sending a negative acknowledgement (NACK) for the data, addressed to the UE, receiving at least one grant-free uplink retransmission of the data.

Example 134: The method of example 133, further comprising: without sending the NACK addressed to the UE, receiving k grant-free uplink retransmissions of the data.

Example 135: The method of example 133, further comprising: without sending the NACK addressed to the UE, receiving the at least one grant-free uplink retransmission of the data until an ACK is transmitted, or until a number of grant-free uplink retransmissions reaches a predetermined value.

Example 136: The method of example 133, further comprising: without sending the NACK addressed to the UE, receiving the at least one grant-free uplink retransmission of the data until a grant is sent, or until a number of grant-free uplink retransmissions reaches a predetermined value.

Example 137: The method of any one of examples 133 to 136, wherein the initial grant-free uplink transmission is received on an initial grant-free uplink time-frequency resource during a first time interval, and each grant-free uplink retransmission of the data is received on a respective subsequent uplink time-frequency resource configured for grant-free uplink transmission.

Example 138: The method of example 137, wherein the initial grant-free uplink time-frequency resource and subsequent uplink time-frequency resources on which retransmissions of the data are received are contiguous in time.

Example 139: The method of example 137, wherein the initial grant-free uplink time-frequency resource and subsequent uplink time-frequency resources on which retransmissions of the data are received are not contiguous in time.

Example 140: The method of any one of examples 133 to 136, wherein the initial grant-free uplink transmission is received on a grant-free uplink time-frequency resource that may also be used for receiving, from the UE, a retransmission of another transport block.

Example 141: The method of example 140, wherein each grant-free uplink retransmission of the data is received on a respective subsequent uplink time-frequency resource.

Example 142: The method of any one of examples 133 to 136, wherein subsequent uplink time-frequency resources on which retransmissions of the data are received are contiguous in time.

Example 143: The method of example 140, further comprising sending an indicator to the UE, the indicator indicating that the UE is permitted to send the initial grant-free uplink transmission on the grant-free uplink time-frequency resource that may also be used for receiving the retransmission of the another transport block.

Example 144: The method of any one of examples 133 to 143, wherein the initial grant-free uplink transmission is received on an initial grant-free uplink time-frequency resource during a first time interval, and a grant-free uplink retransmission of the data is also received during the first time interval on different frequency resources.

Example 145: A base station to: receive from a UE an initial grant-free uplink transmission of data; without sending a negative acknowledgement (NACK) for the data, addressed to the UE, receive at least one grant-free uplink retransmission of the data.

Example 146: The base station of example 145, wherein the base station is to: without sending the NACK addressed to the UE, receive k grant-free uplink retransmissions of the data.

Example 147: The base station of example 145, wherein the base station is to: without sending the NACK addressed to the UE, receive the at least one grant-free uplink retransmission of the data until an ACK is transmitted, or until a number of grant-free uplink retransmissions reaches a predetermined value.

Example 148: The base station of example 145, wherein the base station is to: without sending the NACK addressed to the UE, receive the at least one grant-free uplink retransmission of the data until a grant is sent, or until a number of grant-free uplink retransmissions reaches a predetermined value.

Example 149: The base station of any one of examples 145 to 148, wherein the initial grant-free uplink transmission is received on an initial grant-free uplink time-frequency resource during a first time interval, and each grant-free uplink retransmission of the data is received on a respective subsequent uplink time-frequency resource configured for grant-free uplink transmission.

Example 150: The base station of example 149, wherein the initial grant-free uplink time-frequency resource and subsequent uplink time-frequency resources on which retransmissions of the data are received are contiguous in time.

Example 151: The base station of example 149, wherein the initial grant-free uplink time-frequency resource and subsequent uplink time-frequency resources on which retransmissions of the data are received are not contiguous in time.

Example 152: The base station of any one of examples 145 to 148, wherein the initial grant-free uplink transmission is received on a grant-free uplink time-frequency resource that may also be used for receiving, from the UE, a retransmission of another transport block.

Example 153: The base station of example 152, wherein each grant-free uplink retransmission of the data is received on a respective subsequent uplink time-frequency resource.

Example 154: The base station of any one of examples 145 to 148, wherein subsequent uplink time-frequency resources on which retransmissions of the data are received are contiguous in time.

Example 155: The base station of example 152, wherein the base station is to send an indicator to the UE, the indicator indicating that the UE is permitted to send the initial grant-free uplink transmission on the grant-free uplink time-frequency resource that may also be used for receiving the retransmission of the another transport block.

Example 156: The base station of any one of examples 145 to 155, wherein the initial grant-free uplink transmission is received on an initial grant-free uplink time-frequency resource during a first time interval, and a grant-free uplink retransmission of the data is also received during the first time interval on different frequency resources.

Example 157: A method performed by a base station, the method comprising: sending control information to a UE, the control information indicating a plurality of time-frequency resources on which the UE may send grant-free uplink transmissions; receiving a grant-free uplink transmission from the UE on at least one of the plurality of time-frequency resources.

Example 158: The method of example 157, wherein the control information also specifies at least one of the following parameters for the UE: a resource hopping pattern for the plurality of time-frequency resources; a multiple access (MA) signature used in one or more grant-free uplink transmissions; an MA signature hopping pattern; a modulation-and-coding-scheme (MCS) used in one or more grant-free uplink transmissions; a periodicity between the plurality of time-frequency resources; an offset; a time interval size for a grant-free uplink transmission; a power control parameter; a number of transmissions for a transport block (K); a maximum number of possible ongoing HARQ processes for the UE (L); a HARQ ID offset; whether or not the grant-free uplink transmission resources are separated into initial transmission resources and repetition resources.

Example 159: The method of example 157 or 158, wherein each one of the plurality of time-frequency resources is associated with a respective HARQ process ID.

Example 160: The method of example 159, wherein a HARQ process ID associated with the uplink transmission of a transport block (TB) is the HARQ process ID associated with the time-frequency resource on which the initial transmission of the TB is received.

Example 161: The method of example 160, wherein each grant-free uplink retransmission of the TB is received on a respective subsequent uplink time-frequency resource.

Example 162: The method of example 160 or 161, further comprising identifying the initial transmission of the TB based on an MA signature used for the initial transmission.

Example 163: The method of example 162, comprising identifying the initial transmission of the TB based on a reference signal used in the initial transmission.

Example 164: The method of any one of examples 159 to 163, wherein two time-frequency resources in the same time interval, but in different frequency resources, are associated with the same HARQ ID.

Example 165: A base station comprising: a transmitter to send control information to a UE, the control information indicating a plurality of time-frequency resources on which the UE may send grant-free uplink transmissions; a receiver to receive a grant-free uplink transmission from the UE on at least one of the plurality of time-frequency resources.

Example 166: The base station of example 165, wherein the control information also specifies at least one of the following parameters for the UE: a resource hopping pattern for the plurality of time-frequency resources; a multiple access (MA) signature used in one or more grant-free uplink transmissions; an MA signature hopping pattern; a modulation-and-coding-scheme (MCS) used in one or more grant-free uplink transmissions; a periodicity between the plurality of time-frequency resources; an offset; a time interval size for a grant-free uplink transmission; a power control parameter; a number of transmissions for a transport block (K); a maximum number of possible ongoing HARQ processes for the UE (L); a HARQ ID offset; whether or not the grant-free uplink transmission resources are separated into initial transmission resources and repetition resources.

Example 167: The base station of example 165 or 166, wherein each one of the plurality of time-frequency resources is associated with a respective HARQ process ID.

Example 168: The base station of example 167, wherein a HARQ process ID associated with the uplink transmission of a transport block (TB) is the HARQ process ID associated with the time-frequency resource on which the initial transmission of the TB is received.

Example 169: The base station of example 168, wherein each grant-free uplink retransmission of the TB is received on a respective subsequent uplink time-frequency resource.

Example 170: The base station of example 168 or 169, further comprising a message decoder to identify the initial transmission of the TB based on an MA signature used for the initial transmission.

Example 171: The base station of example 170, wherein the message decoder is to identify the initial transmission of the TB based on a reference signal used in the initial transmission.

Example 172: The base station of any one of examples 167 to 171, wherein two time-frequency resources in the same time interval, but in different frequency resources, are associated with the same HARQ ID.

Example 173: A method performed by a UE, the method comprising: receiving control information from a base station, the control information indicating a plurality of time-frequency resources on which the UE may send grant-free uplink transmissions; sending a grant-free uplink transmission to the base station on at least one of the plurality of time-frequency resources.

Example 174: The method of example 173, wherein the control information also specifies at least one of the following parameters for the UE: a resource hopping pattern for the plurality of time-frequency resources; a multiple access (MA) signature used in one or more grant-free uplink transmissions; an MA signature hopping pattern; a modulation-and-coding-scheme (MCS) used in one or more grant-free uplink transmissions; a periodicity between the plurality of time-frequency resources; an offset; a time interval size for a grant-free uplink transmission; a power control parameter; a number of transmissions for a transport block (K); a maximum number of possible ongoing HARQ processes for the UE (L); a HARQ ID offset; whether or not the grant-free uplink transmission resources are separated into initial transmission resources and repetition resources.

Example 175: The method of example 173 or 174, wherein each one of the plurality of time-frequency resources is associated with a respective HARQ process ID.

Example 176: The method of example 175, wherein a HARQ process ID associated with the uplink transmission of a transport block (TB) is the HARQ process ID associated with the time-frequency resource on which the initial transmission of the TB is sent.

Example 177: The method of example 176, wherein each grant-free uplink retransmission of the TB is sent on a respective subsequent uplink time-frequency resource.

Example 178: The method of any one of examples 175 to 177, wherein two time-frequency resources in the same time interval, but in different frequency resources, are associated with the same HARQ ID.

Example 179: A UE comprising: a receiver to receive control information from a base station, the control information indicating a plurality of time-frequency resources on which the UE may send grant-free uplink transmissions; a transmitter to send a grant-free uplink transmission to the base station on at least one of the plurality of time-frequency resources.

Example 180: The UE of example 179, wherein the control information also specifies at least one of the following parameters for the UE: a resource hopping pattern for the plurality of time-frequency resources; a multiple access (MA) signature used in one or more grant-free uplink transmissions; an MA signature hopping pattern; a modulation-and-coding-scheme (MCS) used in one or more grant-free uplink transmissions; a periodicity between the plurality of time-frequency resources; an offset; a time interval size for a grant-free uplink transmission; a power control parameter; a number of transmissions for a transport block (K); a maximum number of possible ongoing HARQ processes for the UE (L); a HARQ ID offset; whether or not the grant-free uplink transmission resources are separated into initial transmission resources and repetition resources.

Example 181: The UE of example 179 or 180, wherein each one of the plurality of time-frequency resources is associated with a respective HARQ process ID.

Example 182: The UE of example 181, wherein a HARQ process ID associated with the uplink transmission of a transport block (TB) is the HARQ process ID associated with the time-frequency resource on which the initial transmission of the TB is sent.

Example 183: The UE of example 182, wherein each grant-free uplink retransmission of the TB is sent on a respective subsequent uplink time-frequency resource.

Example 184: The UE of any one of examples 181 to 183, wherein two time-frequency resources in the same time interval, but in different frequency resources, are associated with the same HARQ ID.

Example 185: A base station comprising a memory and a processor, wherein the processor is configured to execute instructions stored in the memory to cause the base station to perform any one of the base station methods described herein.

Example 186: A UE comprising a memory and a processor, wherein the processor is configured to execute instructions stored in the memory to cause the UE to perform any one of the UE methods described herein.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a user equipment (UE), the method comprising:
   receiving a grant-free (GF) radio network temporary ID (RNTI);
   when a resource configuration for type 1 GF transmission is received, performing a type 1 GF transmission by transmitting a first data packet on a resource for the type 1 GF transmission based on the resource configuration for type 1 GF transmission without receiving downlink control information (DCI) prior to the type 1 GF transmission to grant the resource for the type 1 GF transmission or to activate the type 1 GF transmission;
   retransmitting the first data packet according to a first DCI that is obtaining using the GF RNTI;
   when a resource configuration for type 2 GF transmission is received, deactivating the resource configuration for type 2 GF transmission based on a second DCI that is obtained using the GF RNTI.

2. The method of claim 1, wherein the GF RNTI is configured for both the type 1 GF transmission and the type 2 GF transmission.

3. The method of claim 1, wherein the first DCI has its cyclic redundancy check (CRC) scrambled by the GF RNTI and wherein the second DCI has its CRC scrambled by the GF RNTI.

4. The method of claim 3, comprising retransmitting a second data packet according to a third DCI whose CRC is scrambled with the GF RNTI, wherein the second data packet was initially transmitted based on the resource configuration for type 2 GF transmission.

5. The method of claim 1, wherein when radio resource control (RRC) signaling comprising a first set of parameters of the resource configuration for type 2 GF transmission is received: receiving a third DCI whose CRC is scrambled with the GF RNTI, wherein the third DCI comprises a second set of parameters of the resource configuration for type 2 GF transmission.

6. The method of claim 1, wherein the resource configuration for type 1 GF transmission is received by RRC signaling without DCI signaling, and the resource configuration for type 2 GF transmission is received by both RRC signaling and DCI signaling.

7. The method of claim 1, wherein the resource configuration for the type 1 GF transmission and/or the type 2 GF transmission includes a configuration of at least one of: periodicity; time offset; time-domain resource allocation; frequency domain resource allocation; number of hybrid automatic repeat request (HARQ) processes; modulation and coding scheme (MCS); number of repetitions; power control.

8. The method of claim 1, wherein the GF RNTI is configured to be used for multiple type 1 GF transmission resource sets and/or multiple type 2 GF transmission resource sets.

9. A user equipment (UE) comprising:
a processor; and
a memory storing processor-executable instructions that, when executed, cause the processor to control the UE to:
receive a grant-free (GF) radio network temporary ID (RNTI);
when a resource configuration for type 1 GF transmission is received, perform a type 1 GF transmission by transmitting a first data packet on a resource for the type 1 GF transmission based on the resource configuration for type 1 GF transmission without receiving downlink control information (DCI) prior to the type 1 GF transmission to grant the resource for the type 1 GF transmission or to activate the type 1 GF transmission;
retransmit of the first data packet according to a first DCI that is obtaining using the GF RNTI;
when a resource configuration for type 2 GF transmission is received, deactivate the resource configuration for type 2 GF transmission based on a second DCI that is obtained using the GF RNTI.

10. The UE of claim 9, wherein the GF RNTI is configured for both the type 1 GF transmission and the type 2 GF transmission.

11. The UE of claim 9, wherein the first DCI has its cyclic redundancy check (CRC) scrambled by the GF RNTI and wherein the second DCI has its CRC scrambled by the GF RNTI.

12. The UE of claim 11, wherein the processor is to further control the UE to retransmit a second data packet according to a third DCI whose CRC is scrambled with the GF RNTI, wherein the second data packet was initially transmitted based on the resource configuration for type 2 GF transmission.

13. The UE of claim 9, wherein the resource configuration for type 1 GF transmission is to be received by RRC signaling without DCI signaling, and the resource configuration for type 2 GF transmission is to be received by both RRC signaling and DCI signaling.

14. The UE of claim 9, wherein the resource configuration for the type 1 GF transmission and/or the type 2 GF transmission includes a configuration of at least one of:
periodicity; time offset; time-domain resource allocation; frequency domain resource allocation;
number of hybrid automatic repeat request (HARQ) processes; modulation and coding scheme (MCS); number of repetitions; power control.

15. A method performed by a base station, the method comprising:
transmitting a grant-free (GF) radio network temporary ID (RNTI) to a user equipment (UE);
when the base station configures the UE for type 1 GF transmission:
receiving, from the UE, a type 1 GF transmission without transmitting a DCI prior to the type 1 GF transmission to grant a resource for the type 1 GF transmission or to activate the type 1 GF transmission; and
transmitting, to the UE, a first downlink control information (DCI) that is generated using the GF RNTI, the first DCI scheduling retransmission of a first data packet that was initially transmitted from the UE based on a resource configuration for the type 1 GF transmission;
when the base station configures the UE for type 2 GF transmission:
receiving, from the UE, a type 2 GF transmission; and
transmitting, to the UE, a second DCI that is generated using the GF RNTI, the second DCI indicating deactivation of a resource configuration for the type 2 GF transmission.

16. The method of claim 15, wherein the base station configures the UE to use the GF RNTI for both the type 1 GF transmission and the type 2 GF transmission.

17. The method of claim 15, wherein the first DCI has its cyclic redundancy check (CRC) scrambled by the GF RNTI and wherein the second DCI has its CRC scrambled by the GF RNTI.

18. The method of claim 17, further comprising transmitting a third DCI whose CRC is scrambled with the GF RNTI, the third DCI scheduling a retransmission of a second data packet, wherein the second data packet was initially transmitted from the UE based on the resource configuration for the type 2 GF transmission.

19. The method of claim 15, further comprising: transmitting radio resource control (RRC) signaling comprising a first set of parameters of the resource configuration for the type 2 GF transmission; and transmitting a third DCI whose CRC is scrambled with the GF RNTI; wherein the third DCI comprises a second set of parameters of the resource configuration for type 2 GF transmission.

20. The method of claim 15, wherein the resource configuration for type 1 GF transmission is transmitted by RRC signaling without DCI signaling, and the resource configuration for type 2 GF transmission is transmitted by both RRC signaling and DCI signaling.

21. The method of claim 15, wherein the resource configuration for the type 1 GF transmission and/or the type 2

GF transmission includes a configuration of at least one of: periodicity; time offset; time-domain resource allocation; frequency domain resource allocation; number of hybrid automatic repeat request (HARQ) processes; modulation and coding scheme (MCS); number of repetitions; power control.

22. A base station comprising:
a processor; and
a memory storing processor-executable instructions that, when executed, cause the processor to control the base station to:
   transmit a grant-free (GF) radio network temporary ID (RNTI) to a user equipment (UE);
   when the base station configures the UE for type 1 GF transmission:
      receive, from the UE, a type 1 GF transmission without transmitting a DCI prior to the type 1 GF transmission to grant a resource for the type 1 GF transmission or to activate the type 1 GF transmission; and
      transmit, to the UE, a first downlink control information (DCI) that is generated using the GF RNTI, the first DCI scheduling retransmission of a first data packet that was initially transmitted from the UE based on a resource configuration for the type 1 GF transmission;
   when the base station configures the UE for type 2 GF transmission:
      receive, from the UE, a type 2 GF transmission; and
      transmit a second DCI that is generated using the GF RNTI, the second DCI indicating deactivation of a resource configuration for the type 2 GF transmission.

23. The base station of claim 22, wherein the processor is to further control the base station to configure the UE to use the GF RNTI for both the type 1 GF transmission and the type 2 GF transmission.

24. The base station of claim 22, wherein the first DCI has its cyclic redundancy check (CRC) scrambled by the GF RNTI and wherein the second DCI has its CRC scrambled by the GF RNTI.

25. The base station of claim 24, wherein the processor is to further control the base station to transmit a third DCI whose CRC is scrambled with the GF RNTI, the third DCI scheduling a retransmission of a second data packet, wherein the second data packet was initially transmitted from the UE based on the resource configuration for the type 2 GF transmission.

26. The base station of claim 22, wherein the resource configuration for type 1 GF transmission is to be transmitted by RRC signaling without DCI signaling, and the resource configuration for type 2 GF transmission is to be transmitted by both RRC signaling and DCI signaling.

27. The base station of claim 22, wherein the resource configuration for the type 1 GF transmission and/or the type 2 GF transmission includes a configuration of at least one of: periodicity; time offset; time-domain resource allocation; frequency domain resource allocation; number of hybrid automatic repeat request (HARQ) processes; modulation and coding scheme (MCS); number of repetitions; power control.

* * * * *

UNITED STATES PATENT AND TRADEMARK OFFICE
CERTIFICATE OF CORRECTION

| | |
|---|---|
| PATENT NO. | : 11,510,237 B2 |
| APPLICATION NO. | : 17/119235 |
| DATED | : November 22, 2022 |
| INVENTOR(S) | : Cao et al. |

It is certified that error appears in the above-identified patent and that said Letters Patent is hereby corrected as shown below:

In the Claims

At Column 51, Line 52, Claim 9:
"retransmit of the first data packet"
Should be:
-- retransmit the first data packet --

Signed and Sealed this
Twenty-first Day of February, 2023

Katherine Kelly Vidal
*Director of the United States Patent and Trademark Office*